Jan. 6, 1925.  
R. DE W. HAAS  
1,522,446  
MOLD HANDLING MECHANISM FOR TIRE CURING APPARATUS  
Filed Jan. 10, 1921   31 Sheets-Sheet 1

Jan. 6, 1925.

R. DE W. HAAS 1,522,446

MOLD HANDLING MECHANISM FOR TIRE CURING APPARATUS

Filed Jan. 10, 1921 31 Sheets-Sheet 4

Jan. 6, 1925.

R. DE W. HAAS 1,522,446

MOLD HANDLING MECHANISM FOR TIRE CURING APPARATUS

Filed Jan. 10, 1921  31 Sheets-Sheet 6

Jan. 6, 1925.

R. DE W. HAAS 1,522,446

MOLD HANDLING MECHANISM FOR TIRE CURING APPARATUS

Filed Jan. 10, 1921　　31 Sheets-Sheet 7

WITNESSES
George A. Myers.
J. T. Schrott

INVENTOR
R. D. HAAS,
BY
ATTORNEYS

Jan. 6, 1925.   1,522,446
R. DE W. HAAS
MOLD HANDLING MECHANISM FOR TIRE CURING APPARATUS
Filed Jan. 10, 1921   31 Sheets-Sheet 8
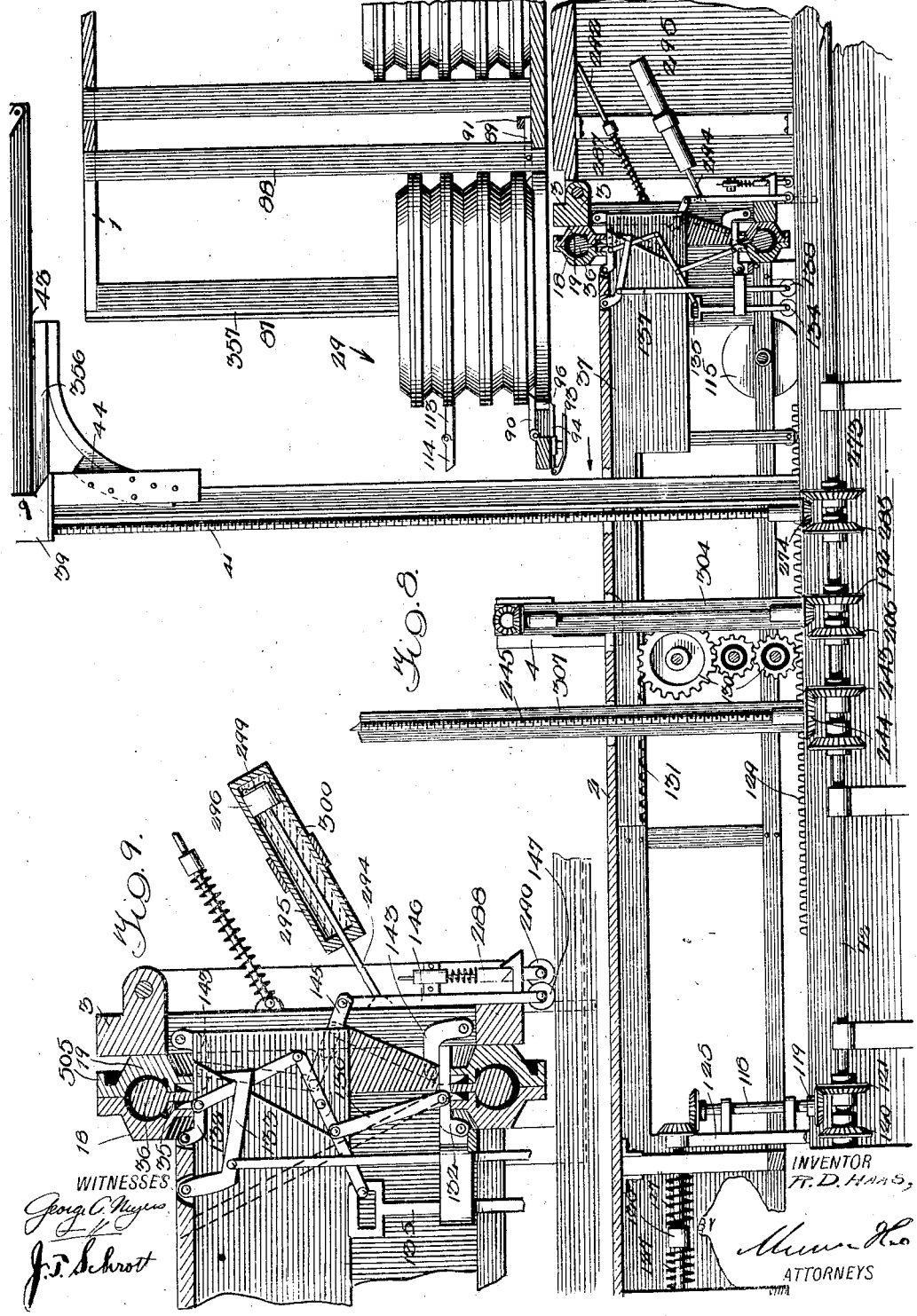

Jan. 6, 1925.
R. DE W. HAAS
1,522,446
MOLD HANDLING MECHANISM FOR TIRE CURING APPARATUS
Filed Jan. 10, 1921  31 Sheets-Sheet 9
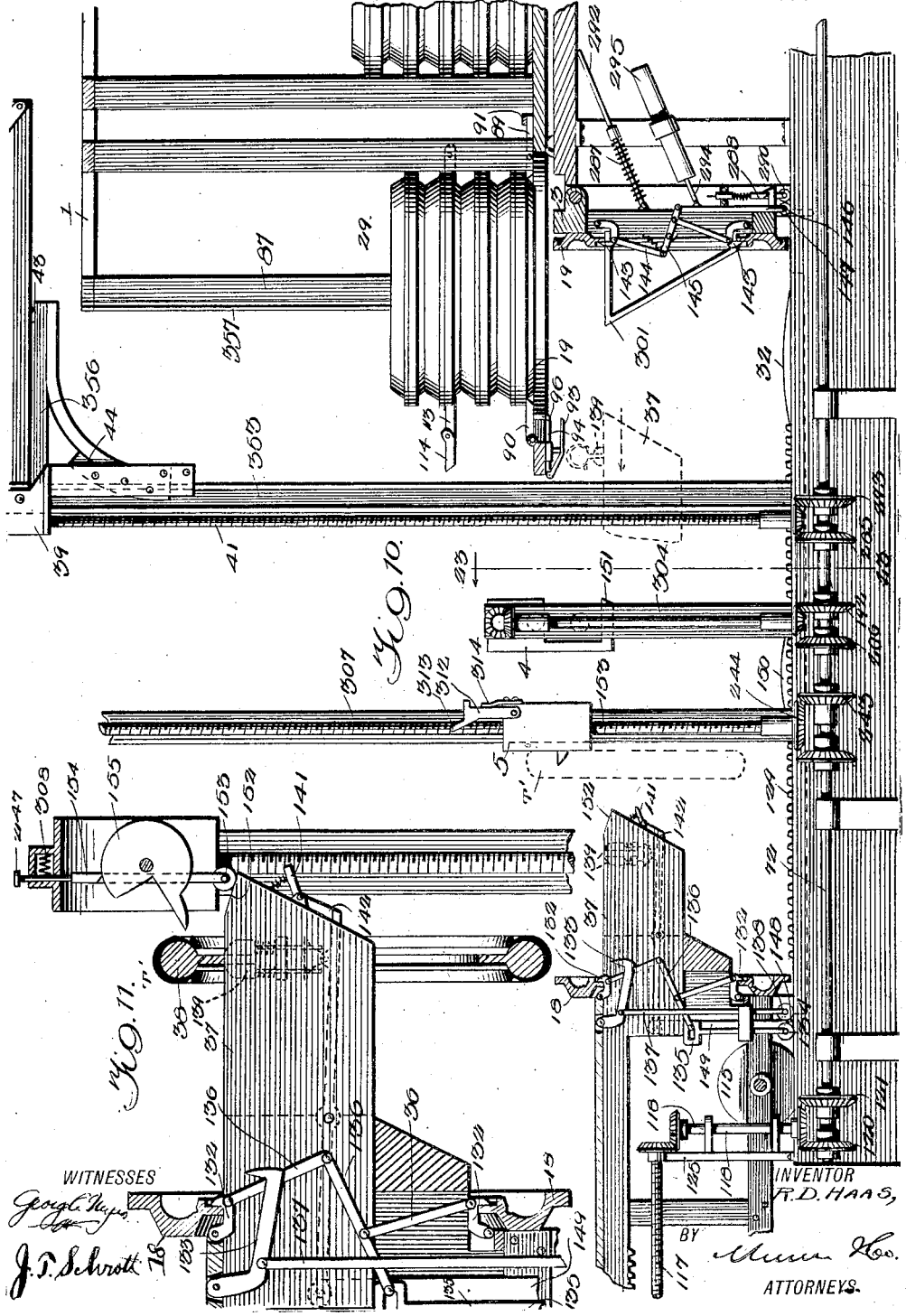
WITNESSES
INVENTOR
R. D. HAAS,
BY
ATTORNEYS.

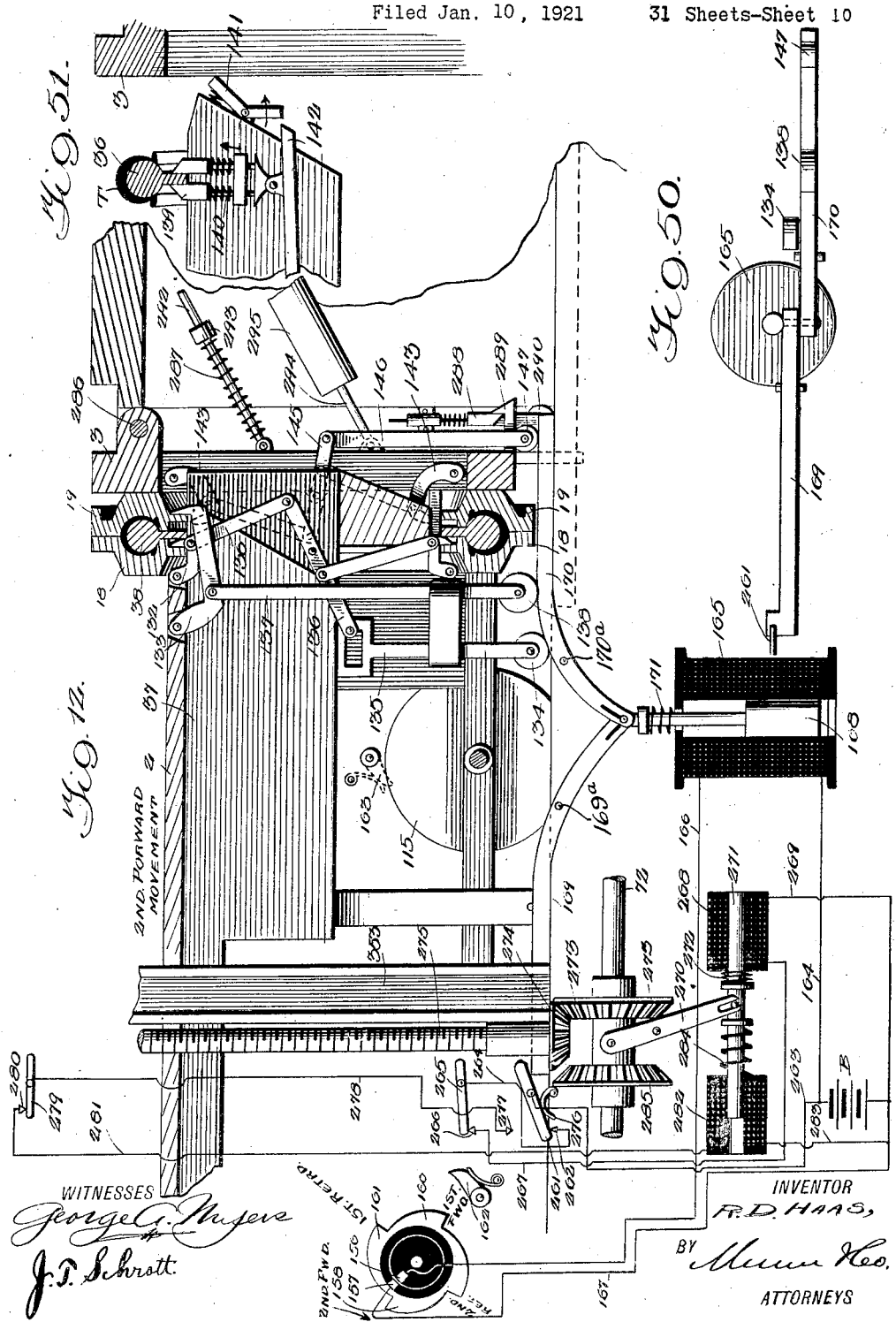

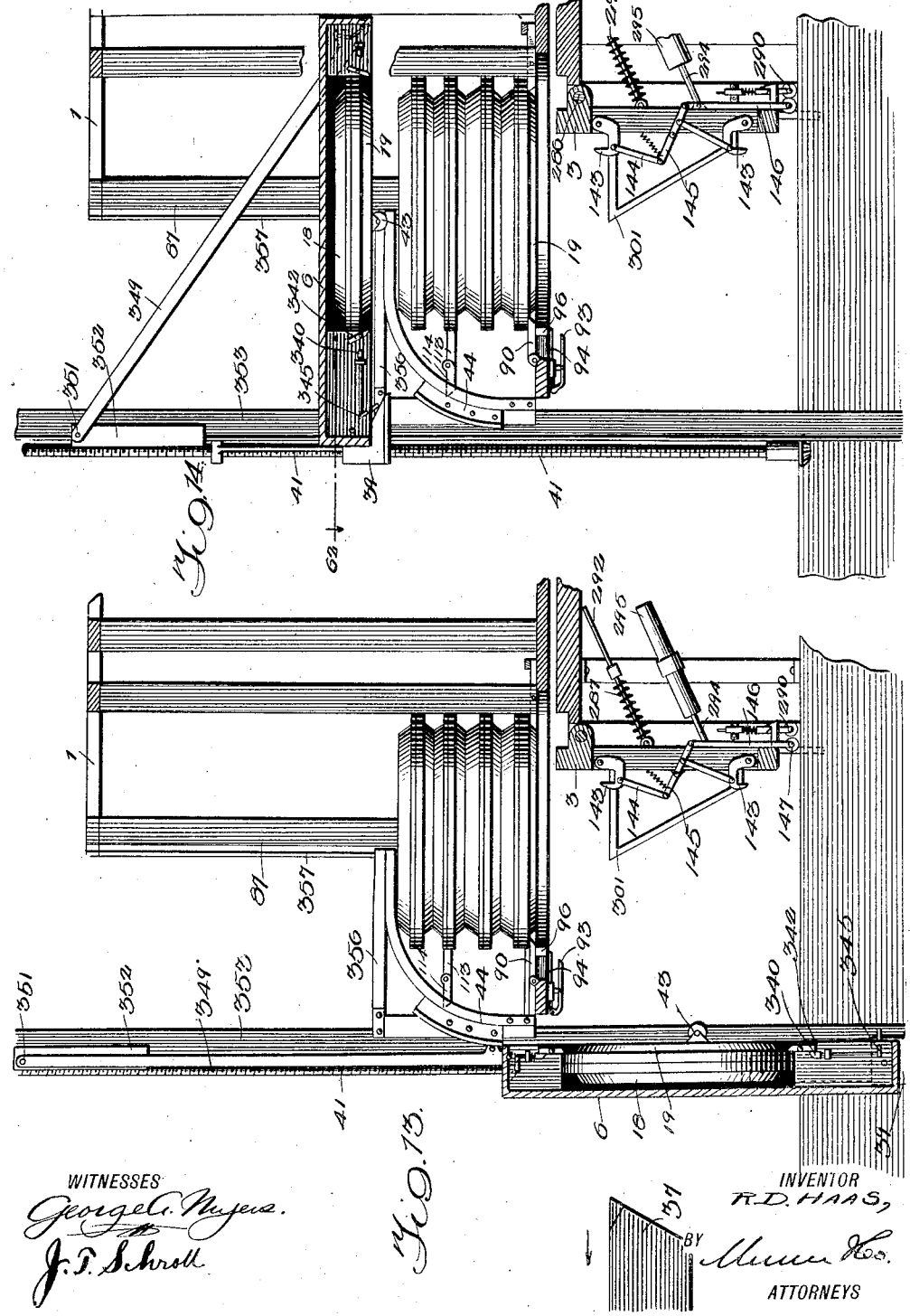

Jan. 6, 1925.  1,522,446
R. DE W. HAAS
MOLD HANDLING MECHANISM FOR TIRE CURING APPARATUS
Filed Jan. 10, 1921  31 Sheets-Sheet 12
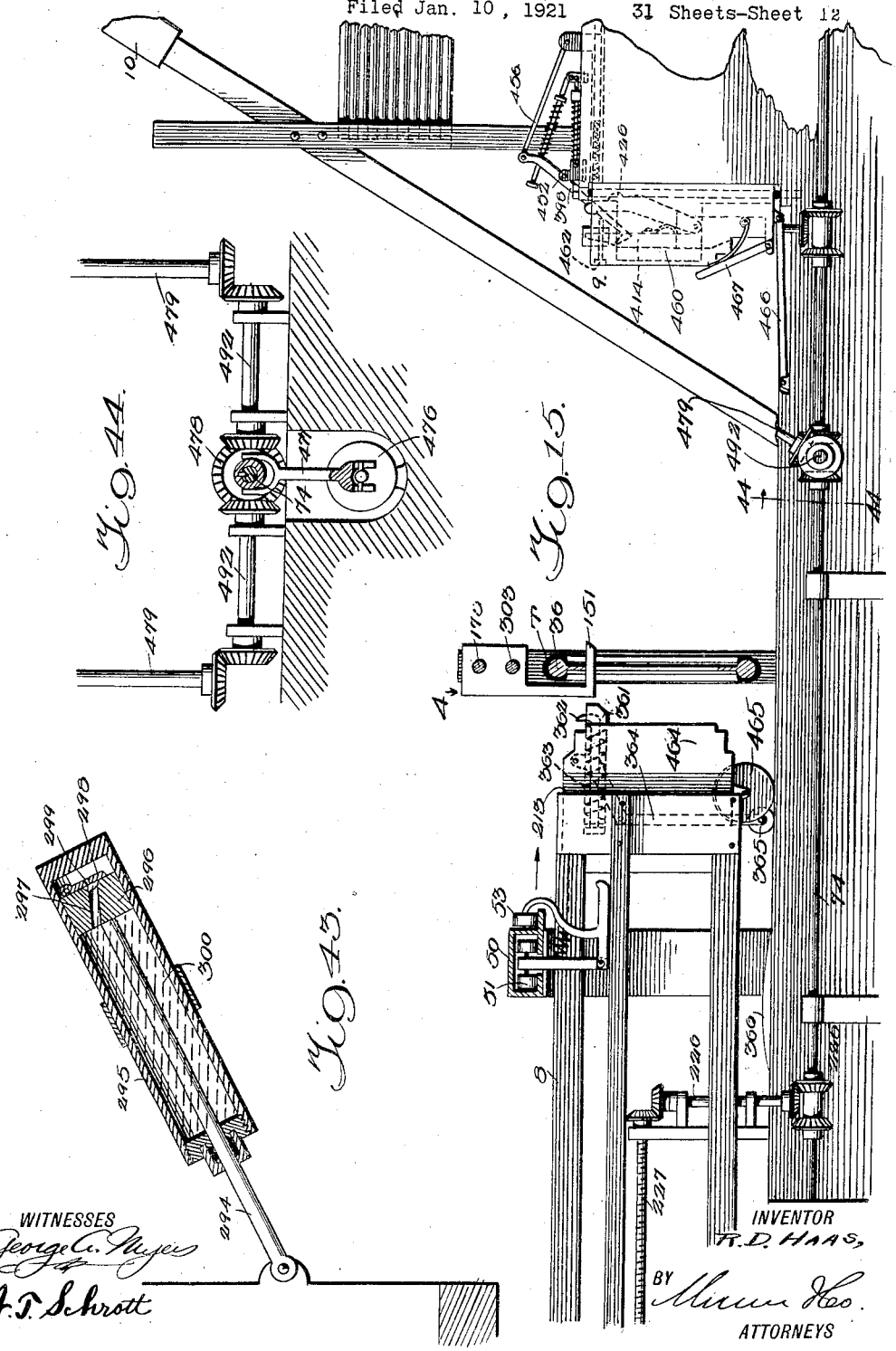

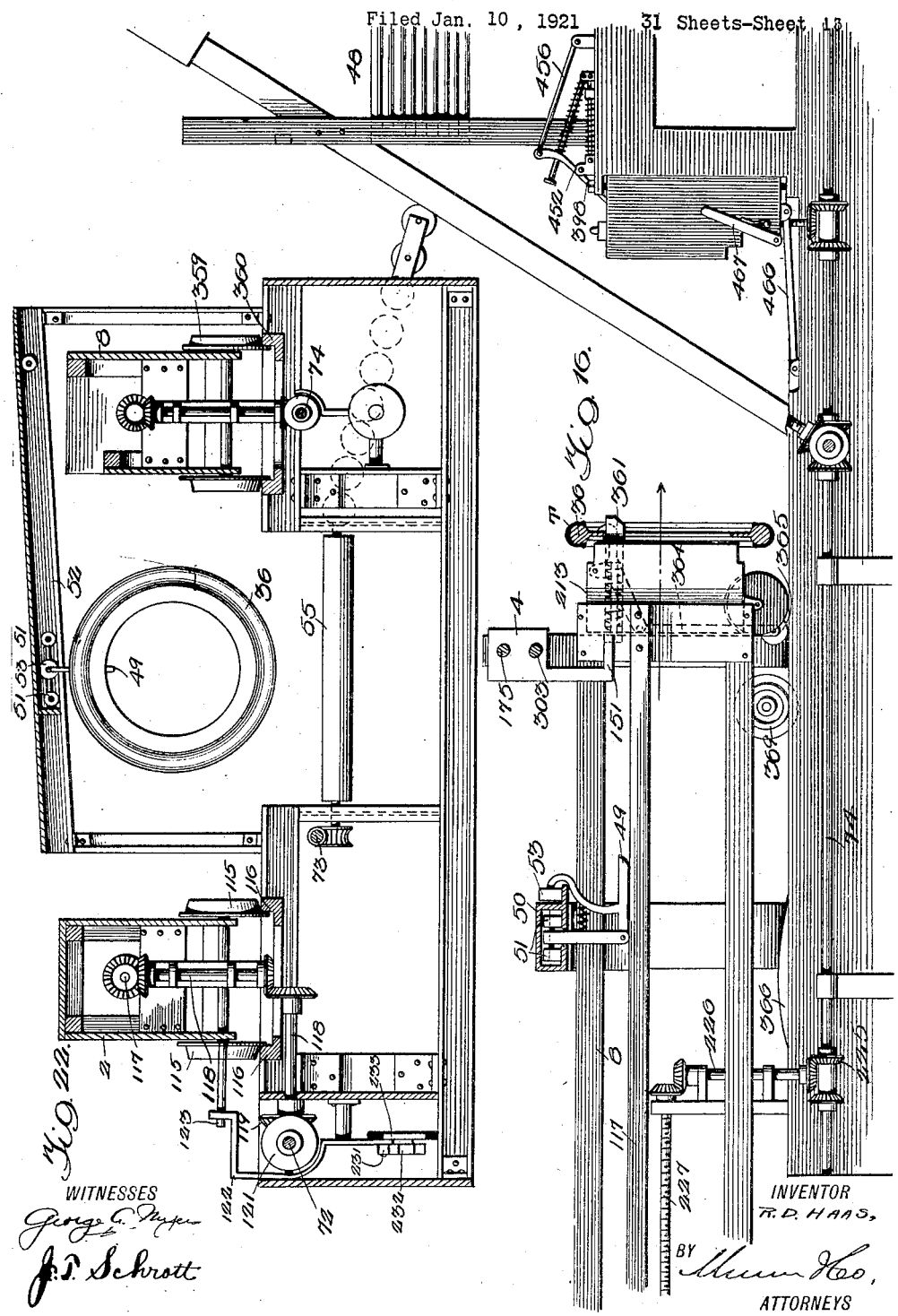

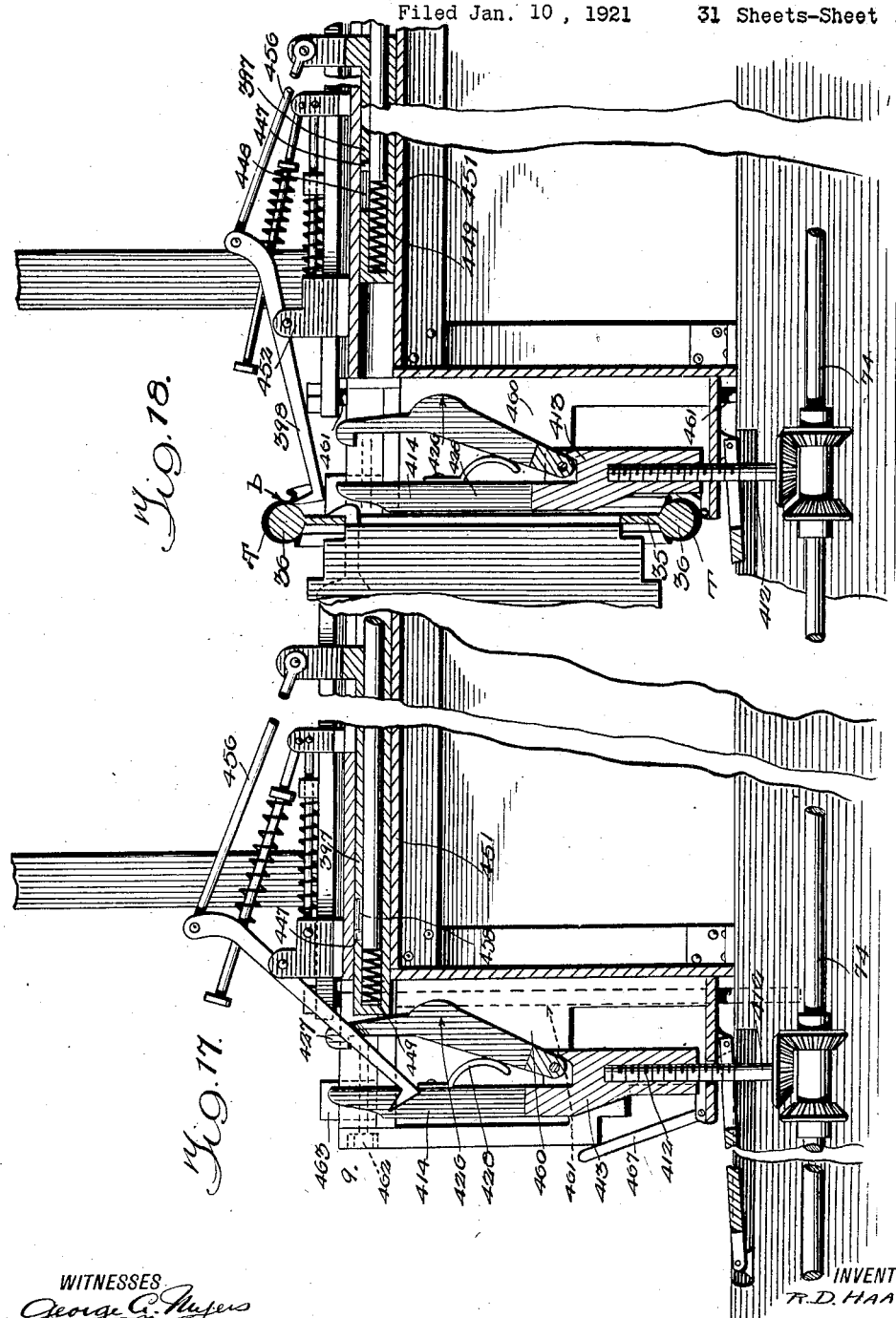

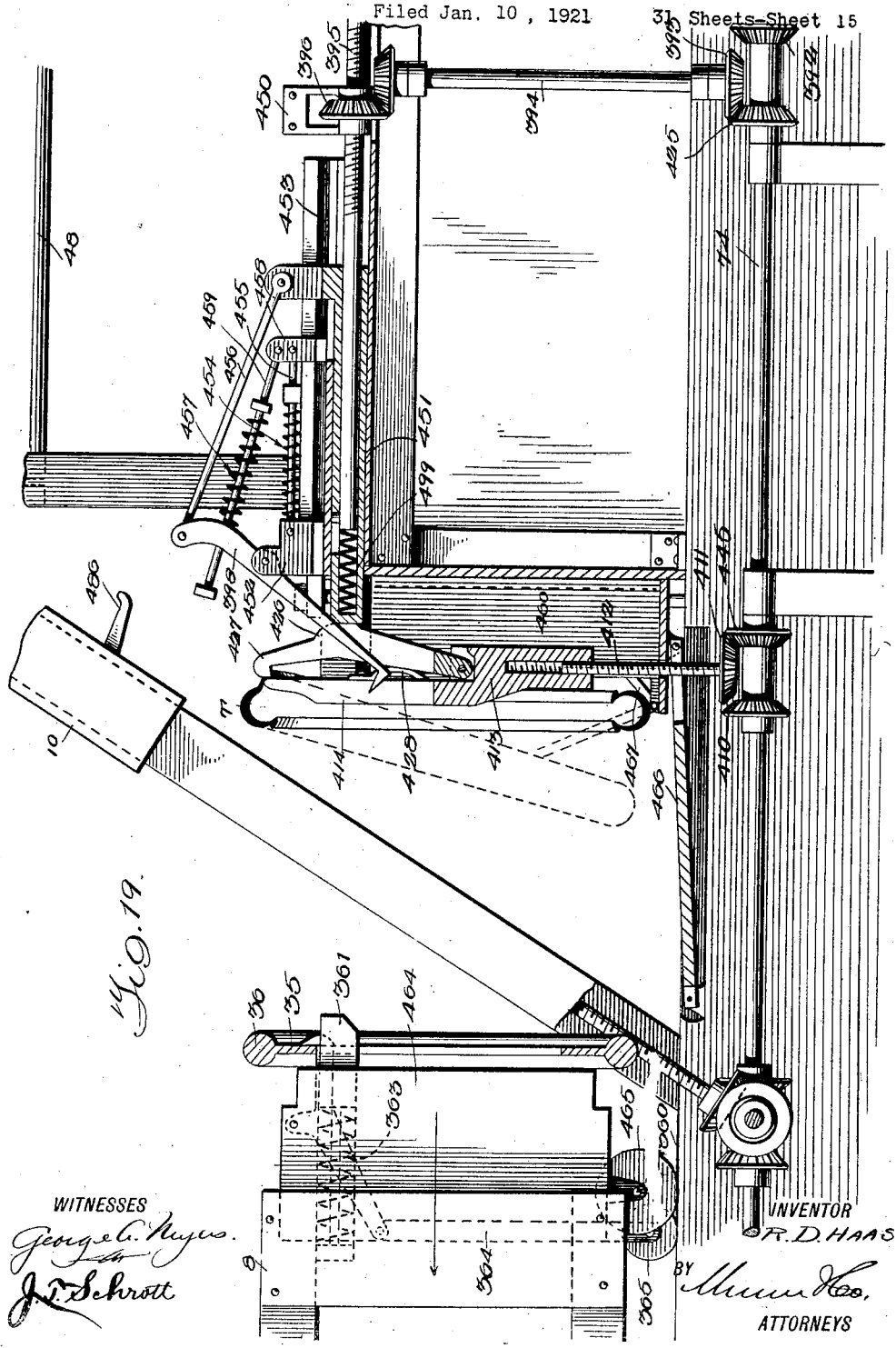

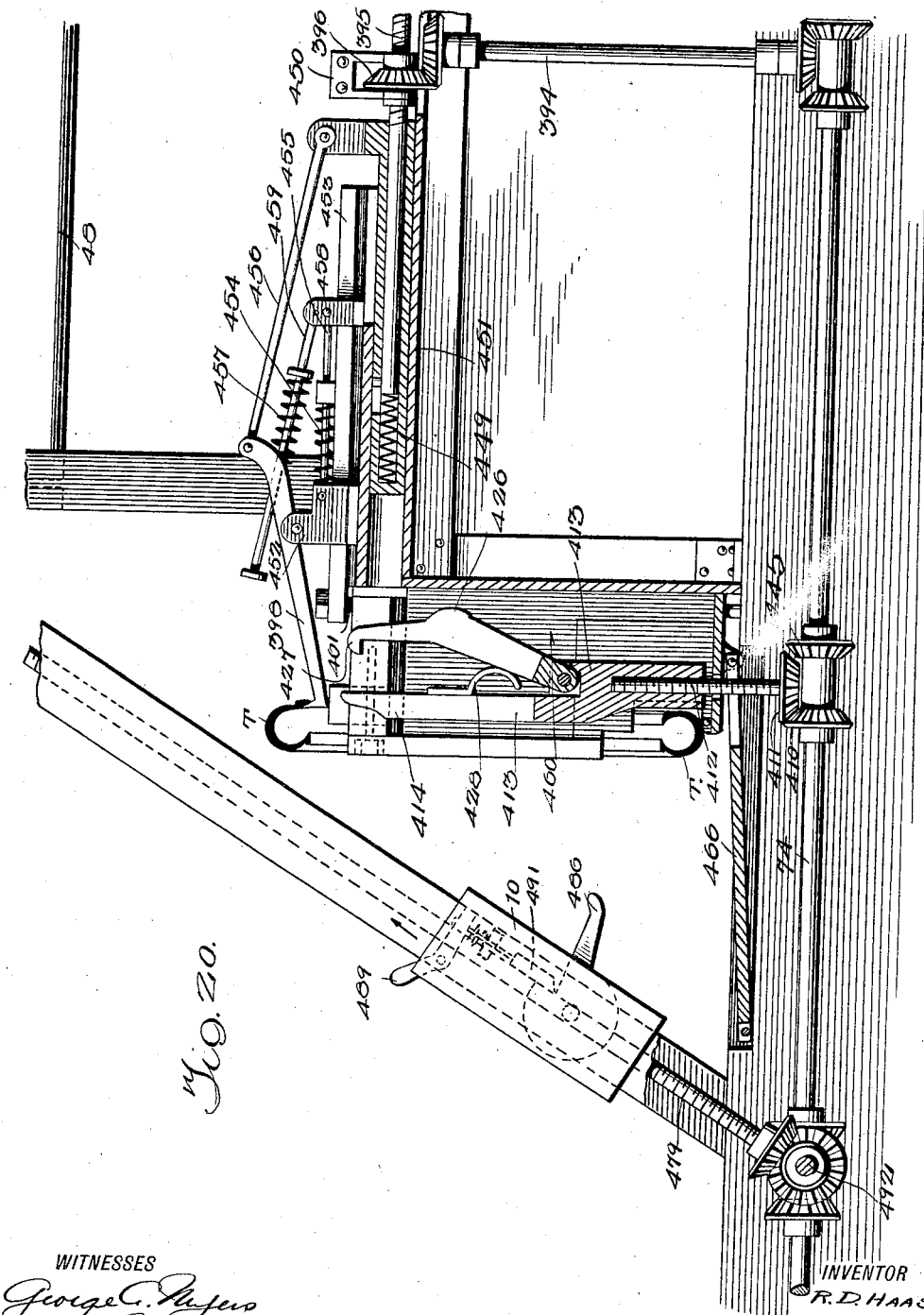

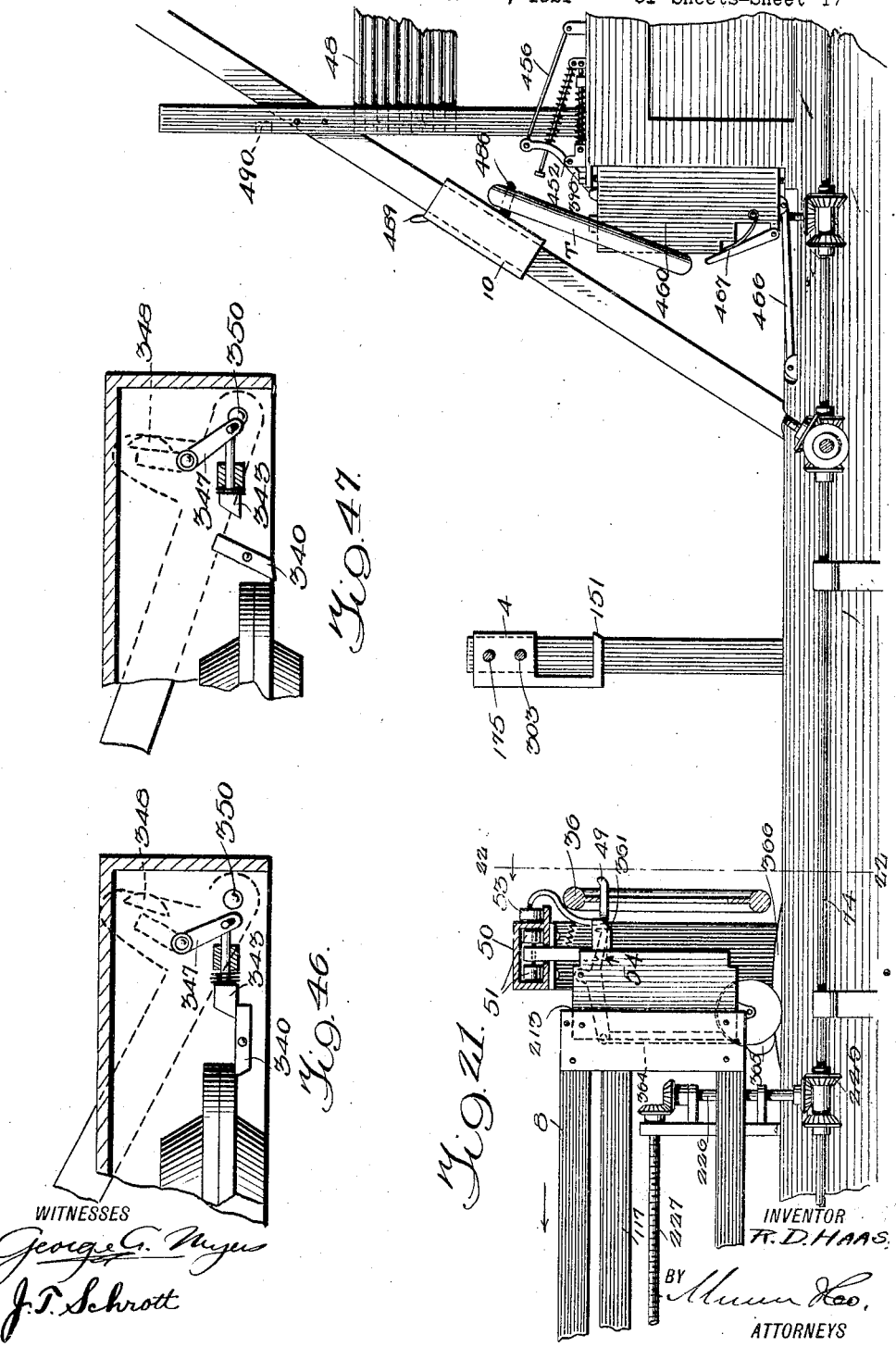

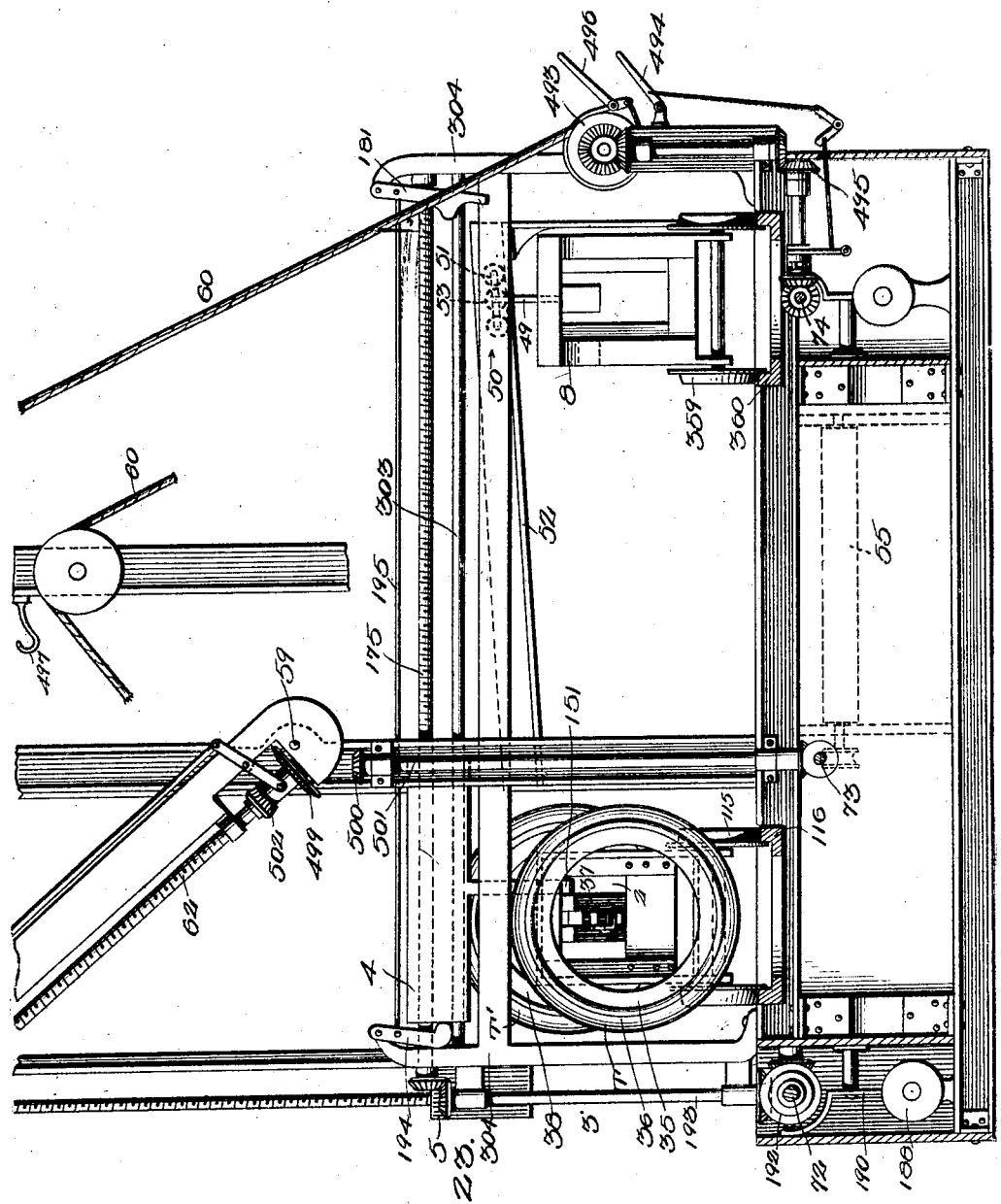

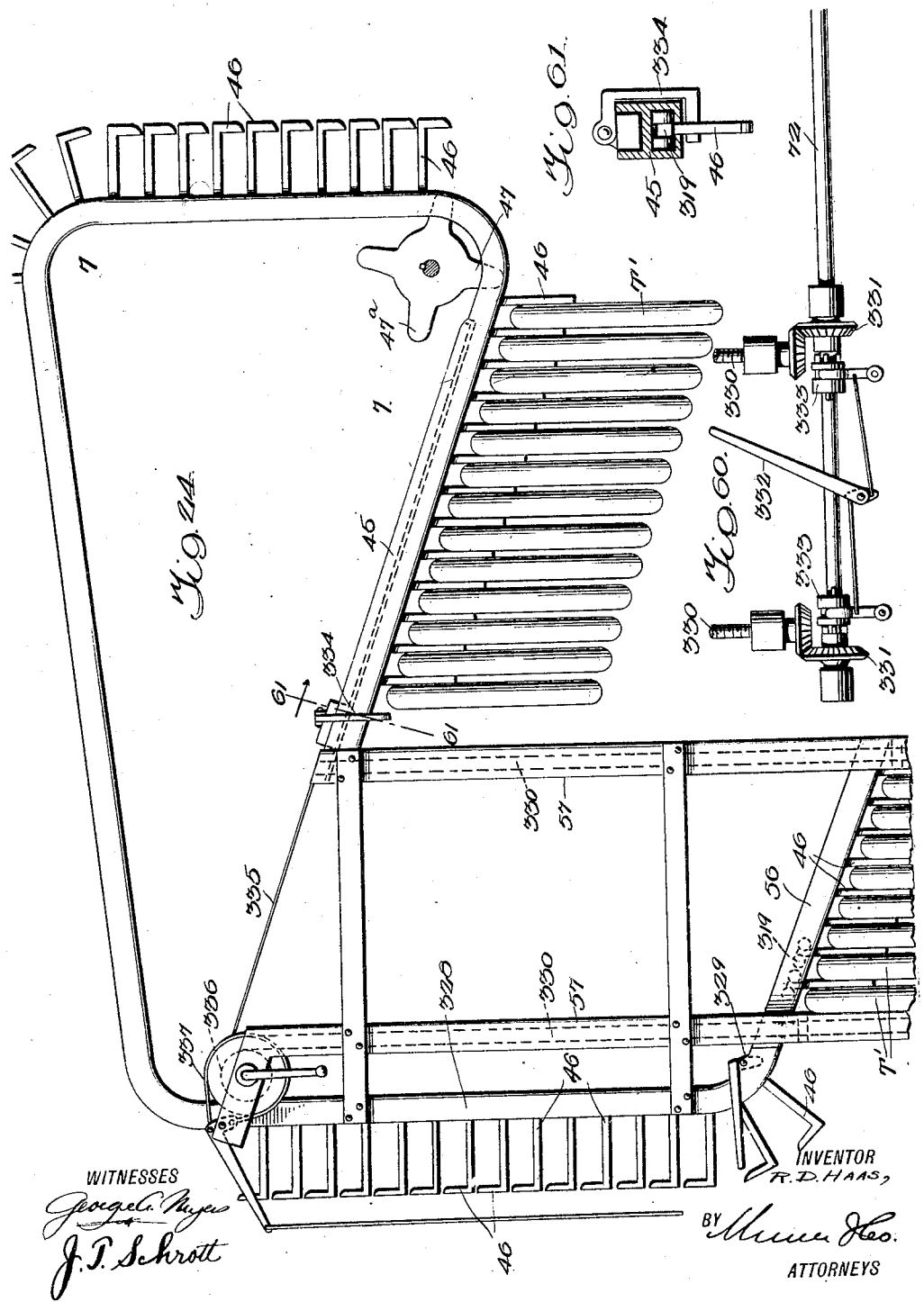

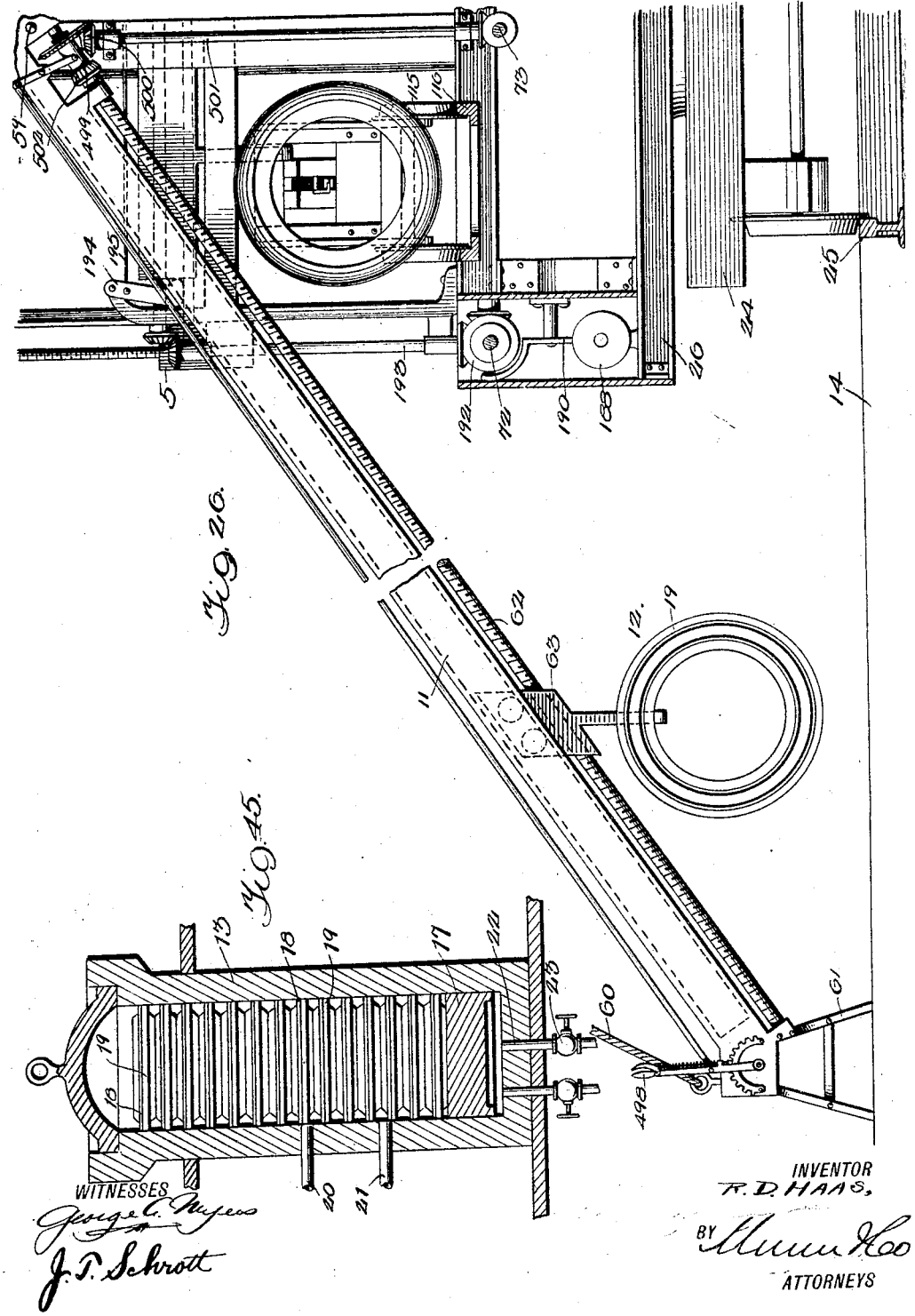

Jan. 6, 1925.
R. DE W. HAAS
1,522,446
MOLD HANDLING MECHANISM FOR TIRE CURING APPARATUS
Filed Jan. 10, 1921        31 Sheets-Sheet 21
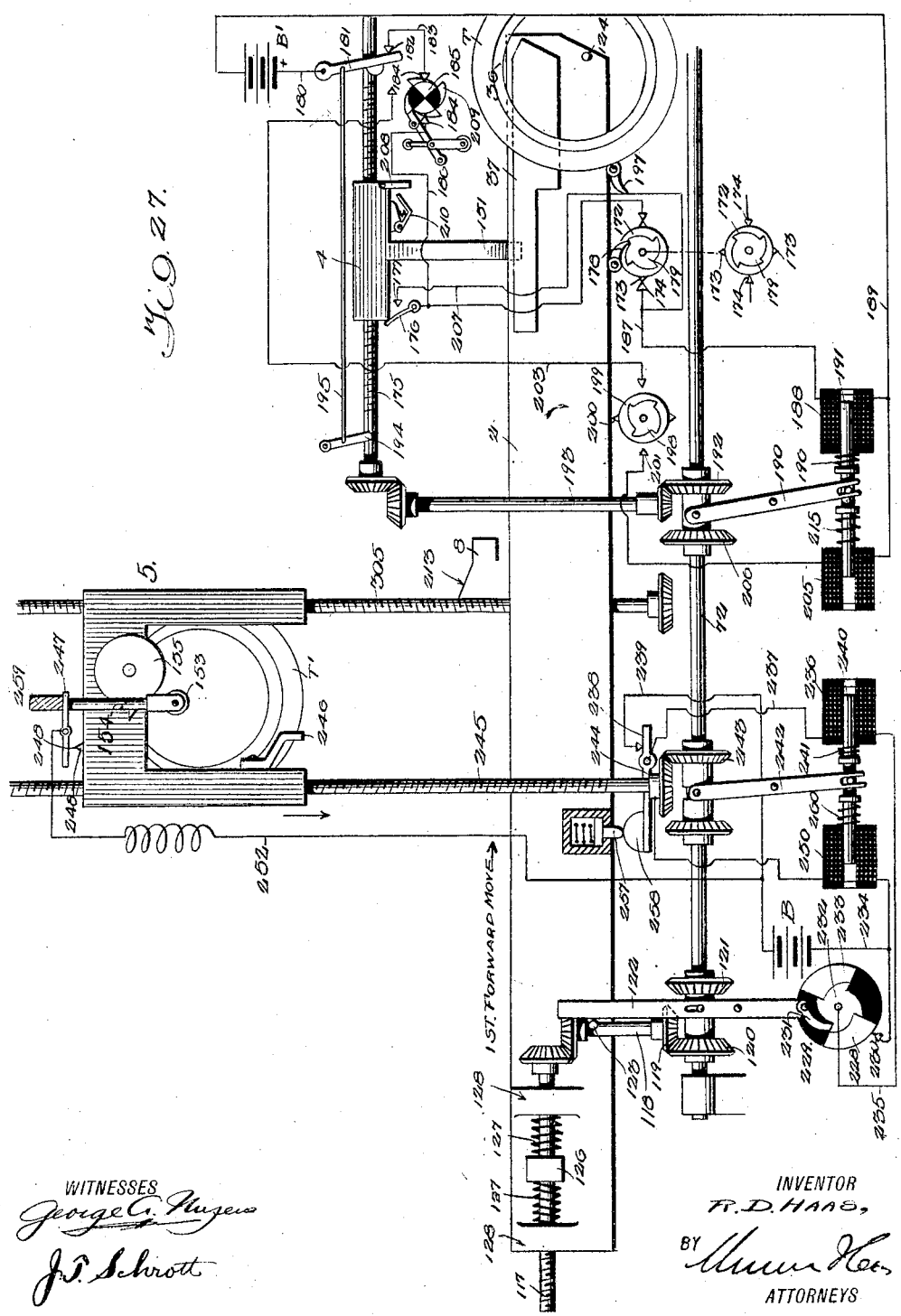
WITNESSES
George G. Shugers
J.P. Schrott
INVENTOR
R. D. Haas,
BY
ATTORNEYS

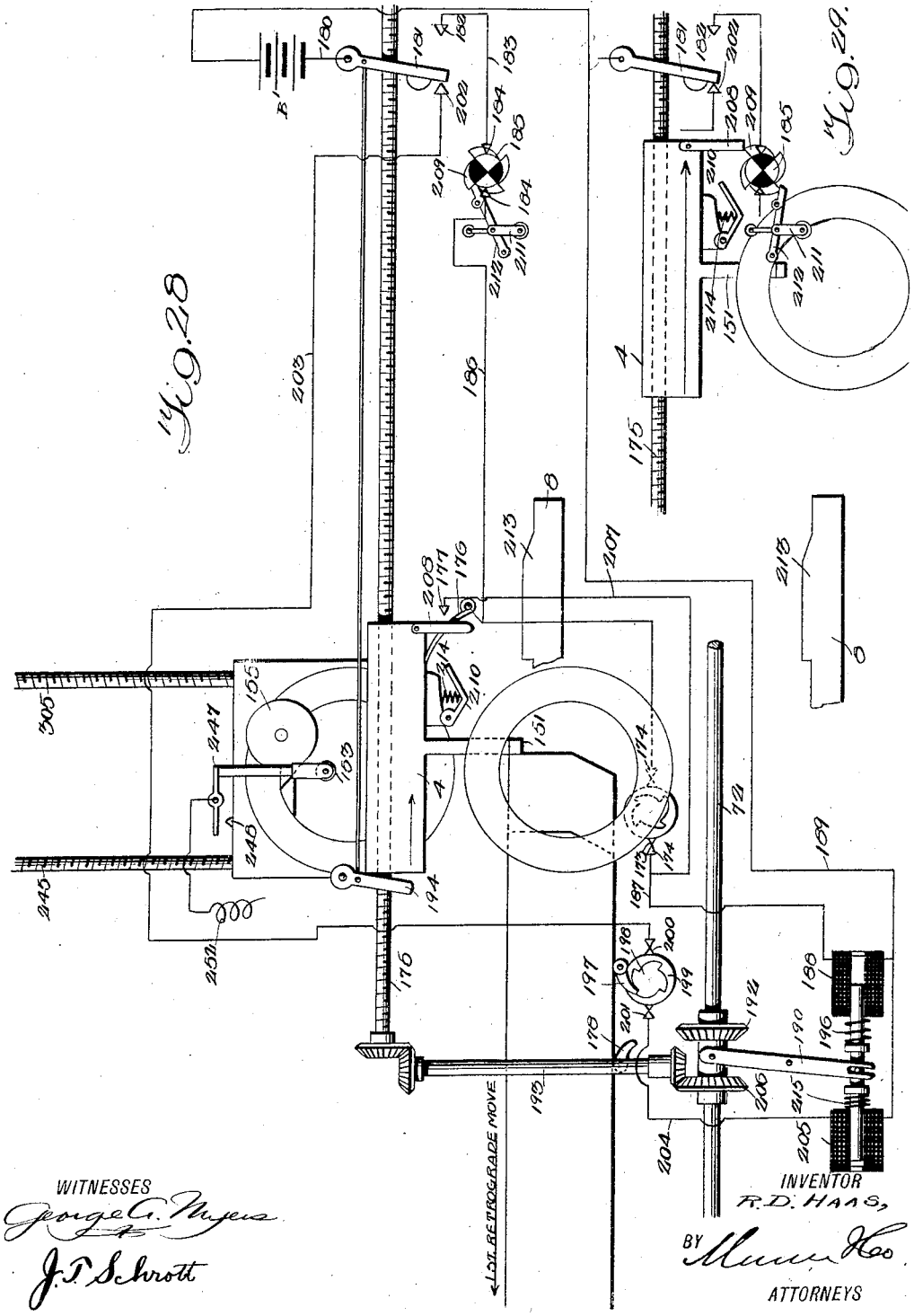

Jan. 6. 1925.
R. DE W. HAAS
1,522,446
MOLD HANDLING MECHANISM FOR TIRE CURING APPARATUS
Filed Jan. 10, 1921   31 Sheets-Sheet 23
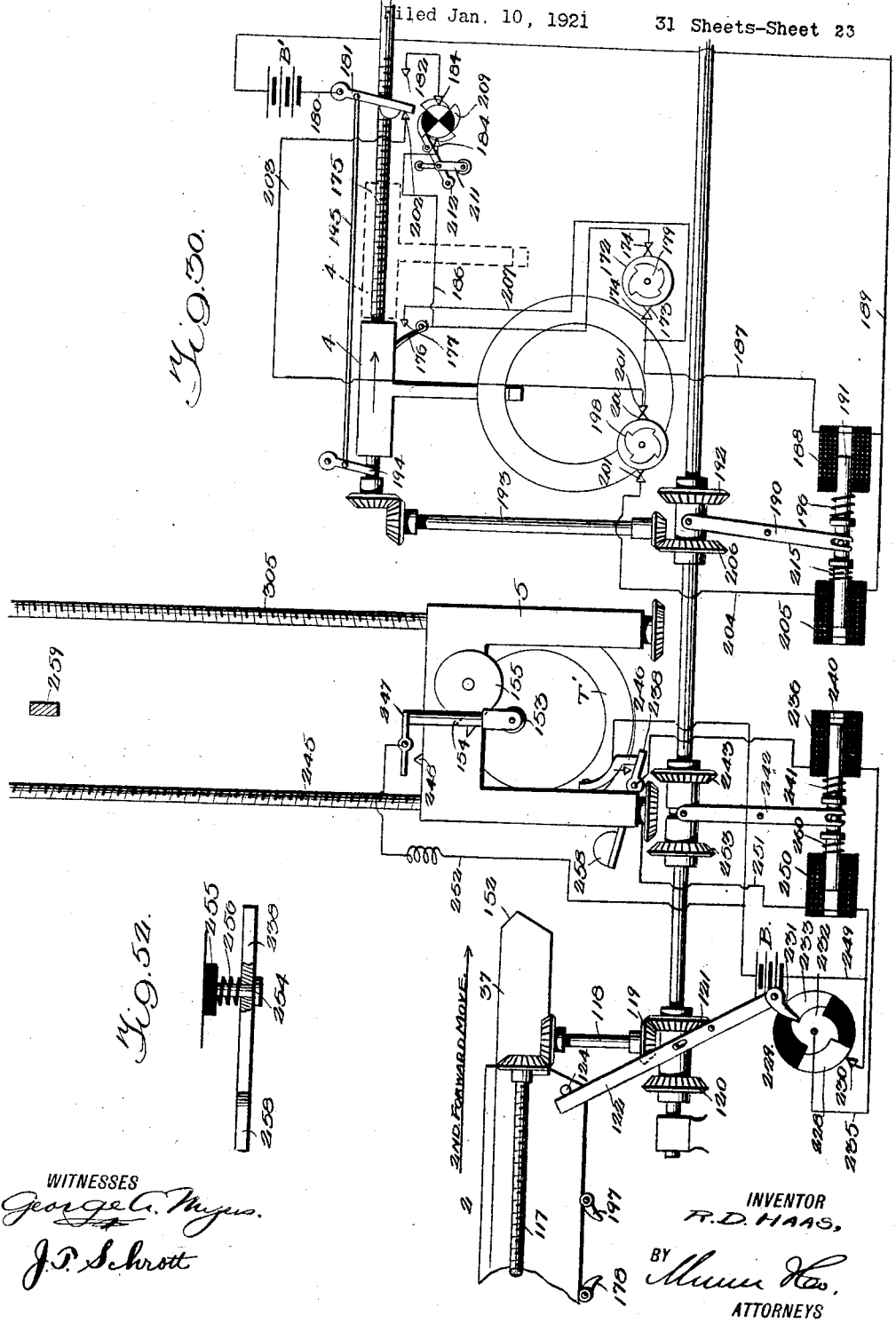
WITNESSES
George G. Myers.
J. P. Schrott
INVENTOR
R. D. Haas,
BY
ATTORNEYS Jan. 6, 1925.
R. DE W. HAAS
1,522,446
MOLD HANDLING MECHANISM FOR TIRE CURING APPARATUS
Filed Jan. 10, 1921      31 Sheets-Sheet 24
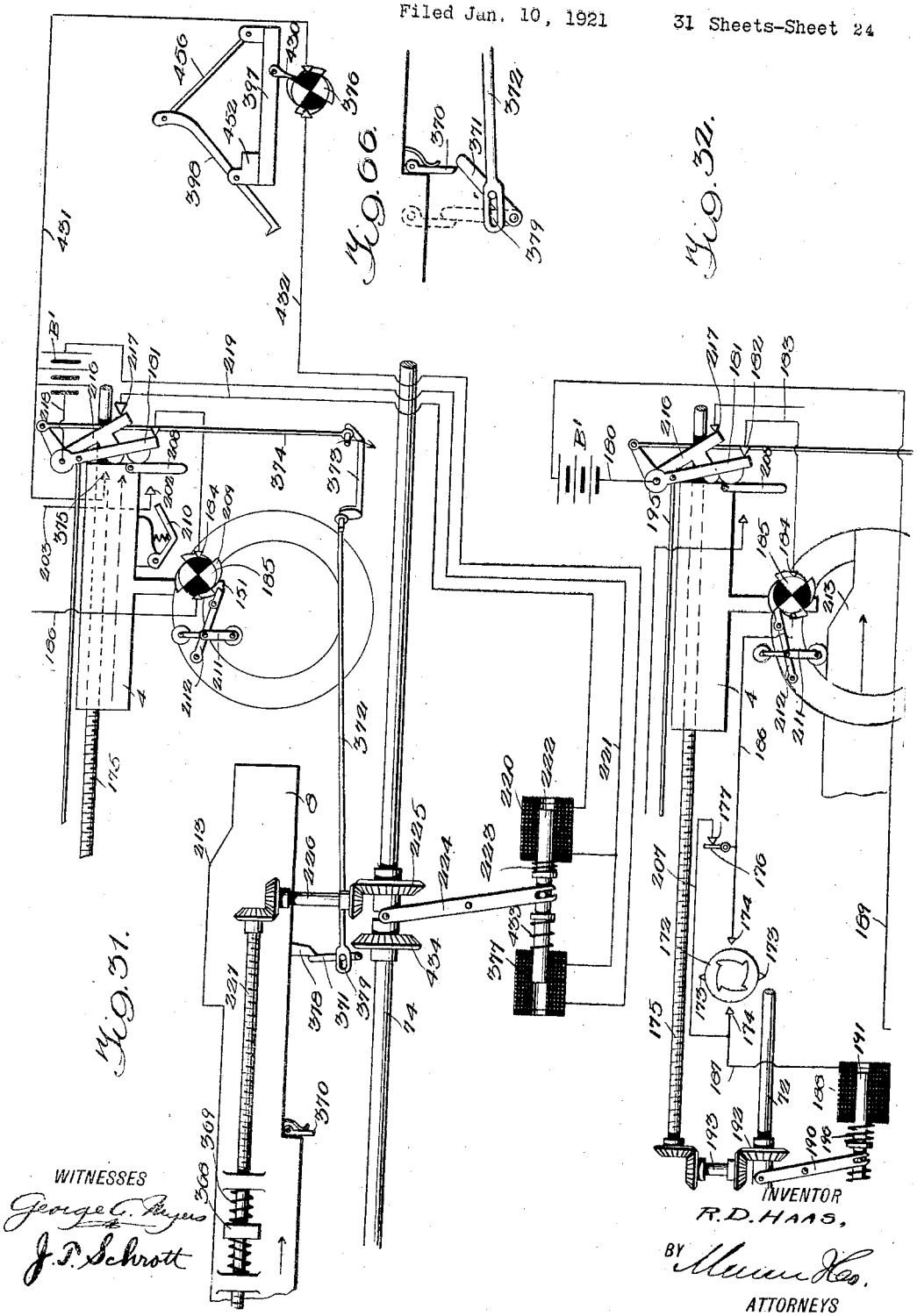
WITNESSES
George C. Reyes
J. P. Schrott
INVENTOR
R. D. HAAS,
BY
ATTORNEYS

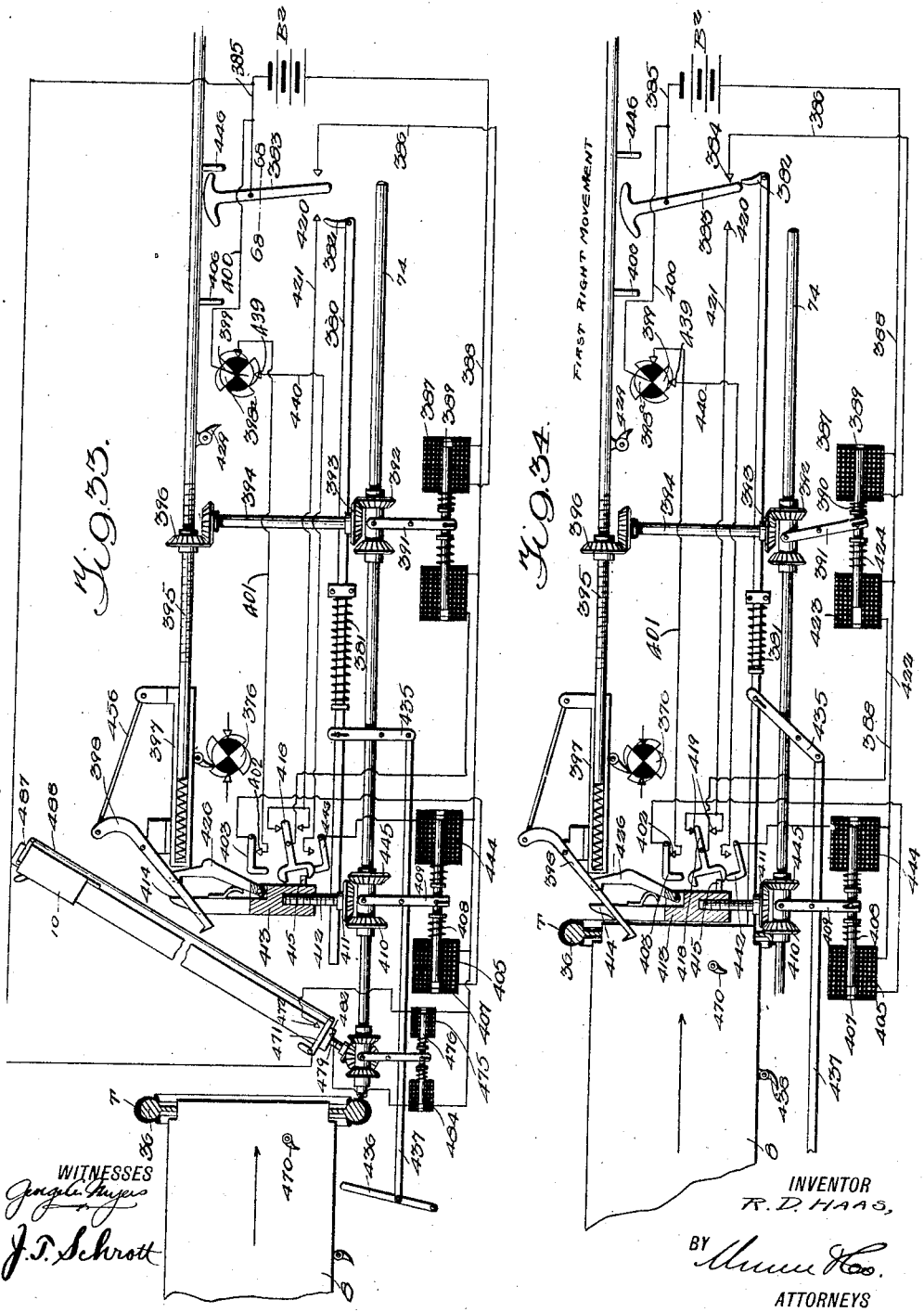

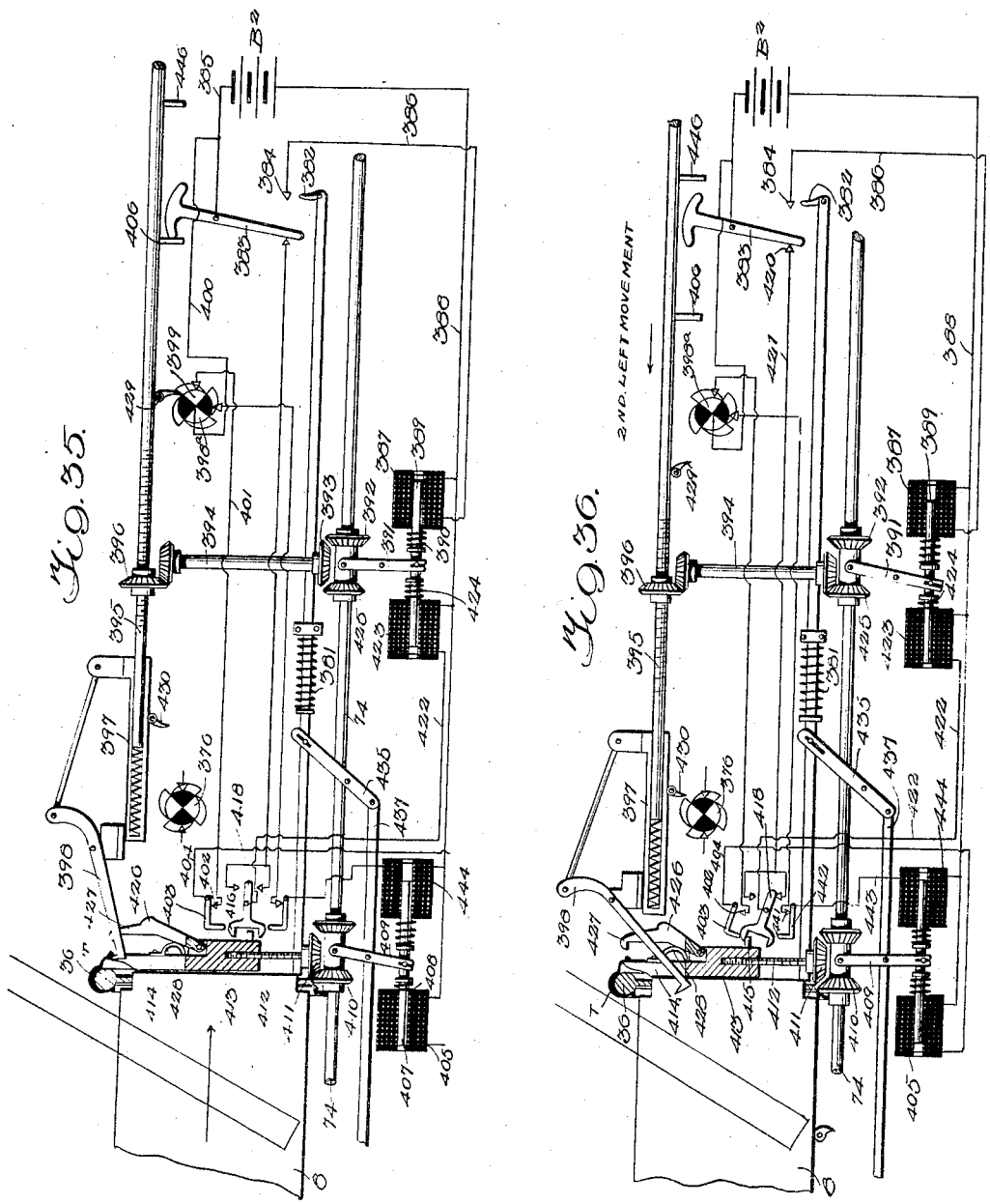

Jan. 6. 1925.
R. DE W. HAAS
1,522,446
MOLD HANDLING MECHANISM FOR TIRE CURING APPARATUS
Filed Jan. 10, 1921 31 Sheets-Sheet 27
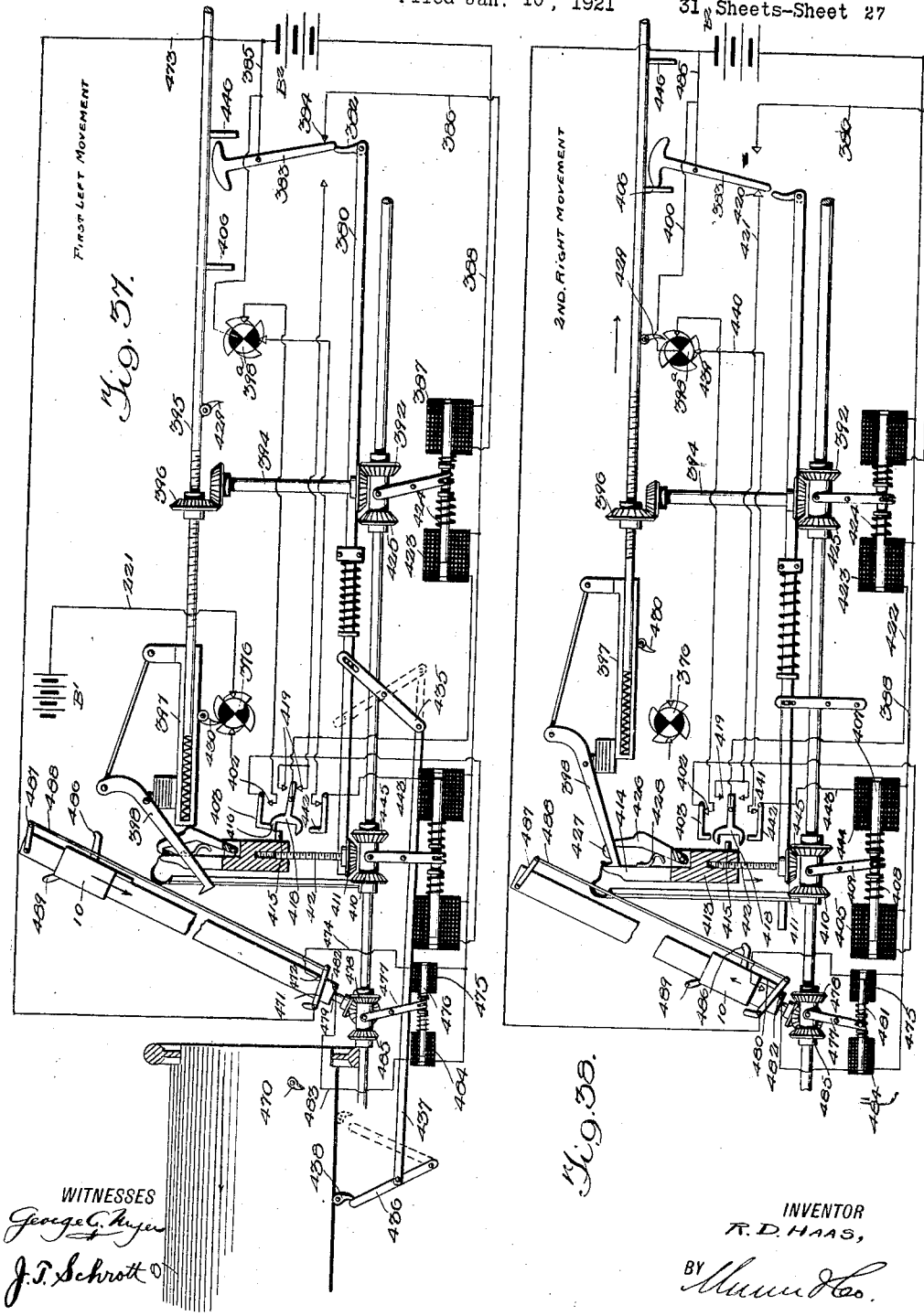
WITNESSES
INVENTOR
R. D. HAAS,
BY
ATTORNEYS Jan. 6, 1925.
R. DE W. HAAS
1,522,446
MOLD HANDLING MECHANISM FOR TIRE CURING APPARATUS
Filed Jan. 10, 1921    31 Sheets-Sheet 28
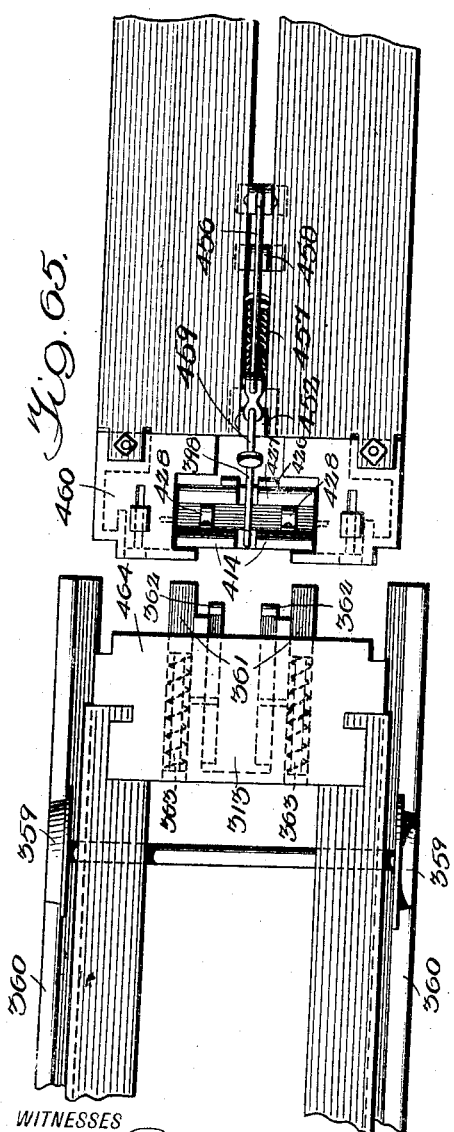
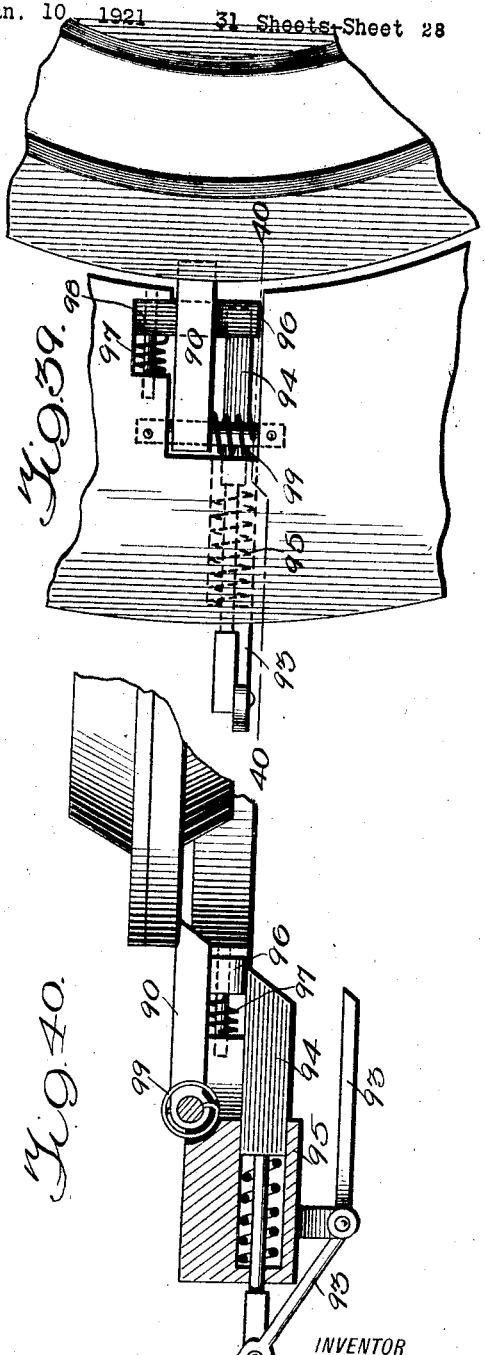

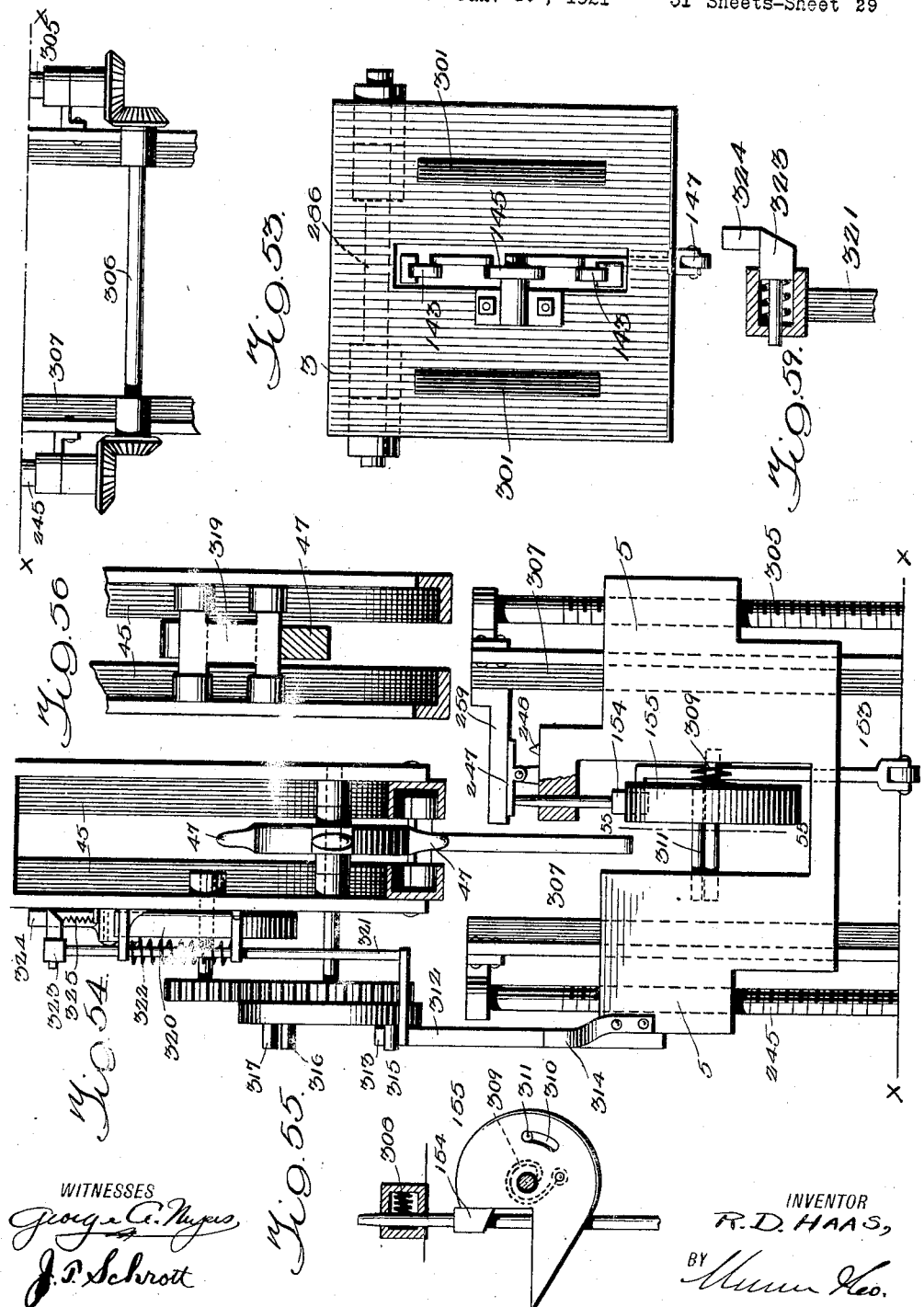

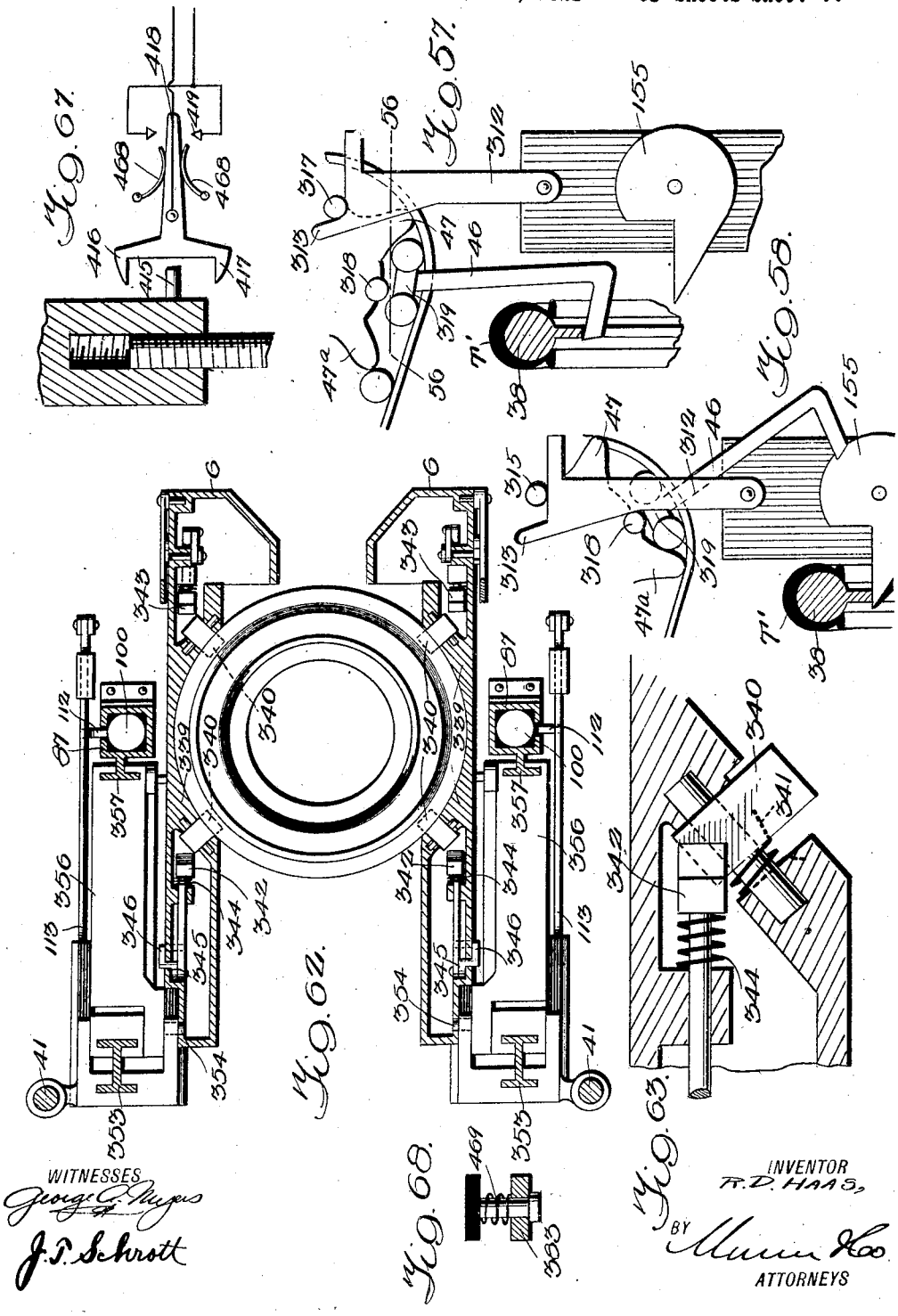

Patented Jan. 6, 1925.

1,522,446

UNITED STATES PATENT OFFICE.

RAWLEY DE WITT HAAS, OF GAFFNEY, SOUTH CAROLINA.

MOLD-HANDLING MECHANISM FOR TIRE-CURING APPARATUS.

Application filed January 10, 1921. Serial No. 436,290.

*To all whom it may concern:*

Be it known that I, RAWLEY DE WITT HAAS, a citizen of the United States, and a resident of Gaffney, in the county of Cherokee and State of South Carolina, have invented certain new and useful Improvements in Mold-Handling Mechanism for Tire-Curing Apparatus, of which the following is a specification.

My invention relates to improvements in that class of machinery wherein a multiplicity of functions are performed without the aid of manual manipulation or supervision, commonly known as automatic machinery, in this particular case consisting of mechanism for cooperating with tire curing apparatus to handle the tires both coming from and going into said apparatus, and it consists in the constructions, combinations, and mode of operation herein described and claimed.

One of the foremost objects of the invention is to provide a mechanism with all necessary and constituent parts self contained, so arranged that it may run alongside of a battery of curing cylinders, be made to stop at any one, receive the cured tire casings therefrom, dispose of them, and place a substitute charge of uncured tire casings in the now vacant cylinder.

A further object of the invention is to provide a mechanism for handling the heavy molds by which tire casings are contained, this mechanism including means for accepting the molds containing freshly cured casings from a curing cylinder, means for removing the cured casing from the mold, means for substituting an uncured casing, closing the mold and placing it in position, with others, for replacement in the curing cylinder.

A further object of the invention is to provide a tire casing handling mechanism wherein all of the foregoing, and many other, functions are performed automatically.

Other objects and advantages will appear in the following specification, reference being had to the accompanying drawings, in which, Figure 1 is a plan view intended to principally show the general outline of the mold handling mechanism and its relationship to a battery of curing cylinders, many of the details being omitted to serve this purpose, Figure 2 is a side elevation, largely diagrammatic, of the tire handling mechanism, showing it run in place adjacent one of the curing cylinders or heaters, the lid being removed in readiness for operations, Figure 3 is a horizontal sectional view of the rotary mold head, taken on the line 3—3 of Figure 2, Figure 4 is a detail view illustrating the shiftable mechanism for respectively turning the platform in respect to the wheeled truck, and the mold head in respect to the platform, Figure 5 is a diagram illustrating step #1 in the operation of the machine, a stack of molds in one of the compartments of the mold head awaiting removal, Figure 6 is a diagram illustrating step #2 wherein the transfer table has arisen to remove a mold and the primary carriage is advancing to receive the mold, Figure 7 is a diagram of step #3 wherein the transfer table has fallen to its original position by the weight of the mold, and the primary carriage is almost in position to receive it, Figure 8 is a diagram illustrating step #4 wherein the primary carriage has come upon the mold and gripped the outermost half section and core to remove them from the innermost half section held by the transfer table, Figure 9 is a detail section of the same part shown in association with the transfer table in Figure 8, but on a slightly larger scale, illustrating the various mold section grippers, etc., Figure 10 is a diagram of step #5 wherein a separation of the core carrying the cured tire, and the outer half section, has taken place, the primary carriage being retracted to its original position, Figure 11 is a detail section illustrating step #6 wherein a new core with an uncured tire is deposited on the primary carriage extension preliminary to closing the half sections of the mold, Figure 12 is a diagram illustrating step #7 wherein the mold sections are closed upon the new core and uncured tire, the transfer table grippers having released the inner half section, but the primary carriage grippers still engaging the mold, Figure 13 is a diagram illustrating step #8 illustrating the retrograding primary carriage extension as having deposited the closed mold in the transposing elevator, then in position to receive it, Figure 14 is a diagram illustrating step #9 wherein the transposing elevator is about to deposit the mold with its new core and tire on top of the stack of molds in that compartment of the mold head now under consideration, Figure 15 is a diagram illustrating step #1 of the secondary carriage which runs parallel to the primary carriage, showing the transverse core conveyor as having carried the separated core with its cured tire, from the position shown in Figure 10, Figure 16 is a diagram illustrating step #2 of the secondary carriage, wherein it has removed the core and cured tire from the transverse core conveyor, Figure 17 is a section taken substantially on the line 17—17 of Figure 1 showing the core stripping mechanism in the original receptive position, Figure 18 is a section illustrating step #3 of the secondary carriage, wherein it has reached the core stripping mechanism and the parts are ready to strip the cured tire from the core, Figure 19 is a diagrammatic section illustrating step #4 of the secondary carriage, showing the tire as having been stripped from the core, said carriage being in its retrograde movement with the core, Figure 20 is a section similar to that part at the right of Figure 19, showing the cured tire awaiting removal by the tire elevator, Figure 21 is a diagram illustrating step #6 of the secondary carriage, wherein the tire elevator is in the act of removing the cured tire and the secondary carriage is still in its retrograde movement.

Figure 22 is a cross section taken substantially on the line 22—22 of Figure 21, showing the empty core conveyor as having taken the empty core from the still retrograding secondary carriage in Figure 21, in readiness to be dropped on the roller platform and temporarily disposed of, Figure 23 is a cross section on the line 23—23 of Figure 10, showing details of the transverse core conveyor, also illustrating the empty core conveyor in the background, Figure 24 is a detail side elevation of the uncured tire supply conveyor which cooperates with the uncured tire elevator, for example, in Figures 7 and 10, in supplying the primary carriage with a new core and uncured tire to be subsequently enclosed by the mold sections, Figure 25 (found on sheet 6) is a detail side elevation of the tire release mechanism occupying a place in the lower corner of the conveyor in Figure 24, Figure 26 is a section taken substantially on the line 26—26 of Figure 1, showing the mold remover in operative position, it being noted, however, that this remover is but seldom used, Figure 27 is diagram #1 of the electric mechanism accompanying the operations of the primary carriage in Figure 8, the transverse core conveyor and the uncured tire elevator, Figure 28 is diagram #2, showing the electric mechanism in position to accompany the dotted line position of the primary carriage extension in Figure 10, Figure 29 is diagram #3 showing the transverse core conveyor as having about completed its transverse movement begun in Figure 28, Figure 30 is diagram #4 illustrating the position of the primary carriage following that in Figure 28, a new core and uncured tire having been brought down by the uncured tire elevator into position to be taken up by the extension of the primary carriage, Figure 31 is diagram #5 showing the electric mechanism brought in operation when the transverse core conveyor ends its movement and the secondary carriage begins its forward travel, Figure 32 is diagram #6 of the electric mechanism accompanying the parts in Figure 16, the secondary carriage being about to remove the core and cured tire from the transverse core conveyor, on its way to the core stripping mechanism, Figure 33 is diagram #7 of the electric mechanism accompanying the secondary carriage in its positions in Figures 16 and 31, in which the secondary carriage is on its way to the stripping mechanism with the core and a cured tire, Figure 34 is diagram #8 nearly corresponding with Figure 17, Figure 35 is diagram #9 corresponding wth Figure 18, wherein the secondary carriage has reached the stripping mechanism and the stripping process has begun, Figure 36 is diagram #10 illustrating a position preceding Figure 19, Figure 37 is diagram #11 showing the electrical mechanism brought in operation when the secondary carriage begins its retrograde movement with the empty core, corresponding with Figure 19, Figure 38 is diagram #12 approximately corresponding with Figure 20, wherein the cured tire elevator about begins its upward movement to finally dispose of the cured tire as appears more fully below, Figure 39 is a detail plan view of the mold supporting latch shown at the left of the mold head in Figure 3, Figure 40 is a section on the line 40—40 of Figure 39, showing the latch trip which is actuated by the transfer table when the latter springs up to receive a mold thus released, as in Figure 6, Figure 41 is a detail cross section on the line 41—41 of Figure 3, showing one of the two mold stack supports which hold the mold while the lowermost one in Figure 6 is being removed, Figure 42 is a front elevation of the mold stack support, Figure 43 is a detail sectional view of the check cylinder, for example in Figure 7, by means of which the speed of the descending transfer table with its heavy mold is checked, Figure 44 is a cross section on the line 44—44 of Figure 15, showing how the divided counter shaft which drives the screw shafts of the tire elevator is in turn driven from the third main shaft, Figure 45 is a vertical section of one of the curing cylinders or heaters, showing a number of molds in place, Figure 46 is a detail section of one end of the transposing elevator showing the latches in the normal mold-supporting position, Figure 47 is a similar view showing how the latches are tripped to release the mold, Figures 48 and 49 are detail views of one of the transposing elevator shoes, Figure 50 is a detail plan view of the ramp solenoid with its primary and secondary ramps in Figure 12, Figure 51 is a detail view showing how the core grips of the primary carriage extension, engage the flange of a core when the primary carriage reaches the transfer table, Figure 52 is a detail sectional view illustrating the mounting of the switch arm 238 in Figure 30, Figure 53 is a detail elevation of the transfer table 3, shown, for example, in Figure 5, Figure 54 is a detail section taken substantially on the line 54—54 of Figure 25, illustrating the mechanism by which new cores and uncured tires are transferred to the uncured tire elevator 5, Figure 55 is a detail section taken substantially on the line 55—55 of Figure 54, showing the core support of the uncured tire elevator, Figure 56 is a detail section taken substantially on the line 56—56 of Figure 57, showing how a core-supporting carriage runs on the double track of the uncured tire supply conveyor 7, Figure 57 is a diagrammatic view illustrating the first step in releasing a new core from said elevator, when the elevator 5 rises to receive it, Figure 58 is a similar view illustrating the second step, wherein said elevator has received the new core, and the carriage which formerly bore it, is moved around out of the way, Figure 59 is a detail sectional view of the spring latch in Figure 54, by which a certain brake is released, Figure 60 is a detail view illustrating the shifting mechanism by which the elevator bar of the uncured tire supply conveyor in Figure 24, is set in motion, Figure 61 is a detail cross section taken on the line 61—61 of Figure 24, Figure 62 is a horizontal section taken substantially on the line 62—62 of Figure 14, illustrating the latch mechanism, now released, of the mold in the transposing elevator, Figure 63 is a detail enlarged section illustrating one of the latch mechanisms, Figure 64 is a detail front elevation of a part of the transposing elevator, showing the flared entrance which cooperates with an adjacent guide, Figure 65 is a plan view illustrating cooperating mechanism of the stripping apparatus and the secondary carriage which cooperates therewith, Figure 66 is a detail view to be considered in connection with Figure 31, described more fully below in connection with that view, Figure 67 is a detail view of the mid-switch illustrated and described in connection with Figure 33 et seq.;

Figure 68 is a detail horizontal section on the line 68—68 of Figure 33,

Figure 71 is a detail view showing how the three main shafts are uni-directionally driven;

Figure 1:
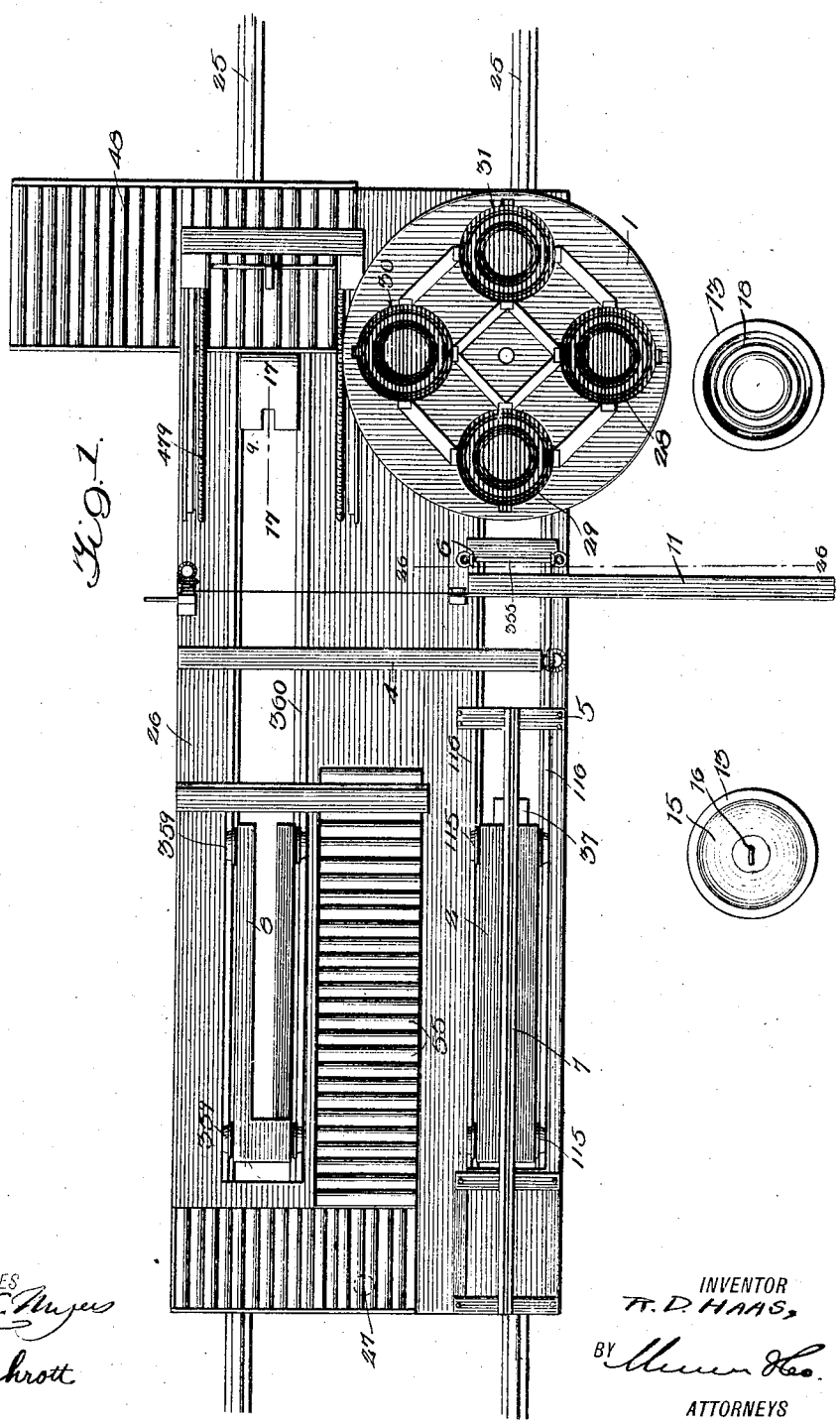

The plan adopted in the description below is to define the construction and at the same time describe the mode of operation of such construction, and in order that the reader may intelligently follow both, as well as to first gain a general knowledge of the purpose of the machine, the description is divided into the following subjects: general survey of the field of use, general construction and mode of operation, the mold head 1, the primary carriage 2, the transfer table 3, the transverse core conveyor 4, the uncured tire elevator 5, the transposing elevator 6, the uncured tire supply conveyor 7, the secondary carriage 8, the core stripping mechanism 9, the cured tire elevator 10, the mold remover 11, and the mold 12. Let us begin with the General survey of the field of use to which the tire handling mechanism applies. It is intended to eliminate to a large extent the great expense and abnormal amount of work required in curing automobile tires or casings according to present methods. The reader may picture to himeslf a battery of from ten to twenty heaters or tire curing cylinders standing in a row.

These heaters are usually quite tall, standing on one floor and projecting a number of feet beyond the floor above. Each heater is filled with molds containing tire casings. There may be twenty of these molds in each heater, and the tires are cured by letting in steam so as to heat the molds to the requisite temperature and for the proper length of time.

Figure 2:
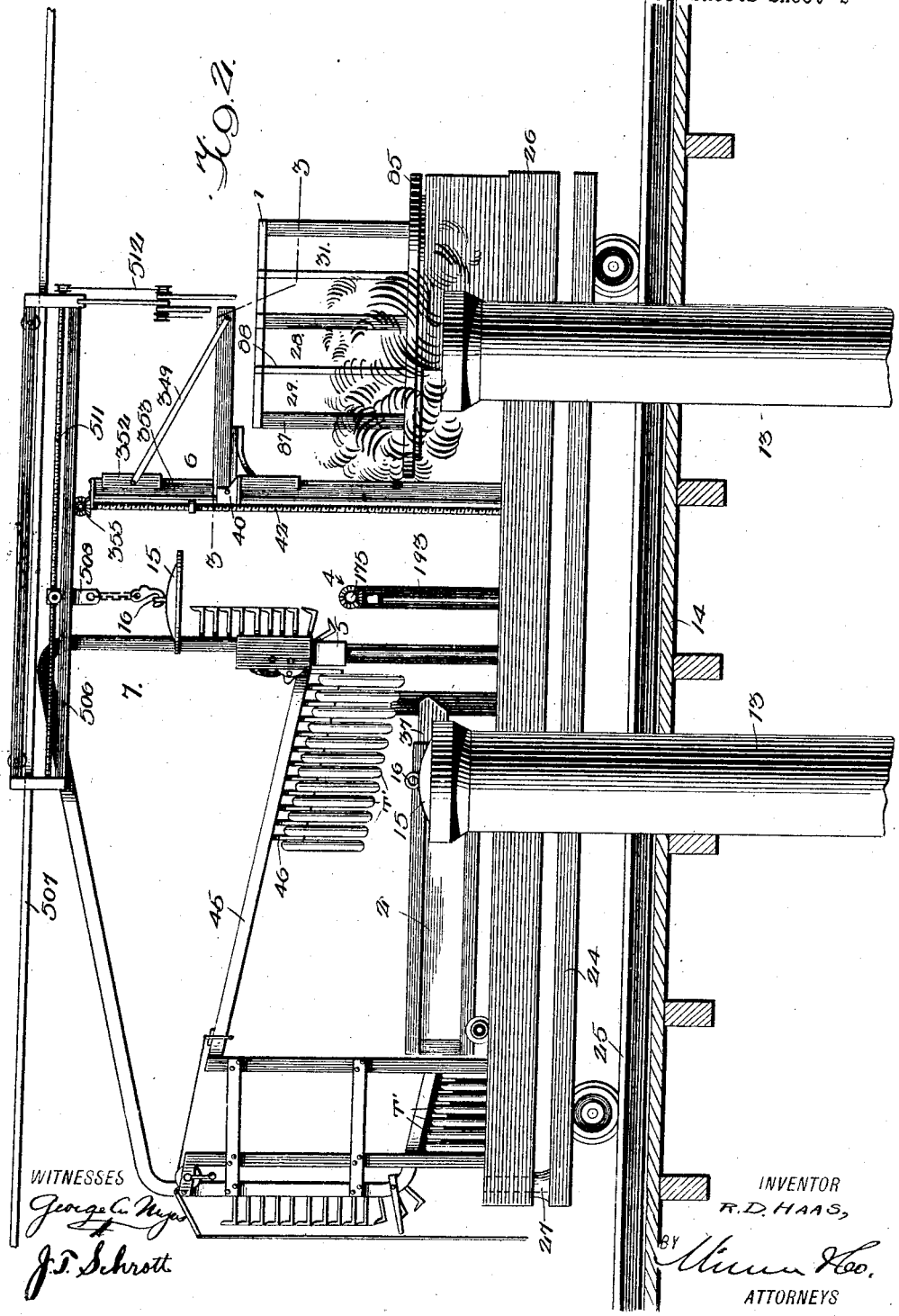

There is a huge belt running alongside of the battery of heaters; two or three men usually stand by a heater, drag the hot molds out one by one and lay them on the belt so that they can be carried to a suitable place where a large number of men remove the cured tires from the molds, take the tires off of the cores, re-fill the open molds, and send them back to the heaters where they are placed for their curing process in turn. The herein disclosed mechanism entirely does away with this somewhat primitive mode of handling the molds, etc., one or two men being sufficient to care for the machine, the majority of its internal operations being wholly automatic. This leads to the general construction and mode of operation of the machine. Figures 1 and 2 show several heaters 13, of which there may be a battery composed of possibly twenty. They extend several feet above the upper floor 14. Each has a heavy lid 15 with an eye 16 by which the lid is lifted to gain access to the molds inside.

One of the heaters 13 is shown in Figure 45. It consists of nothing but a plain cylinder with a piston 17 at the bottom. A stack of say twenty molds, consisting of half sections 18, 19, is piled on this piston. Steam, for the curing of the tires inside of the molds, is let in at the pipe 20 and the exhaust steam is let out at the pipe 21.

A pipe 22 enters the heater at the bottom beneath the piston and has a valve 23 which is turned on to admit steam for the raising of the piston 17 and the consequent projection of five of the molds above the mouth of the heater, granting of course that the lid 15 has been removed. But the tire handling machine must be run up in position beside the heater 13 before the five molds are projected out of the mouth.

For the purpose of running the wheeled truck 24 beside any one of the heaters, a track 25 is provided and may be said to take the place of the customary belt spoken of above. The truck 24 being in proper position, the platform 26 is swung on its pivot 27 toward the observer in Figure 1 so that one of the mold compartments 28, 29, 30, 31 is brought directly over the mouth of the heater in readiness to receive the five molds when projected as stated before. At present, only four mold compartments are shown in the mold head 1, but obviously, a greater or lesser number may be provided, four being shown merely to properly dispose of the twenty molds in the heater, for the mold head is made to rotate a number of times until each of the four compartments contains five molds with cured tires therein.

Let us consider each of the four compartments to be filled with five molds. The compartment 29 in Figure 5 stands ready to have its molds removed. The primary carriage 2 is started forwardly, constituting step #1 of its operation, and when its cam 32 strikes the transfer latch 288, the transfer table 3 is swung up by the spring 287 into the position beneath the stack of molds in compartment 29. This constitutes step #2 of the operation, and the primary carriage 2 is still on its first travel.

Figure 7:
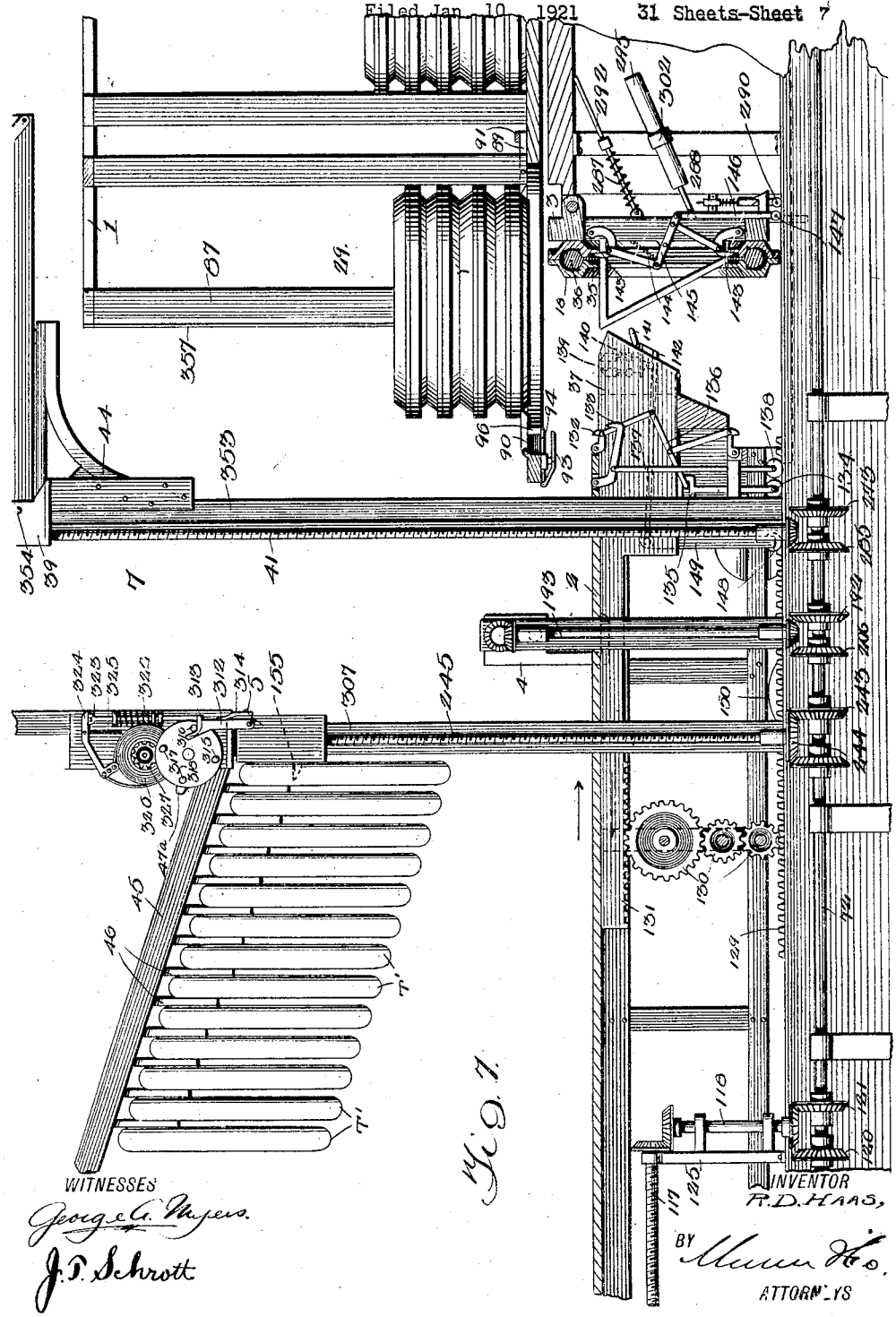

Step #3 of the operation is shown in Figure 7. The transfer table 3 has fallen to its original position due to the weight of the mold 18, 19. The primary carriage 2 presently grips the outer section 18 of the mold and the flange 35 of the core 36 and does actually make these engagements at the time of step #4 in Figures 8 and 9. The primary carriage 2 has ended its first forward movement, reverses and moves on its first retrograde movement. It includes the carriage extension 37 which is retractible in respect to the carriage on the forward movement, and projectible in respect thereto on the backward movement.

The extension carries the core 36 while the carriage 2 carries the outer mold section 18. The inner mold section 19 is retained by the transfer table 3, and thus a separation of the mold sections and core is accomplished. During the first backward movement of the primary carriage 2, the core, shown in dotted lines on the extension 37, also in dotted lines in Figure 10, is deposited on the transverse core conveyor 4. The primary carriage and its extension 37, now minus the core 36, proceeds back to the limit, completing the first retrograde movement.

During the time that the primary carriage 2 was completing its first retrograde movement, the uncured tire elevator 5 came down with a new core carrying an uncured tire T' so that that tire and core stands in position in the path of the extension 37 as illustrated in Figure 10. Step #6 shows the primary carriage 2 as beginning its second forward movement and the new core 38 with its uncured tire being deposited on the extension 37.

The primary carriage 2 continues forwardly on its second movement; the extension 37 retracts in respect to the carriage to move the new core and tire T′ into the half section 18, and when these parts meet the inner half mold section 19, the mold sections are closed, accomplishing step #7, illustrated in Figure 12. The primary carriage now begins its second retrograde movement but travels only a short distance when the transposing elevator 6 is reached. This elevator has come down between the positions in steps #7 and #8 in readiness to receive the now closed mold with its new core and tire. This constitutes step #8, shown in Figure 13.

The transposing elevator 6 is now lifted by the elevator shoes 39 and 40 by means of the screw shafts 41 and 275, until the guide roller 43 reaches the elevator rail 44, whereupon the transposing elevator begins to assume the final horizontal position in Figure 14, wherein step #9 is accomplished. This step consists of releasing the mold containing the new core and uncured tire, so that it falls on top of the stack of molds containing cured tires in the compartment 29. The transposing elevator does not remain at the place shown in Figure 14 but continues on up until it reaches a rest position illustrated for example in Figure 5.

It is approximately at the time of the occurrence of step #5 that the uncured tire elevator 5 performs its function of bringing the new core and tire down into position to be taken off by the extension 37 as in Figure 11. It is well to briefly consider the uncured tire supply conveyor 7 shown in its completeness in Figure 24. Generally speaking, it comprises a track 45 upon which a number of new cores with uncured tires, are run by means of supporting hooks 46. At each operation of the release wheel 47 by the elevator 5 itself, a new core is dropped on that elevator in readiness to be lowered and taken up by the primary carriage extension 37.

Still carrying out the general description of the mode of operation, we must now follow the transverse core conveyor 4 from the time it receives the core 36 with the cured tire thereon in Figure 10. The transverse core conveyor 4 runs transversely of the machine until it reaches the proper place in front of the secondary carriage 8.

Step #1 in the operation of this carriage, illustrated in Figure 15, consists in the beginning of a forward movement, illustrated by the arrow. Its function is to take the core 36 off of the transverse core conveyor 4, and carry it to the core stripping mechanism 9.

Step #2, illustrated in Figure 16, consists in gripping the core and removing it from the transverse core conveyor. The secondary carriage 8 continues to advance until it reaches the stripping mechanism as in Figure 18, wherein step #3 is performed, consisting in beginning the removal of the cured tire T. The stripping mechanism 9 having gripped the tire, the secondary carriage 8 starts back with the empty core 36, thus constituting step #4, shown in Figure 19, step #5 consisting of the beginning of the operation of the cured tire elevator 10 which takes the tire T from the stripping mechanism, carries it up and drops it on the roller platform 48. Step #6, wherein this occurs, is shown in Figure 21.

In the meantime, the secondary carriage 8 has about completed its retrograde movement with the now empty core 36, and when the hook 49 of the core take-off 50 is reached and the core deposited thereon, the carriage 51 starts down the inclined track 52, the roller 53 finally reaching an opening in the track which allows the hook 49 to swing on its pivot 54 to drop the empty core 36 on the roller platform 55. Here the core rolls down to be taken off by an attendant.

Each core is used as a foundation on which to build a new tire, and when a sufficient number of cores and new tires are hung on the elevator bar 56 in Figure 24, that bar is raised in the guides 57 until it comes into alinement with the track 45, when the carriages 319 of the hooks 46 run down the inclined track with the cores attached, in readiness to have the cores taken off one by one by the elevator 5, as already explained.

Situations may arise when the mold 18, 19 is to be removed entirely from the machine, and for this purpose, the mold remover 11, shown in Figure 26, is employed. This mold remover is nothing more than a conveyor comprising a frame hinged at 59 on a support of the machine, capable of being let down by the cable 60 until the legs 61 touch the floor. It includes a screw shaft 62 actuating a remover carriage 63 on which the mold is hung. By means of this remover, the mold is taken out of the machine and perhaps another size substituted.

Reducing the total major operation into a compact form, results in the following schedule:

1. Releasing a mold 18, 19 containing a cured tire T.
2. First forward travel of the primary carriage 2 to secure the mold.
3. The transverse core conveyor 4 accepts the core 36 from the separated mold 18, 19 on the first retrograde movement of the carriage 2.
4. The uncured tire elevator 5 delivers a new core 38 and uncured tire T′ to the primary carriage 2, which makes its second forward movement and closes the mold 18, 19 thereon.
5. The transposing elevator 6 piles the closed mold on the stack in compartment 29 of the mold head 1.

6. The secondary carriage 8 makes only one forward movement and takes the core 36 off the conveyor 4, carrying it to the mechanism 9 where it is stripped.

7. The tire T is disposed of by the cured tire elevator 10; the secondary carriage 8 makes only one retrograde movement with the empty core 36, and the primary carriage 2 makes a second retrograde movement; all parts then being ready to begin again.

Figure 4:
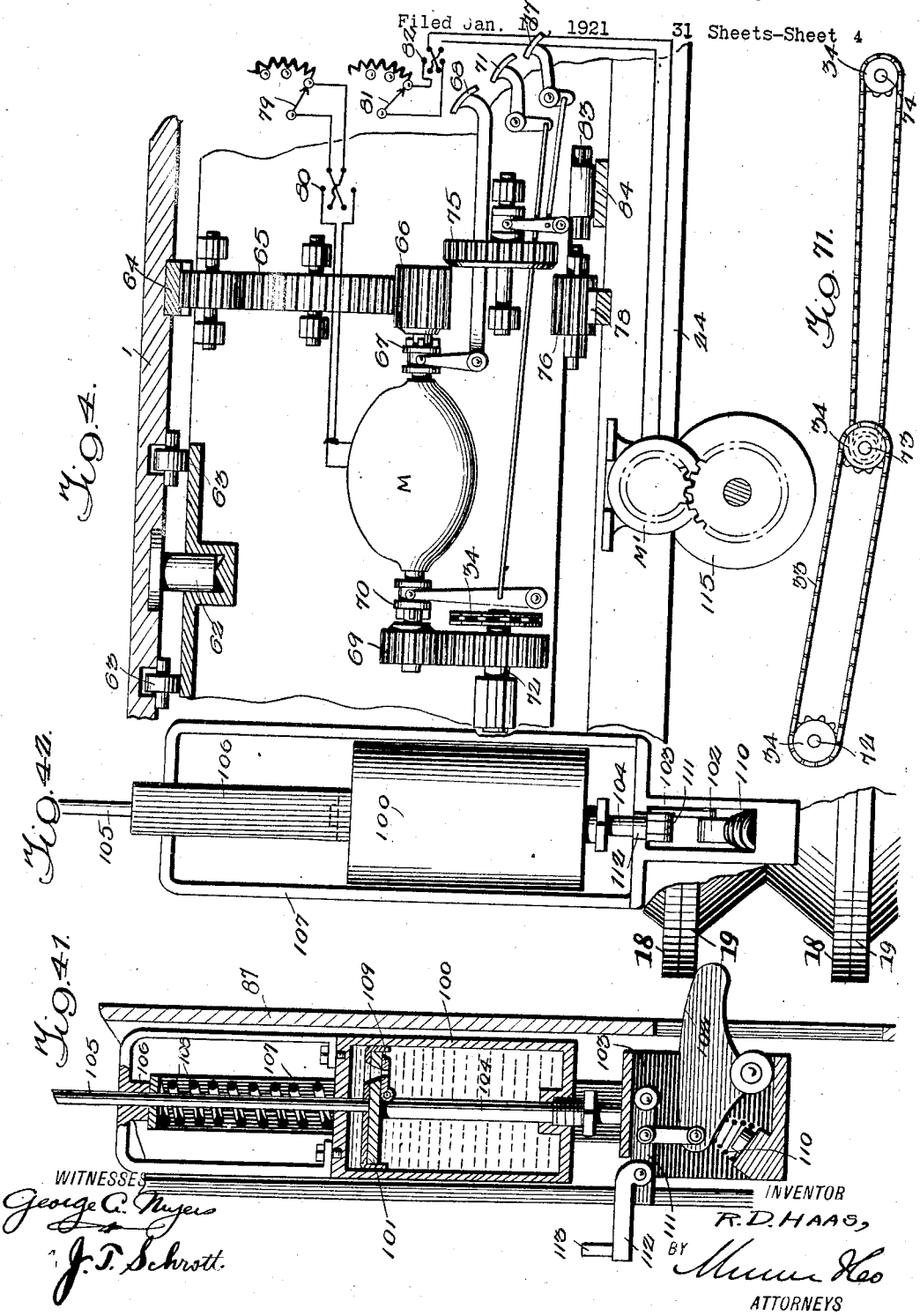

The mold head 1 is considered first in the detailed description of the parts of the machine. It has a step bearing 62, in Figure 4, on which it is readily made to rotate for bringing the various compartments 28, etc., over the mouth of the heater 13. Rollers 63, of sturdy construction, act as auxiliaries to the step bearing and aid in supporting the mold head horizontally. It carries a circular rack 64 underneath, which is driven by the motor M through the gear train 65. This train includes the driving pinion 66, loose on one end of the motor shaft but capable of being locked thereto when the clutch 67 is shifted outwardly by stepping on the treadle 68.

On the other end of the motor shaft there is a main driving pinion 69, also loose, but capable of being locked to the shaft by shifting the clutch 70 on depressing the treadle 71. This pinion drives the first main shaft 72; there are two more main shafts, 73 and 74, driven by chains 33 and sprockets 34 as in Figure 71.

In order to bodily swing the platform 26 on its pivot 27 so as to bring the mold head 1, or more properly, one of the mold compartments, over the heater 13, there is a gear 75 normally inoperative but to be moved into engagement with the driving pinion 66 and the pinion 76 by depression of the treadle 77, so that the pinion 76 may move over the segmental rack 78. The motor M is controlled by the rheostat 79 and reversing switch 80.

Similarly, the motor M' is controlled by a rheostat 81 and reversing switch 82. This motor drives the truck 24 on its rails. The platform 26 carries roller or other suitable bearings 83 which run on a bearing plate 84 on the truck, in front of the rack segment 78 or elsewhere. Consider the mold compartment 29. The construction of this is precisely like the others, so the description of one mold compartment will suffice for all. The base 85 has an opening 86, large enough to let the mold through with ease, bounded by three standards, two of which 87 are tubular and diametrically opposite each other, the other, 88, solid, although it too may be tubular. The standard 88 carries a latch 89 which projects beneath the adjacent edge of the lowermost mold in the mold stack, assisting the mold supporting latch 90 to sustain the stack.

The latch 89 is not disturbed during the operation of removing molds with cured tires from beneath the stack. It is only when the compartment 29 is completely filled with molds containing new tires and the compartment 29 is moved in position over the mouth of the heater 13, that the latch bolt 91 is retracted by the manual shifting of the lever 92, to release the bolt 89, allowing it to swing on its pivot and thus let the mold stack fall. Under the same circumstance, the latch trip 93, in Figures 5 and 40, must be struck with some object to retract the supporting latch 90 and completely let go of the mold stack.

Figure 6:
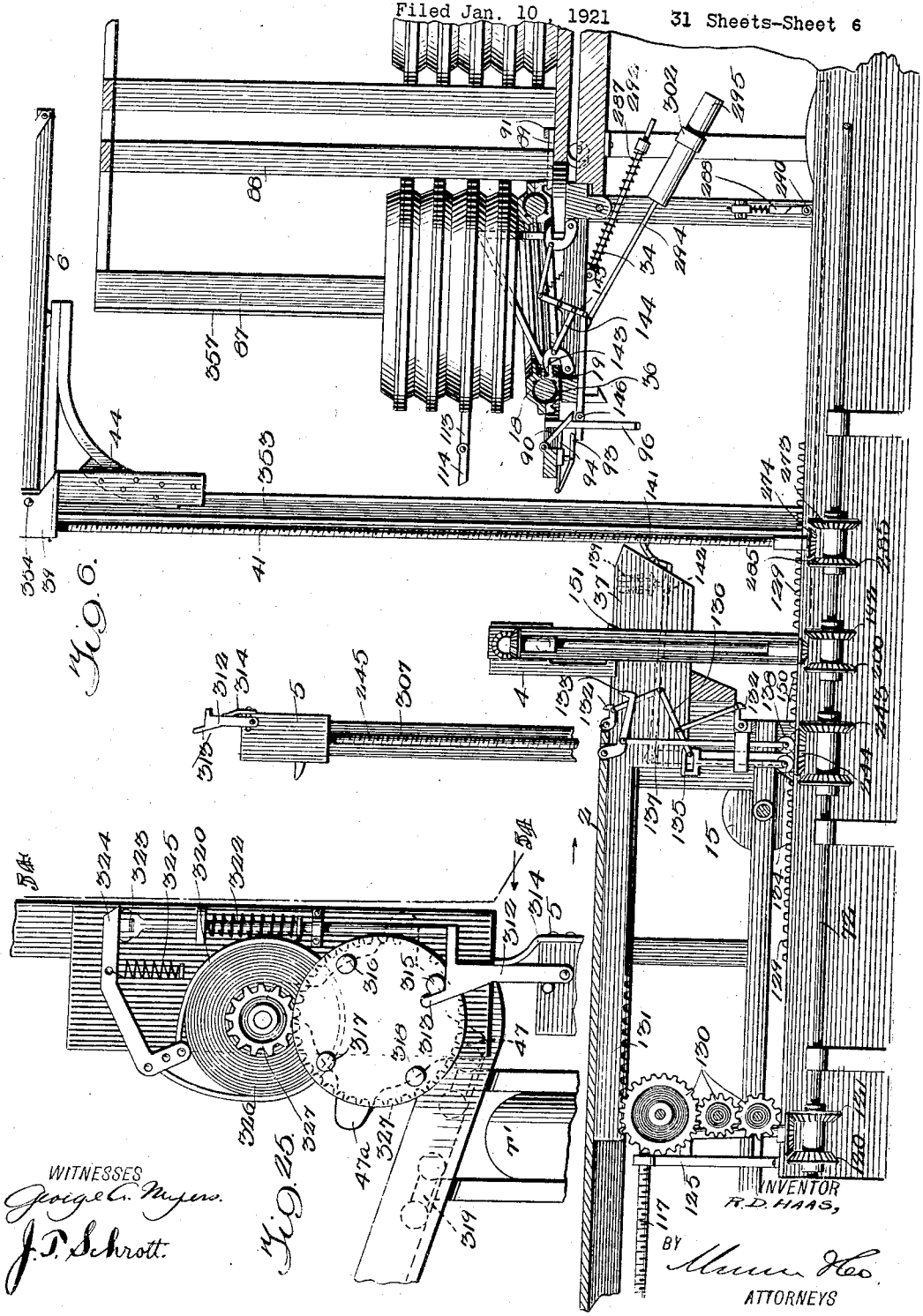

In the ordinary operation of the machine, the mold supporting latch 90 is tripped or retracted by the transfer table 3 coming into engagement with the latch trip 93 as in Figure 6. This rocks the trip 93, draws the holding bolt 94 back against the tension of its spring 95, releases the dog 96 (see Fig. 40), removes the support from beneath the latch 90 and lets the outer edge of the mold 18, 19 drop onto the transfer table then in waiting.

A spring 97 returns the dog 96 to its original position, the end of the bolt 94 being beveled to let the dog pass. The dog 96 has an abutting shoulder 98 which prevents the dog from rising above the horizontal plane. The latch 90 has a neutral spring 99 which keeps it in contact with the dog.

In order to let the mold stack down easy on the latch bolt 89 and supporting latch 90 after the bottom mold is removed as in Figure 6, the mold stack support in Figures 41 and 42, is provided. There is one of these devices in each of the tubular standards 87, in opposing positions at right angles to the latches 89 and 90. The support comprises the cylinder 100, fixed in the standard.

In the cylinder is a fluid against which the piston 101 acts when the weight of the mold stack is imposed on the dog 102 of the support head 103. The head is joined to the piston by the connecting rod 104 which runs through a suitable stuffing box. A stem 105 extends from the piston out at the top of the cylinder, running through a stop 106 which also acts as a guide. A yoke 107 embraces the cylinder 100, is connected to the head 103 at the bottom, and opposes the spring 108 at the top where it receives the stem 105.

Consider the weight of all of the molds in the stack, excepting the bottom mold, to be on the dog 102. The bottom mold is removed by releasing the holding latch 90, whereupon the piston 101 travels down very slowly in the cylinder 100, letting the mold stack down easy on the latch 90, which by that time has sprung back into place and the latch bolt 89. The piston is equipped with a valve 109 having a minute orifice through which the fluid can pass but slowly and thus reduce the speed of downward movement of the piston.

On the upward movement of the piston, as when the spring 108 expands against the yoke 107, the valve 109 opens the adjacent passage in the piston fully, letting the fluid flow through rapidly and thus restoring the dog 102 to its proper location adjacent the edge of the next highest mold. The dog 102 is pressed outwardly by its spring 110, the engagement of the trip 111 with the top of the head 103 limiting the outward movement of the dog. The trip has a pivoted extension 112, capable of swinging up on the trip, but not down. It is when the shoe 39 of the transposing elevator in Figure 14 moves down at the beginning of its operation, that the lever 113 is engaged and the dog 102 depressed to disengage from the mold stack. The engagement of the shoe with the extension 114 of the lever is only long enough to rock the dog 102 through the trip 111. The shoe proceeds on its way and the parts in Figure 41 move back to their original position by virtue of the spring 110. The pivoted extension 114 allows the shoe 40 to pass the lever 113 on the return movement.

The primary carriage 2, has wheels 115 running on rails 116 running up to the transfer table 3. Motion is derived from the first main shaft 72 (which is driven by the prime mover or motor M in Figure 4) and transmitted to the carriage screw shaft 117 by a gear train including the counter-shafts 118, the outer gear 119 of the horizontal counter-shaft being engageable by one or the other of the shiftable gears 120—121 when the lever 122 is shifted to the right by the pin 123 as in Figure 27, or to the left by the pin 124 as in Figure 30. For the purpose of making the reading of the diagrams easy, the gear 119, shown in its proper position in Figure 22, is shown in the horizontal position at the lower end of the vertical counter-shaft 118 in the rest of the figures. The operation will be precisely the same as though the horizontal counter-shaft were included.

The screw shaft 117 is mounted in bearings such as 125 in Figure 8, and when rotated therein causes the follower 126 on the primary carriage to move forwardly or backwardly. Springs 127 between the follower and bosses 128 at each side, absorb any shock that may occur when the carriage reaches the extreme position.

Figure 5:
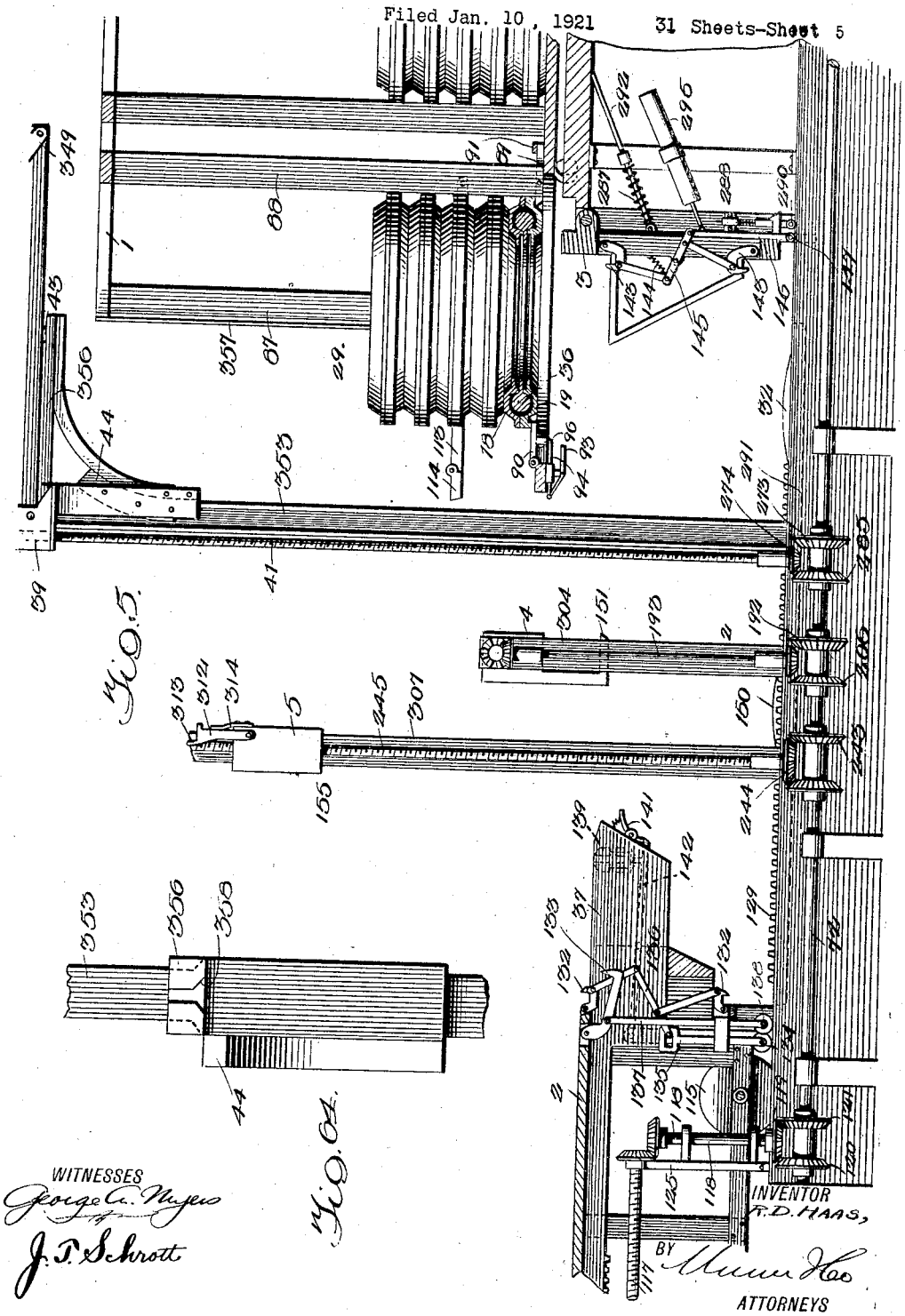

Consider the primary carriage 2 as beginning to move forwardly in step #1, Figure 5, which it does when its pin 124 shifts the lever 122 to move the forward gear 121 into mesh with the gear 119. There is a fixed rack 129 on the bottom. The rack gear train 130, carried by the primary carriage, comes into engagement with the rack 129 between steps #2 and #3 in Figures 6 and 7, thus causing the retraction of the carriage extension 37 in respect to the carriage by virtue of its operation against the extension rack 131. We therefore have a composite movement taking place; the forward movement of the primary carriage 2 and a simultaneous retractile movement of the extension 37 during the last part of the carriage forward movement. The function of this composite movement is to later produce the separation of the core 36 from the mold half section 18, when that movement operates reversely, i. e. on the retrograde movement of the carriage.

The carriage 2 carries outer section grips 132, pivotally mounted, and a mold grip 133, also pivotally mounted. The latter is normally down, the former normally up, being so sustained by the weight of the roller 134 on the plunger 135 through the link connections 136. Similarly, the mold grip is held down by the weight of its attached grip arm 137 and roller 138. The extension 37 carries core grips 139, to be pressed upwardly by springs 140, but normally held down by the engagement of the trip 141 with the rocker 142.

It is when the carriage 2 reaches the transfer table 3 at the end of its first forward movement that the outer section grips 132 and core grips 139 simultaneously grip the outer section 18 and flange 35 of the old core 36 respectively, the former operating simply on the principle of a latch slipping over the edge of the outer section, the latter operating upon the release of the rocker 142. Inner section grips 143, corresponding to the outer section grips 132 but carried by the transfer table 3, are normally up, being held so by the tension of the spring 144 on the pivoted link connections 145, and the weight of the actuating arm 146 with its roller 147.

When the carriage has reached the transfer table 3 as in the description above, the grips 132 and 143 take the positions against the outer and inner mold sections as in Figure 9, the core grips 139 taking the position in Figure 51, sheet 10. Let the carriage 2 now begin its first retrograde movement. The reverse operation of the extension 37 begins, that is to say, it is projected in a forward direction while the carriage moves backwardly. That is because of the gear connections 130 and racks 129, 131. The reader will understand that by this diverse movement of the extension and carriage, the core 36 is separated from the outer mold section 18, so that by the time the position indicated in dotted lines in Figure 10 is reached, the core is already fully separated from said half section. The separation from the inner section 19 occurred when the carriage started on its first retrograde movement.

The core grippers 139 maintain their engagement with the flange 35 until the roller 148 on the actuator 149 reaches the fixed cam 150, when the rocker 142 is caused to draw the grips 139 in, releasing the core 36 and at the same time becoming locked by the re-engagement of the rocker by the trip 141.

This releasing action of the core 36 occurs at the time that the transverse core conveyor 4 is reached, the carrier 151 of that conveyor having by that time come into position to receive the core 36 from the extension 37 as that extension continues to move away from the conveyor. It is by this means that the core is deposited on the carrier, and the extension proceeds on its backward journey empty. A full retrograde movement of both carriage and extension is made, when the pin 124 moves the lever 122 in Figure 30, and shifts the forward gear 121 as shown. The extension 37 has but a short way to travel before its beveled nose 152 rides beneath the roller 153 of the release 154, permitting the support 155 of the uncured tire elevator 5 to rock and deposit the new core 38 with its uncured tire T' on the extension 37 as in Figure 11.

At this point, there must be a departure from the description of the functioning of the primary carriage in order to introduce the electric mechanism actuated thereby. Located at a convenient place beside the carriage 2, is the ramp switch comprising the fixed contact 156 and movable contact 157, which is located adjacent the tooth 158 of the ratchet which has similar teeth 159, 160 and 161. This ratchet is actuated first by the lower dog 162 on the first forward movement of the carriage, next by the upper dog 163 on the retrograde movement of the carriage.

Imagine the carriage making its first forward movement as described above. The lower dog 162 will engage the tooth 158, which the reader must then imagine to be in the position of the tooth 159, and move it around one quarter, to the position of tooth 160. On the first retrograde movement of the carriage, the dog 163 would engage the tooth 159, then in the position of tooth 161 in Figure 12, and move it around one quarter to the present position of tooth 158, the contact 157 then being in the position of the tooth 161. On the second forward movement of the carriage, the dog 162 will engage the tooth 160, moving it around one quarter to bring the contact 157 into engagement with the fixed contact 156, which is the present condition of the switch in Figure 12.

Bear in mind, however, that the position of parts in Figure 11 is only the beginning of the second forward movement of the carriage, while Figure 12 shows the carriage at the end of that movement, ready to make its second retrograde movement.

Current flows, upon the establishment of a contact at the points 156 and 157, from the positive pole of the battery B, over wire 164 to the ramp solenoid 165, over wire 166, past the contacts 156 and 157, returning to the negative pole of the battery via wire 167. The energization of the solenoid attracts the core 168, swinging the primary and secondary ramps 169 and 170 on their pivots 169$^a$ and 170$^a$ so that they assume the horizontal positions shown in Figure 12. Normally, they are swung down out of the way of the rollers 148, 134, 138 and 147, being so positioned by the spring 171 between the end of the solenoid and a collar on the core. Leave the parts in Figure 12, for the time being, and follow the primary carriage 2 on its first forward movement.

Normally, the primary switch 172 in Figure 27, stands in such position that its contacts 173 are out of engagement with its companion fixed contacts 174, as shown in the small figure projected beneath that switch in Figure 27. Normally, the transverse core conveyor 4, stands still substantially in the middle of its screw shaft 175. In this position it is out of the way of both the primary and secondary carriages. It stops itself in this mid-position by moving its stop switch 176 from the contact 177, as appears shortly below.

Approximately at the time that the primary carriage 2 reaches the end of its first forward movement, the primary dog 178 engages one tooth of the ratchet 179 and moves the contact 173 into engagement with the contact 174, completing a circuit from the positive pole of the battery B' over wire 180 to the reverse switch 181, contact 182, over wire 183 to the contact 184 of the back stop switch, through its contact 185 to the other contact 184, wire 186, over the contact of the primary switch 172 to the wire 187, through the front solenoid 188, returning to the negative pole of the battery via wire 189.

The energization of the front solenoid 188 shifts the arm 190 on its pivot through the engagement with the core 191 moving the front gear 192 into engagement with the pinion of the counter shaft 193, thus starting the rotation of the screw shaft 175 and the movement of the transverse core conveyor 4 into position to receive the core 36 and cured tire T from the extension 37 when the time arrives. It is not necessary that the distances and speeds of movement of the carriage 2 and conveyor 4 be determined with exactness, the only requisite being that the conveyor 4 shall reach its front position before the primary carriage arrives with the cured tire.

Provision is therefore made to let the conveyor 4 wait for the primary carriage. When the conveyor 4 reaches the front position as in Figure 23, it engages the front end stop 194, thereby shifting the reverse switch 181 through the rod 195, breaking the electric circuit which held the front solenoid 188 (Figure 29) energized up to this time. The spring 196 on the core 191 of the solenoid moves the arms 190 and its gears to a neutral position, so that the continuously rotating first main shaft 72 no longer imparts movement to the counter-shaft 193 and screw shaft 175. The conveyor 4 now stands still for a short time.

At about the instant that the extension 37 clears the carrier 151 of the conveyor 4, the secondary dog 197 on the carriage 2 engages a tooth of the ratchet 198 of the secondary switch 199, moving its now inoperative contacts 200 into engagement with the fixed contacts 201 closing a circuit which can be traced in Figure 28 thus: Current flows from the positive pole of battery B' over wire 180 to the reverse switch 181 to the contact 202, with which the switch is now in engagement, wire 203, past the contacts of the secondary switch 199, over wire 204 to the back solenoid 205, returning to the negative pole of the battery via the common wire 189.

The energization of the solenoid 205 draws the core 191 toward the left from the neutral position where we left it, shifting the arm 190 so as to move the back gear 206 into engagement with the pinion of the countershaft 193, thereby driving the screw 175 in the opposite direction, causing the conveyor 4 to move back. Since, by this time the extension 37 has deposited the cured tire T on the carrier 151, the conveyor 4 moves the cured tire over into the path of the secondary carriage 8.

Follow the transverse core conveyor 4 on its way back. When it passes the mid position, shown in dotted lines in Figure 30, it releases the mid stop switch 176, held open up to this time, permitting the switch to engage the contact 177 which is part of the shunt wire 207, coming into operation presently. The finger 208 is first to engage a tooth of the ratchet 209 of the back stop switch 185, moving that switch one quarter as shown in Figure 29, breaking the circuit 183, 186, etc. to the front solenoid 188, so that that solenoid cannot become energized when the conveyor 4 reaches the reverse switch 181 and moves it from the position now in Figure 29 to that in Figure 31.

Continuation of the back movement of the conveyor 4 brings the depressor 210 over the roller arm 211, moving it down, consequently shifting the pivoted actuator dog 212 into the lowermost position in readiness to turn the switch 185 a quarter turn when the cam 213 of the secondary carriage 8 rides beneath the bottom roller of the arm 211 and again raises that arm. The depressor 210 is pivotally mounted, and has a rather stout spring 214, strong enough to hold the depressor rigid when passing the upper roller of the arm 211, but flexible enough to let the depressor raise when the arm 211 is held immovable by the cam 213 beneath it. The depressor 210 must pass the arm 211 while the cam 213 is in such position.

Further continued movement of the conveyor 4 brings the right end into engagement with the reverse switch 181. This breaks the circuit 202, 203, etc. to the back solenoid 205, deenergizing that solenoid so that its spring 215 moves the arm 190 and gear 206 to the neutral position, stopping the conveyor 4 in the position in Figure 31.

Here the conveyor 4 remains until the cam 213 of the secondary carriage 8 rides beneath the lower roller of arm 211. That carriage is put in motion the instant the conveyor 4 reaches the end of its backward movement. As shown in Figure 31, when such occurs, the carriage switch 216 is moved into engagement with the contact 217 completing the following circuit: Current flows from the positive pole of the battery B' (the same battery B' shown in Figure 27) over wire 218, switch 216 and contact 217; wire 219 to the forward solenoid 220, returning to the negative pole of the battery via the common wire 221. The forward solenoid 220 being energized, draws the core 222 toward the right against its spring 223, rocking the arm 224 and shifting the forward gear 225 into engagement with the pinion of the counter-shaft 226, thereby rotating the screw shaft 227 from the third main shaft 74 and starting the secondary carriage 8 forwardly.

Assume that the cam 213 has reached the arm 211 as in Figure 32. That arm is raised and the actuator dog 212 moves the back stop switch 185 around one quarter so that its metallic contacts engage the contact 184, re-establishing the following circuit: Current flows from the positive pole of battery B', over wire 180 to (see Figure 32) reverse switch 181, contact 182, wire 183, contacts 184 and 185 to the wire 186, mid-stop switch 176 and contact 177, shunt wire 207 around the primary switch 172 to the wire 187, front solenoid 188, and back to the negative pole of the battery via wire 189. The solenoid 188 draws the arm 190 over and shifts the front gear 192 so as to drive the screw shaft 175 and again start the conveyor 4 forwardly.

Here the purpose of the mid-stop switch 176 and shunt wire 207 becomes apparent.

During the time that the transverse core conveyor 4 was making its backward movement with the cured tire T, the primary carriage 2 made another and its second forward movement so that the primary dog 178 engaged the ratchet 179 and moved the contacts 173 out of engagement with the contacts 174. The wire 207 makes a detour around the primary switch and now plays the part of completing a circuit to the front solenoid 188 so that the conveyor 4 may start to its mid position, shown in Figure 27.

When that position is reached, the front end of the conveyor moves the mid-stop switch 176 away from the contact 177, breaking the circuit through the front solenoid 188, just referred to, permitting the spring 196 to move the arm 190 and front gear 192 to the neutral position, so that the conveyor 4 stands in the mid position at precisely the place where the above electric operations began. The position of the primary switch 172, prior to the opening of switch 176, is shown in the small projected view in Figure 27.

Now consider an electric action which also takes place at the end of the first forward movement of the carriage 2 and about at the time that the conveyor 4 is started left from its mid position by the closing of the primary switch 172. In Figure 27 the pin 123 has thrown the lever 122 up to reverse the carriage 2. This action moves the contact segment 228 of the core elevator switch 229 into engagement with the fixed contact 230, by means of the dog 231 operating against the ratchet 232. The switch 229 has a second contact 233, separated from the first by insulating inserts.

Current now flows from the positive pole of the battery B (which may be the same as B in Figure 12) over wire 234 and past contact 230, 228 to the wire 235, through the down solenoid 236, over wire 237 to the stop switch 238, returning to the negative pole of the battery via wire 239. The solenoid 236, now energized, draws the core 240 toward the right against the tension of the spring 241, rocking the arm 242 and shifting the down gear 243 into engagement with the pinion 244 of the screw shaft 245, starting it in rotation and the uncured tire elevator 5 down with its new core and uncured tire T'.

The elevator 5 moves down more slowly than the core conveyor 4 moves front. The latter reaches the position in Figure 10 in time to remove the core 36 and cured tire T from the extension 37 on the first retrograde movement of the primary carriage. The elevator 5 does not arrive until after the primary carriage has completed its first retrograde movement and thus provides a space into which the new tire is lowered.

Assume that the elevator 5 has moved down as far as it ought. The switch arm 246 then engages the switch 238, breaking the circuit through the down solenoid 236 and permitting the spring 241 to return the arm 242 and gear 243 into the neutral position as shown in Figure 30. The elevator 5 remains stationary until it is put in motion on the second forward movement of the primary carriage which occurs thus:

The uncured tire elevator 5 starts up from its temporary rest position in Figure 30, when the beveled nose 152 of the extension 37 rides beneath the roller 153 of the release 154, raising that release to free the support 155, as in Figure 11. The raising of the release 154 shifts the normally horizontal elevator switch 247 so that it inclines into engagement with the contact 248, closing the following circuit: Current flows from the positive pole of battery B over wire 249 to the up solenoid 250, over wire 251 to ground at the machine frame, through the ground connection to contact 248, through switch 247, returning to the negative pole of the battery via wire 252. The wire 252 has a loose part which accommodates the vertical movement of the elevator. Upon energization of the up solenoid 250, the core 240 is brought toward the left, shifting the up gear 253 into engagement with the gear 244 of the screw shaft 245 by means of the arm 242, causing the screw shaft to be driven in the reverse direction from the first main shaft 72, thus causing the elevator 5 to rise. This it does in ample time to get out of the way of the primary carriage 2 which is now traveling on its second forward movement. Notice that at the end of the first retrograde movement of the primary carriage, the pin 124 shifted the lever 122 toward the left, as in Figure 30, drawing the dog 231 back to engage another tooth on the ratchet 232. The solenoid 236 must not become energized when the switch arm 246 releases the stop switch 238, and for this purpose, the switch 238 is of a friction type, remaining where it is put.

As shown in Figure 52, the switch 238 is pivotally mounted on a stem 254, in turn embedded in an insulating block 255, there being a spring 256 pressing between the block and switch to hold the latter snugly against the head of the stem. It follows that the switch will remain either in the horizontal or inclined positions, depending on whether the switch arm 246 depresses it or the depressor 257 moves it into the horizontal position by engagement with the head 258.

Assume that the elevator 5 has now reached the top, it having been traveling on its upward movement all this time. The elevator switch 247 will engage the abutment 259, at once depressing the release 154 to its support-engaging position, and open the circuit 252, 249, 251 of the up solenoid 250 at the contact 248, deenergizing that solenoid and permitting its spring 260 to restore the arm 242 and gears 243, 253 to the neutral position.

The stop switch 238 is restored into engagement with its companion contact when the primary carriage 2 completes its second forward movement, whereupon the depressor 257 engages the head 258, restoring the switch as stated. Under the condition of the core elevator switch 229 in Figure 30, the restoration of the stop switch 238 would re-establish the circuit through the down solenoid 236. But this must not be. Therefore, simultaneously with the restoration of the switch 238 by the depressor 257, the pin 123 shifts the lever 122, to simultaneously reverse the primary carriage 2 and move one of the insulating segments of the switch 229 over the contact 230, thereby breaking the circuit through solenoid 236.

It is at the end of the first forward movement of the primary carriage 2, (imagining for a moment that a new cycle of operation has begun) that the pin 123 again shifts the lever 122, this time bringing the other segment 233 of the switch 229 over the contact 230, establishing a circuit through the down solenoid 236, so that the elevator 5 is started on its downward movement repeating the cycle of operation described above and begun in Figure 27. This brings us back to the point of departure described in connection with Figure 11, where, as the reader will remember, the new core 38 and tire T' was deposited on the extension 37 at the beginning of the second forward movement of the primary carriage 2. He will remember that the transverse core conveyor 4 is on its way to the right; also that the elevator 5 immediately starts up. This clears the path for the secondary carriage.

As soon as the gear train 130 reaches the fixed rack 129, the retraction of the extension 37 in respect to the carriage 2, begins. This operation is shown in Figure 7, but in that particular instance it was idle, this time the function of the retracting action is to move the new core 38 with the tire T' into the outer mold section 18, and at the time that the carriage reaches the end of its first movement, as in Figure 8, the mold section 18 with its core 38, is closed upon the inner mold section 19 so that we have the precise situation shown in Figure 12.

The reader will remember that at the end of the second forward movement of the primary carriage, here shown, the lower dog 162 moved the contacts 156 and 157 into engagement, energizing the ramp solenoid 165 for the raising of the primary and secondary ramps 169, 170.

The raising of secondary ramp 170 elevates the grip arms 137 and 146 through their rollers 138 and 147, engaging the main mold grip 133 with the inner mold section 19, and disengaging the inner mold grip 143 from that section. This last disengagement is necessary, otherwise the completely closed mold could not leave the transfer table 3. The outer mold grips 132 are still in engagement with the outer section 18. Consider the primary carriage 2 to now be ready for its second retrograde movement.

But first follow the primary ramp 169. Upon elevation thereof, simultaneously with that of the ramp 170, the down switch 261 is rocked into engagement with the contact 262 closing the following circuit: Current flows from the positive pole of battery B over wire 263, past switch 261 and contact 262 to the wire 264, through stop switch 265 and contact 266 to the wire 267, through the down solenoid 268, returning to the negative pole of the battery via wire 269. The energization of the solenoid rocks the arm 270, by virtue of its connection with the core 271, against the tension of spring 272 shifting the down gear 273 against the pinion 274, starting the screw shaft 41 in rotation, so that the transposing elevator 6 is started down.

When it reaches the proper lowermost position, illustrated in Figure 13, the bottom of the elevator shoe 39 depresses the stop switch 265 (in Figure 12) to break the circuit 263, 264, 267, 269 at the contact 266, thus stopping the transposing elevator by the deenergization of solenoid 268 and the moving of gear 273 into the neutral position by the spring 272. Now picture the primary carriage 2 as starting on its second retrograde movement.

The roller 134 of the plunger 135 will ride up on the primary ramp 169, properly rocking the link connections 136 to disengage the outer grippers 132 from the section 18. As soon as the roller 138 rides off of the secondary ramp 170, it drops due to its own weight, releasing the inner mold section 19 from the mold grip 143. The closed mold, with its new core 38 and uncured tire T', simply rests on the primary carriage. The roller 138, just mentioned, does not ride up on the primary ramp 169 because that ramp is offset as shown in Figure 50, being intended only for the roller 134.

The mold has now reached the transposing elevator 6. That elevator has latches which support the mold when the elevator is turned over into the horizontal position. The primary carriage 2 proceeds on its second retrograde movement, empty. As soon as the upper dog 163 reaches the ramp switch 156, that switch is turned one quarter toward the left from the position in Figure 12, deenergizing the ramp solenoid 165 and permitting the primary and secondary ramps to incline to their normal positions. The down switch 261 being released, enables the spring 276 to move the switch into its normal engagement with the upper contact 277, closing the following circuit: Current flows from the positive pole of the battery B over wire 263, through switch 261 and contact 277 to the wire 278, through the up stop switch 279 and contact 280 to the wire 281, through the up solenoid 282, returning to the negative pole of the battery via wire 283. The solenoid 282 being energized, draws the core 271 toward the left against the tension of its spring 284, shifting the up gear 285 into engagement with the pinion 274, starting the reverse rotation of the screw shaft 275 from the first main shaft 72, so that the transposing elevator 6 is started on its upward journey.

This upward journey is made at relatively low speed so as to provide sufficient time for the discharge of the filled mold from the elevator on top of the stack as in Figure 14. The complete action is described in detail under subject #6, below, the present instance being employed to complete the action of the elevator.

When the elevator shoe 39 reaches the top it shifts the up stop switch 279 from the contact 280, shown in Figure 12, breaking the circuit 263, 278, 281, 283 so that the spring 284 may shift the arm 270 and its gears to the neutral position, stopping the transposing elevator at the upper extremity of its movement. This completes a cycle of operation of the primary carriage 2, and the collateral operations of the transverse core conveyor 4, uncured tire elevator 5 and transposing elevator 6. In order that the reader may have the foregoing actions before him in compact form, there is appended the following:

SYNOPSIS OF THE ELECTRIC OPERATIONS.

*Primary carriage 2.*

1st forward movement: Fig. 27—Primary dog 178 closes primary switch 172 to start core conveyor 4 from the mid-rest position in Fig. 27

Takes core 36 and cured tire T from transfer table 3.

Pin 123 closes switch 229 to start uncured tire elevator 5, which comes down slowly.

Depressor 257 simply passes over head 258 of switch 238.

Fig. 12—Lower dog 162 moves ramp switch 156 one tooth.

1st retrograde movement: Fig. 28—Secondary dog 197 closes secondary switch 199 as extension 37 passes carrier 151 of conveyor 4, starting conveyor 4 back with a core and cured tire.

Fig. 12—Upper dog 163 moves switch 156 a second tooth.

2nd forward movement: Fig. 27—Primary dog 178 opens switch 172 but (Fig. 32) the detour circuit 207 around the switch is closed at 176—177.

Depressor 257 closes switch 238.

Pin 123 opens switch 229 to prevent energizing solenoid 236.

Conveyor 4 travels left but opens switch 176 to break the solenoid 188 circuit, leaving the conveyor in the mid-position.

Fig. 12—Lower dog 162 moves switch 156 to energize solenoid 165 and raise ramps 169 and 170.

The main grip 133 engages the mold; inner grip 143 releases it.

Ramp 169 starts transposing elevator 6 down, which stops by opening switch 265.

2nd retrograde movement: Fig. 12—The mold 18, 19 is carried to the now waiting transposing elevator 6 where it is deposited.

Upper dog 163 opens switch 156, deenergizing solenoid 165 so that ramps 169 and 170 drop.

Switch 261 shifts up gear 285 in and elevator 6 starts up with the mold.

Up stop switch 279 is opened by the elevator 6 when it gets to the top; it thus stops.

*Transverse core conveyor 4.*

Forward movement: Fig. 27—Is normally in the mid-position. Primary dog 178 closes primary switch 172 at end of 1st forward movement of primary carriage 2, to start conveyor 4 left.

Fig. 28—Conveyor 4 stops itself by shifting reverse switch 181 from contact 182.

Cured tire T is hung on conveyor 4 at end of 1st retrograde movement of carriage 2.

Backward movement: Fig. 28–Fig. 30—Secondary dog 197 closes switch 199 at end of 1st retrograde movement of carriage 2, starting conveyor 4 back with cured tire T.

Fig. 29—Finger 208 shifts back stop switch 185.

Depressor 210 lowers arm 211, shifting dog 212 in readiness to turn switch 185.

Mid stop switch 176 is closed when conveyor 4 passes the mid position.

Fig. 31—End of conveyor 4 shifts switch 181 from contact 202 to deenergize back solenoid 205 and stop conveyor 4. Closes switch 216 to start secondary carriage 8.

Fig. 32—Cam 213 of secondary carriage 8 raises arm 211 to turn switch 185 and start conveyor 4 left.

Fig. 27—Conveyor shifts stop switch 176 to stop itself in the mid position.

*Uncured tire elevator 5.*

Downward movement: Fig. 27—Pin 123 closes switch 229 to start elevator 5 down, bringing new core 38 and uncured tire T' with it.

Completes downward movement only after primary carriage has passed to limit of 1st retrograde movement.

Arm 246 opens switch 238 to stop elevator 5.

Upward movement: Fig. 30—Switch 247 is closed by nose 152 to start elevator 5 up.

Fig. 27—Switch 247 is opened to stop elevator at the top.

Depressor 257 raises switch 238.

Pin 123 opens switch 229.

*Mold transposing elevator 6.*

Downward movement: Fig. 5—Normally up and at rest.

Fig. 12—Elevator of ramp 169 closes switch 261 against contact 262 to start elevator 6 down.

Strikes switch 265 to stop when down.

Upward movement: Fig. 12—Dog 163 opens switch 156 to deenergize 165, release ramp 169 and let switch 261 shift up, starting elevator 6 up.

Fig. 14—Deposits mold with uncured tire on the mold stack.

Fig. 12—Up stop switch 279 is opened by elevator 6 which thus stops itself.

The transfer table 3, shown in detail to a sufficient extent in Figures 9 and 12, has a hinged mounting 286 on which it swings; up to receive the mold, down to transfer the mold from beneath the stack into position in line with the primary carriage. The spring 287 is strong enough to push the table up when the latch 288 is made to release the hook 289 upon elevation of the roller 290 by the cam 32 on the extension 291 considerably far to the front of carriage 2.

The spring 287 is mounted on the guide rod 292, which is pivoted at one end to the transfer table, and at the other end runs in the bearing 293, which in turn is rockably mounted. In order to check the downward movement of the transfer table carrying the heavy mold, there is a plunger 294, pivoted to the table, and extending into the check cylinder 295 where it has a piston 296.

This piston has a minute passage 297, closed by the valve 298 in turn provided with an aperture 299, so that on the inward movement of the piston 296 the fluid 300 can pass through but very slowly, thus retarding the downward motion of the table, but on the reverse movement of the piston, the fluid can pass through quite rapidly, the valve 298 being unseated at that time.

The mold rests upon the triangular support 301, which is in the nature of a double bracket necessarily open to admit the front end of the primary carriage 2 when the position, for example, in Figure 12, is assumed. These brackets are shown more clearly in Figure 53, wherein it is also to be observed that the inner mold section grips 143 are properly located so as to catch the inner section as it rests upon the support 301. The check cylinder 295 is swivelly mounted at 302 so that it may assume the extreme position shown first in Figure 5 and next in Figure 6. The reader will remember that it is a part of the table 3 that strikes the latch trip 93 in Figure 40 to release the outer side of the lowermost mold in the mold stack above.

The transverse core conveyor 4, has been described with such particularity above that but little remains to be said as to its construction. It consists simply of the carrier 151 on which the core 36 and cured tire T are deposited on the first retrograde movement of the primary carriage 2, whereupon the carrier starts to the right. Figure 23 shows the carrier as having arrived beside the primary carriage in time to receive the cured tire. In addition to its support on the screw shaft 175 the carrier is guided by a rod 303, the ends of which are fixed in the frame 304.

The uncured tire elevator 5, runs up and down on a pair of screw shafts, one of which, 245, has been mentioned before. As shown in Figure 54, there is a companion screw shaft 305, driven from the first shaft by the counter shaft 306. Since the screw shafts revolve in opposite directions from each other, they are oppositely threaded so as to properly lower and raise the elevator.

This elevator runs on T-guides 307, lateral extensions of the elevator receiving the screw shafts. The release 154 is friction-held in its operation, a spring 308, shown in Figure 11, pressing against the release to hold it either up or down, depending on the respective position into which it may have been moved. On the other hand, the support 155 should return to its normal position as soon as the new core and tire is disposed of as shown in Figure 11. For this purpose, it has a stout spring 309 on one side, fastened to the pivot shaft and to the support itself, for the purpose of moving the upper end of the slot 310 against the stud 311. Thus the support is in position to receive the release 154 when the latter is pressed down by engagement with the abutment 259 as in Figure 27.

Pivoted at one side of the elevator 5 is the lift 312 which actuates the tire release wheel 47 in Figures 24 and 25, each time that the elevator reaches the uppermost position. This lift includes a finger 313. It is pressed over against a stop by a leaf spring 314. Each time the elevator 5 arrives at the top, the lift 312 engages a new one of the pins 315, 316, 317, 318, moving the release wheel 47 around one quarter to discharge an uncured tire in the manner to be followed in Figures 25, 57 and 58. Figure 58 shows the core 38 and new tire T' deposited on the support 155.

The uncured tire supply elevator 7, is properly considered in connection with the elevator 5, since as can be seen immediately above, there is a direct co-action between the two. Follow the operation as the elevator 5 nears the top of its guides 307. Normally, the pins 315, etc. stand at quarters in the position shown in Figure 25, the lowermost finger 47 standing in position in front of the wheeled carriage 319 to retain the whole row of new cores and tires on the inclined spaced tracks 45 by virtue of the application of the brake 320.

At the same time that the lift 312 engages the pin 315 it also engages the brake stem 321, moving it up against the tension of the spring 322, causing the dog 323 to lift the brake arm 324 against its spring 325, thus releasing the brake drum 326. The dog is of the type shown in Figure 59, which remains rigid to the limit of the upward movement, whereat it slips by the brake arm 324, letting that arm return by the contraction of the spring 325, re-applying the brake. The dog 323 can pass the arm 324 on the subsequent downward movement of the stem 321.

Upon release of the brake, the release wheel is rendered free to move, there being gear connections 327 between the two. The lift 312 continues to push up on the pin 315, moving the row of empty hooks 46 in the vertical part of the track 45 at the right up, the carriage 319, now freed by the lowermost finger 47, rolling into the space shown in Figure 57 and following the finger 47 by virtue of its own weight and that of the core carried thereby. The finger 47ª, next following, however, checks the row of carriages on the inclined part of the track, so that the elevator 5 may have only the one core to deal with.

There is a time between the positions in Figures 57 and 58, when the support 155 of the elevator rises beneath the inner flange of the core 38 and lifts it off of the hook 46, thereby making it easier for that hook and its carriage to traverse the circular part of the track at the circumference of the wheel 47 when the pushing action of the following finger 47ª begins. The lift 312 has reached the limit of its upward movement in Figure 58, and this view also shows the new core as having been deposited on the support 155 in readiness to be lowered according to the operation of the elevator. It is at the time illustrated in Figure 58 that the dog 323 slips by the lever 324, re-applying the brake. It is necessary to do this at this particular time, to prevent the row of molds on the inclined track running down and causing difficulties while the elevator 5 begins its downward movement, which, were it not for the provision of the dog 323, would leave the brake 326 released until the original position in Figure 25 were again arrived at.

The elevator bar 56, mentioned before, normally occupies the inclined position at the discharge end of the vertical section 328 of the hook carriage track, so that the hooks in the section 328 may be loaded one by one with new cores and tires. This loading operation is accomplished by moving the hook release 329 sufficiently to let one carriage pass. This carriage will roll down the inclined elevator bar 56, whereupon the operator places a new core and uncured tire on the hook 46, then releasing another hook, repeating the foregoing operation until the bar 56 is entirely filled as shown in Figure 24.

Screw shafts 330 raise the elevator bar 56 with its burden of new cores and tires, on the guides 57 until the top is reached, that is to say, the bar 56 is in line with the inclined track portion 45. The screw shafts are driven from the first main shaft 72 by means of gears 331. These are normally loose, but when the lever 332 is shifted, both gears are clutched to the shaft by means of the clutches 333 so as to drive the screw shafts.

Having reached the top of the guides 57, the hooks and tires on the bar 56 must be let into the inclined track 45. There is a follower 334 against which the carriages in the bar 56 press by virtue of their own weight. A cable 335 connects the follower to the drum 336, the brake 337 being loosened sufficiently to let the follower and the weight of carriages and tires behind it, down slowly.

Figure 3:
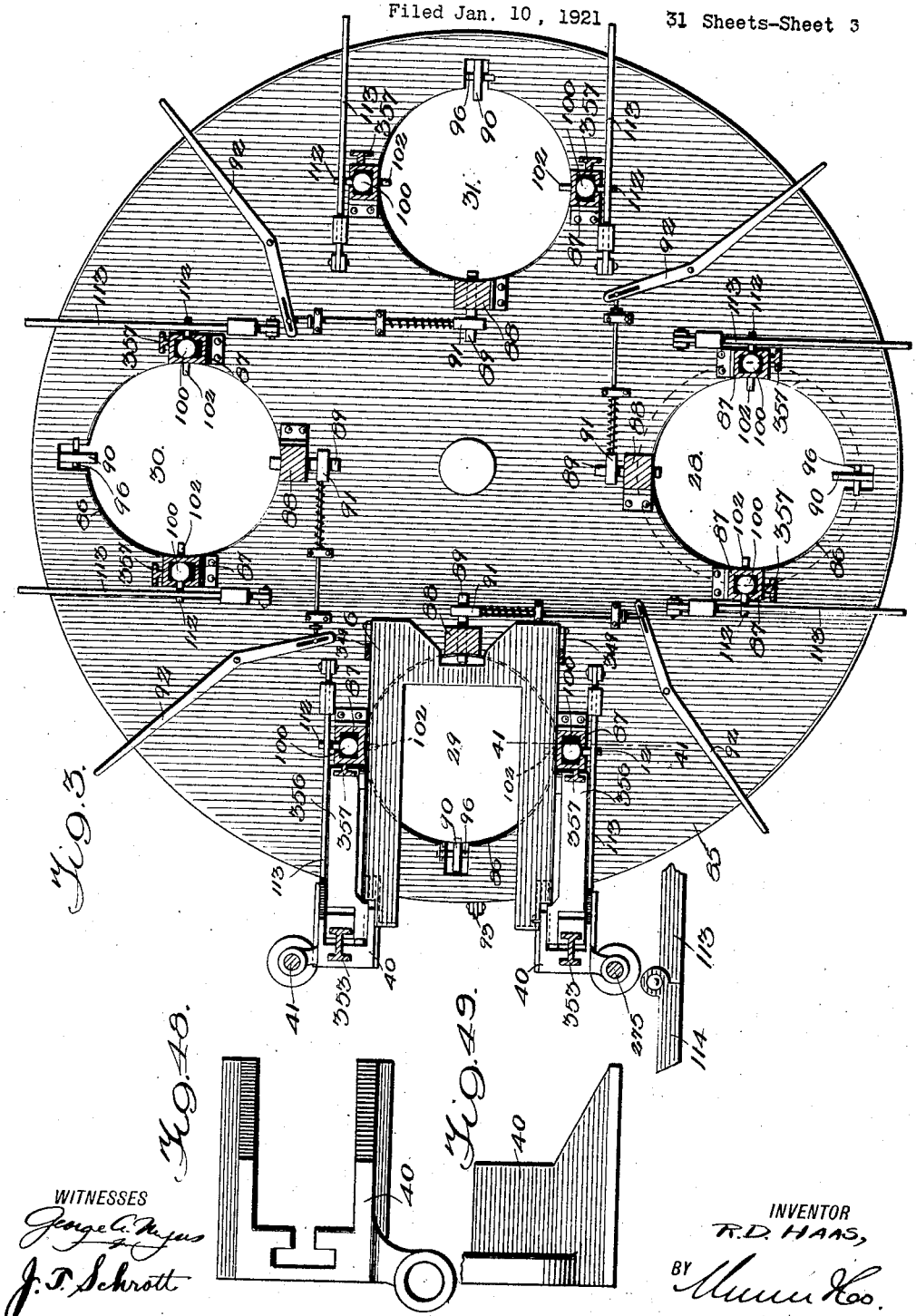

When the follower has been lowered sufficiently far to let the line of carriages and new tires down to their place of rest, the follower is simply swung back out of the way so that the drum 336 can be turned either by means of a crank or other mechanical connection, to rewind the cable 335 and restore the follower to its uppermost position. For the purpose of releasing the follower as described, it is hingedly mounted on a block which slides in a grove formed on the upper part of the track 45. A detail of this block is shown in Figure 61, and a detail view of the clutch connections by means of which the screw shafts 330 are set in motion, is shown in Figure 60. The details of construction and operation of the transposing elevator 6 may now be considered. The elevator 6 is in the nature of an open frame as shown in Figures 3 and 62, the central opening 338 being for the purpose of letting the primary carriage 2 pass through to deposit the mold 18, 19 in the elevator as shown in Figure 13. When thus deposited, the mold rests on shoulders 339 at the sides of the elevator, which, at the time now under consideration, is in the vertical position in Figure 13. As the mold enters the elevator 6, the supporting dogs 340, which are distributed as shown in Figure 62, gives way against the tension of their springs 341, shown in Figure 63, to let the mold all the way in to the back wall of the side parts of the elevator, whereupon the dogs 340 spring back into position in readiness to support the mold. Latches 342 and 343, respectively at the bottom and top of the elevator in Figure 13, stand above the supporting dogs at the rear ends to keep those dogs from rocking on their pivots until the proper time when they should rock to release the mold.

The latches 432 have springs 344 which press them inwardly. The extensions of the latches are pivoted to the inside arms of cranks 345. The outside arms of these cranks have inward extensions 346 which are intended to be engaged by the beveled parts of the shoes 39 and 40, when the position in Figure 14 is reached, to rock the cranks 345, retract the latches 342 and release the dogs 340 then at the left side of the mold.

A similar action takes place at the right side. Here the latches 343 are retracted by the rocking of cranks 347, upon engagement of their outside arms by lugs 348 on the radius rods 349, pivoted at 350 to the right of the elevator 6 and at 351 to a crosshead 352 which runs on the outer side of each of the guides 353. As the transposing elevator 6 rises from the position in Figure 13, its guide rollers 43 run first on the vertical elevator rail, then reach the curved part 44, whereupon the elevator is made to assume the horizontal position by the continuance of the upward movement of the shoes 39 and 40, the function of the various latches occurring as the positions in Figures 14, 46, 47 and 62 are arrived at.

It appears in the above description that the upward movement of the shoes 39 and 40 on their screw shafts 41, 42, is sufficiently slow to permit the divergence of the elevator 6 from the vertical to the horizontal position for the discharge of the mold on top of the stack in the compartment 29. This mold, it must be remembered, is filled with a new core and uncured tire, new molds being placed into the compartment 29 to replace old ones taken out at the bottom, until the compartment is filled with the desired number of new molds. It is then that the mold head 1 is turned around another quarter so that another compartment may be emptied of cured tires and uncured ones put in place. The elevator 6 is hinged at 354 to the sides of the shoes 39 and 40, so that the elevator may swing into the horizontal position already mentioned in connection with Figure 14.

It is the changing of the angular position of the rod 349 that brings the lug 348 against the outer arm of the crank 347 to retract the latch 343 and release the dog 340. Both screw shafts are driven, but in opposite directions, by a countershaft 355 shown in Figure 3. Since they do rotate in opposite directions, the threads are respectively right and left hand. The part 356 by which the elevator rail 44 is carried, never moves out of the horizontal position shown in Figure 13, it being guided between the guides 353 and T guides 357 of the standards 87.

The transposing elevator 6 is moved to the extreme upward position, shown for example in Figure 5, each time a transposing operation takes place. The reader will remember how the up stop switch 279 in Figure 12 is opened when this position of the elevator is reached, to let the gears 273 and 285 back into neutral so that the elevator may be stopped. On each downward movement of the elevator the rail support 356 must fit itself upon the T guide 357 of the standard 87, and to facilitate the engagement of the two, the T channel in the end of the support 356 is flared as shown at 358 in Figure 64.

The secondary carriage 8, has wheels 369 running on rails 360, operating somewhat on the order of the primary carriage 2 in so far as the forward and retrograde movements are concerned. The reader will recall by again referring to Figure 31, that it is the transverse core conveyor 4 that starts the secondary carriage 8 on its forward movement, by moving the carriage switch 216 against the contact 217, thus energizing the forward solenoid 220 and setting the screw shaft 227 into operation from the third main shaft 74.

Assume the secondary carriage 8 to be on its forward movement as in Figure 15. The core 36 with its cured tire T, stands in the path of the advancing core support 361 and grip 362. The former is spring-mounted at 363, the latter pivotally mounted to permit depression when the flange of the core is reached, so that the core may be caught between the grip and the secondary carriage, as shown for example in Figure 18. The grip 362 carries a bar 364 with a roller 365 at the lower end. This roller is intended to ride over the stationary cam 366 to release the core 36 in the subsequent retrograde movement of the carriage.

The secondary carriage 8 is open at 367 as shown in Figure 65, so that the carriage may move over the carrier 151 of the conveyor 4 in its forward movement where it removes the core 36 from the carrier. It is also necessary that the side or upper rail of the carriage 8 nearest the observer, be dropped, as shown for example in Figure 15, because it is during the time that the carrier 151 is within the opening 367 of the carriage, that the carrier 151 starts back to the mid-position shown in Figure 27, and of course it is necessary that there be a place in the carriage 8 to let the carrier out.

It is the cam 213 striking the roller of the arm 211 that shifts the switch 185 to start the conveyor 4 back to the mid position mentioned. The electric connections are not shown in Figure 15, but reference is had to Figures 27 et seq. for details thereof. The carriage 8 has a follower 368, with springs 369 on each side, for the purpose of absorbing the shocks when the carriage reaches the stripping mechanism. Figure 16 shows the support 361 as having received the core 36 and cured tire T. The carriage 8 is on its way to the stripping mechanism.

When the stop dog 370 reaches the lever 371, it moves that lever to the position shown in Figure 66, shifting the rod 372 to the right, turning the crank shaft 373, pulling the connection 374 down and releasing the carriage switch 216 from the contact 217. This opens the circuit completed up to this time through the forward solenoid 220, shown in Figure 31, thereby permitting the spring 223 to shift the arm 224 and gear 225 into the neutral position, thus stopping the secondary carriage 8 at the stripping mechanism in Figures 18 and 35. The secondary carriage remains in this position during the core stripping operation.

The dog 370 turns the crank shaft 373 sufficiently far to carry the carriage switch 216 against the return contact 375, where a part of a circuit is completed from the battery B'. The other part of the circuit is later completed at the return switch 376, but at present the circuit which will energize the back solenoid 377 remains closed at the switch 376 as shown in Figure 31. The carriage 8 carries a back stop dog 378 which moves the lever 371 to bring the switch 216 into a position halfway between the contacts 217 and 375, when the carriage 8 reaches the end of its retrograde movement. The slot 379 permits the movement of the rod 372 in respect to the lever 371 without disturbing the latter, when the conveyor 4 moves the switch 216 from its mid position into engagement with the contact 217.

As the secondary carriage 8 approaches the stripping mechanism it moves the push rod 380 inwardly against the tension of the spring 381, the end dog 382 throwing the rocker switch 383 against the contact 384, whereupon current flows as follows: From the positive pole of the battery $B^2$ over wire 385, switch 383 and contact 384 to wire 386, through the right solenoid 387, returning to the negative pole of the battery via the common return wire 388.

Upon this energization of the right solenoid 387, shown in Figure 34, the core 389 is drawn to the right against the tension of the spring 390, moving the arm 391 and shifting the right gear 392 into engagement with the pinion 393 of the countershaft 394, thus driving the barrel screw 395 from the third main shaft 74. The screw gear 396 remains relatively stationary but operates to remove the screw 395. The screw in turn removes the barrel 397 to the right, raising the stripping hook 398 into engagement with the adjacent flange or bead of the tire T, spreading it out as shown in Figure 35. It is at this time that the core stripping mechanism 9 should be considered. Two actions take place almost simultaneously as the barrel screw 395 reaches the limit of its right movement; first the switch pawl 429 engages a tooth of the grip carriage switch $398^a$, moving a metallic segment into engagement with the contact 399, completing the following circuit in Figure 35: current flows from the positive pole of battery $B^2$, over wires 385 and 400 to the switch contacts $398^a$ and 399 to the wire 401, contacts 402 and 403 of the up switch, over wire 404 to the up solenoid 405, returning to the negative pole of the battery via wire 388.

The second action referred to, occurs when the right switch lug 406 engages the head of the rocker switch 383 a few seconds after the switch $398^a$ is turned. This breaks the circuit at the contact 384, deenergizing the right solenoid 387, permitting the spring 390 to move the gear 392 back to neutral, thus stopping the barrel 397 in its extreme right position with the stripping hook 398 in engagement with the flange of the tire. The up solenoid 405, now being energized, draws the core 407 to the left against its spring 408. The arm 409 moves the up gear 410 into engagement with the gear 411 of the screw shaft 412 to start the grip carriage 413 on its upward movement to bring the rigid flange grip 414 into engagement with the inside of the tire flange as shown in Figure 35.

On the grip carriage 413 there is a lug 415, operating between the heads 416 and 417 of the mid switch 418. When this lug reaches the upper head 416, the mid switch is shifted into engagement with the contact 419 in Figure 36, closing the following circuit: Current flows from the positive pole of battery $B^2$ over wire 385 to the rocker switch 383, past the contact 420 (into which the switch was moved by the right switch lug 406) over wire 421 to the bottom contact 419, through mid switch 418 to the wire 422, through the left solenoid 423, returning to the negative pole of the battery via the common wire 388.

The core 389 is thus attracted toward the left against the tension of its spring 424, the arm 391 shifting the left gear 425 into engagement with the pinion 393, causing the barrel screw 395 to travel toward the left carrying the barrel 397 with it. At the shifting of the mid switch into the position shown in Figure 36, the up switch 403 is also shifted breaking the electric circuit shown complete in Figure 35 through the up solenoid 405. The breaking of this circuit at the switch 403 stops the grip carriage 413 in its uppermost position. The protuberance 426 of the pivoted flange grip 427 is now in line with the barrel 397. The barrel screw 395 is moving toward the left as described in connection with Figure 36.

As the barrel 397 moves on its first left movement, the stripping hook 398 is carried down out of engagement with the tire flange, leaving the rigid flange grip 414 in sole engagement with that flange. The barrel 397 presently reaches the protuberance 426, moving the grip 427 to the left against the tension of the spring 428, closing the grip 427 against the outside of the flange as shown in Figures 19 and 37. The purpose of thus gripping the flange of the tire T is to securely hold the tire and permit the core 36 to be pulled out on the backward movement of the secondary carriage.

This backward movement occurs when the dog 430 on the barrel 397 reaches the return switch 376 as in Figure 37, whereupon current flows from the positive pole of battery B' (see Figure 31) over wire 218 to the carriage switch 216, return contact 375 to wire 431, through the return switch 376 to the wire 432, back solenoid 377, returning to the negative pole of the battery via the common wire 221. This energizes the back solenoid 377, drawing the core 222 to the left against the tension of the spring 433, shifting the back gear 434 into engagement to operate the countershaft 226 and screw shaft 227, thus starting the secondary carriage 8 on its backward movement.

In Figure 37, the backwardly moving carriage 8 soon releases the push rod 380, whereupon its spring 381 moves the rockers 435 and 436, the latter through the connection 437, into the dotted line positions. This brings the dog 382 in Figure 36 into position at the left of the rocker switch 383. However, the return dog 438 on the carriage, reaches the outer rocker 436 at a predetermined time, shifting the parts back into the full line position shown in Figure 37, whereupon the rocker switch 383 is again moved against the contact 384 closing the following circuit: Current flows from the positive pole of battery $B^2$ over wire 385 to the switch 383, past contact 384 to wire 386, through the right solenoid 387, returning to the negative pole of the battery via the wire 388.

The barrel 397 is thus started on its second movement toward the right. The switch 383 remains in engagement with the contact 384, because this switch is of the type which remains in the position to which it is moved. The return dog 438 soon releases the outer rocker 436, whereupon the spring 381 moves the push rod 380 back to the original position shown in Figure 38. The second right movement of the barrel 397 releases the flange grip 427 so that the flange of the tire is again freed, but when the barrel reaches the extremity of its right movement, the stripping hook 398 engages the flange on the inside as shown in Figure 38, assisting in holding the tire on the rigid flange grip 414. In fact, the engagement of the stripping hook with the flange of the tire is necessary because the grip carriage 413 now starts down, and this is accomplished in this manner:

The switch pawl 429 turns the grip carriage switch 398$^a$ one quarter, moving a metallic segment over the contact 439, whereupon current flows from the positive pole of battery $B^2$ over wires 385 and 400 to the switch 398$^a$, contact 439, wire 440 to the contact 441 of the down switch 442, wire 443 to the down solenoid 444, returning to the negative pole of the battery via wire 388.

Upon energization of the solenoid 444 the arm 409 is shifted to move the down gear 445 against the gear 411 of the screw shaft 412, immediately starting the grip carriage 413 down. The lug 415 no sooner leaves the upper head 416 of the mid switch 418 than a possible circuit through the left solenoid 423 is broken, which circuit might be completed were it not for the fact that the right switch lug 406 shifts the rocker 383 after the switch 398 is turned one quarter, and not before. This lug moves the switch into engagement with contact 420, as shown in Figure 38, but since the circuit is now broken at the mid-switch 418, no current can flow through the left solenoid 423.

As soon as the lug 415 reaches the lower head 416, of the mid switch 418, on the downward movement of the grip carriage 413, that head moves the down switch 442 out of engagement with the contact 441, de-energizing the down solenoid 444, releasing the down gear 445 from the gear 411 and stopping the carriage 413 in its lowermost position. At the same time the mid switch is shifted into engagement with the upper contact 419, whereupon current flows: from the positive pole of battery $B^2$ over wire 385 to the rocker switch 383, contact 420, wire 421, contact 419, mid switch 418, wire 422 to the left solenoid 423, returning to the negative pole of the battery via wire 388. The left solenoid being energized, shifts the left gear 425 into mesh with the gear 393 turning the barrel screw 395 to start the barrel 397 on its second left movement.

This second left movement continues until the left switch lug 446 engages the head of the rocker switch 383, moving that switch from the contact 420 to break the circuit through the left solenoid 423, thereby stopping the barrel 397 in the original position shown in Figure 33. The position of the lug 446 is so arranged that it will not move the rocker switch 383 against the contact 384, thus preventing the establishment of a circuit through the right solenoid 387. It is left to the push rod 380 and dog 382 to establish this circuit, and this action does not occur until the secondary carriage 8 again moves forwardly, depressing the rod 380 and repeating the cycle of operation described above and commencing in Figure 34. It is at the time of departure of the secondary carriage 8 in Figure 37, wherein the tire T is stripped from the core 36, that the cured tire elevator 10 is set in operation, but the description of that operation is reserved until details of the stripping mechanism are first described.

The push rod 380 is mounted in suitable bearings, and so is the barrel screw 395. That screw is threaded only sufficiently far beyond the sides of the screw gear 396 to produce the proper right and left movements of the screw. The front smooth end of the screw fits in the bore of the barrel 397, with which it has a pin and slot connection 447, 448 as shown in Figure 17, this connection leaving room for relative movement of the barrel 397 and also enabling functioning of the spring 449 which stands ready to absorb any shocks to which the barrel might be subjected.

There is a yoke 450 which supports the screw gear 396 against longitudinal movement. The barrel 397 moves in a cylinder 451 and on this cylinder is mounted the pivotal support 452 of the stripping hook 398. This support has limited sliding movement in the guides 453 against the tension of the spring 454 on the guide rod 455, when the connection 456 operates the stripping hook on the right movement of the barrel. The buffer spring 457 takes up any lost motion of the stripping hook.

The lug 458, to which the guide rod 455, as well as the buffer spring rod 459 is pivoted, is part of the support 452 moving therewith as it moves. The action of the spring can readily be followed in Figures 17, 18, 19 and 20. The whole stripper head 460 may be vertically adjustable by means of the screws 461 should it become necessary to raise or lower the flange gripping mechanism to suit different sizes of tires.

In the event of such adjustment, it is of course necessary to turn the screw shaft 412 correspondingly, whereupon that screw shaft will begin its raising and lowering operations of the grip carriage 413 at different places in respect to the screw bore in that carriage. Screws 462 provide for the horizontal adjustment of the blocks 463, which blocks are for the abutment of the flange 35 of the core 36 as in Figure 18. It is necessary that the point of the stripping hook 398 shall always come to the same place designated b in Figure 18, between the core and tire flange.

Now there are times when the sizes of the tires are changed, but still the point of the hook 398 must enter at the point b. Should the size of the tire be changed to a larger size, it becomes necessary to adjust the blocks 463 outwardly so that the flange of the core may stop at the proper point to let the hook enter at the proper place as described. Under such circumstances, it is also necessary to slightly raise the core and tire because tires of increased size are sometimes larger in diameter.

Provision is made for this upward movement of the core to again bring it in proper registration with the stripping hook, by making the carriage head 464 vertically movable in respect to the secondary carriage 8. As plainly shown in Figure 65, this head moves on suitable guides on the main carriage. Figure 19 shows this head to carry one or more wheels 465 to run up on the raising track 466, which is adjusted on its pivot with the adjustment of the stripper head 460. When the stripper head is adjusted low so that the core supports 361 are about in proper line with the stripping mechanism, no raising action of the carriage head 464 will occur. But if a larger size tire is run through the machine, and the stripping head 460 adjusted higher to suit, the track 466 will raise accordingly so that the carriage head 464 in turn may raise when the wheel 465 runs up thereon.

Spring arms 467 push the lower part of the stripped cured tire T out as in Figure 19, so that the removing function of the elevator 10 may not be obstructed. Figure 19 shows the tire T swung out in dotted lines by these spring arms 467, the functions of which occur when the secondary carriage 8 starts on its backward movement and naturally releases the cured tire.

So far as the switches 418 and 383 are concerned, the simple provision of the proper kinds of springs causes them to function as intended. As stated before, the switch 418 is intended to normally remain in the mid position when unrestrained by the lug 415 of the grip carriage. For this purpose leaf springs 468 are positioned on each side as shown in Figure 67. A coil spring 469, shown in Figure 68 will produce enough friction against the rocker switch 383 to make it remain in either the right, left or mid position, to whichever it may be moved as in the diagrams beginning with Figure 33. Before beginning the operation of the cured tire elevator 10, the reader may refresh his recollection of the operation of the devices in Figures 33 et seq. by referring to the following

*Schedule of electrical operation of the secondary carriage 8.*

Forward movement: Fig. 31—Conveyor 4 closes switch 217 to start secondary carriage 8 forwardly.

Dog 370 opens switch 217 to stop carriage at stripping mechanism.

*Core stripping mechanism 9.*

1st right movement: Fig. 34—Secondary carriage 8 closes switch 383, shifting gear 392 in and starting barrel 397 to the right.

Fig. 35—Stripping hook 398 engages flange of tire.

Switch pawl 429 closes switch 398ª to start grip carriage 413 up.

An instant thereafter, lug 406 opens switch 383 to stop barrel 397 at extreme right.

1st left movement: Fig. 36—Grip carriage 413 reaches uppermost position shifting mid switch 418 to deenergize up solenoid 405 and stop grip carriage.

Shifted mid switch 418 energizes left solenoid 423 starting barrel 397 left.

Fig. 37—Barrel 397 closes grip 427 against tire flange.

Stripping hook 398 is lowered.

Dog 430 closes return switch 376 energizing back solenoid 377 starting carriage 8 back, pulling core 36 out of tire T.

Push rod 380, springing back after release by dog 438, shifts rocker switch 383 right energizing right solenoid 387 moving barrel 397 right.

Dog. 470 on carriage 8 closes switch 471 to start elevator 10 down.

2nd right movement: Fig. 38—Stripping hook 398 again moves up to support tire flange while grip carriage 413 moves down.

Pawl 429 turns switch 398 one-quarter energizing solenoid 444 to start grip carriage 413 down.

Mid switch 418 breaks circuit of left solenoid 423 at contact 419.

Immediately thereafter rocker switch 383 engages contact 420, but the solenoid 423 circuit is broken at 418.

2nd left movement: Fig. 38—Mid switch 418 engages upper contact 419, energizing left solenoid 423, starting barrel 397 left.

Left switch lug 446 shifts rocker switch 383 between contacts 384 and 420, stopping barrel.

*Grip carriage 413.*

Upward movement: Fig. 35—Barrel screw 395 moves switch 398ª to energize solenoid 405 and start grip carriage 413 up.

Fig. 36—Lug 415 opens switch 403 to stop grip carriage.

Lug 415 closes mid-switch 418 to start barrel 397 left.

Downward movement: Fig. 37—Lug 415 releases upper head 416 letting mid switch 418 center itself.

Fig. 38—Lug 415 depresses lower head 416 to shift down switch 442 from contact 441 to stop grip carriage.

The cured tire elevator 10, (taking up the operation where it was left off in Figure 37) is started when the dog 470 on the carriage 8 shifts the down switch 471 into engagement with the contact 472 closing the following circuit: Current flows from the positive pole of battery B² over wire 473 to the switch 471, past contact 472 over wire 474 to the elevator down solenoid 475, returning to the negative pole of the battery via wire 388. The core 476 is moved to the right shifting the arm 477, consequently moving the down gear 478 into engagement to start the screw shafts 479 in rotation, consequently bringing the elevator 10 down.

When the barrel 397 has accomplished its second right movement in Figure 38, the elevator will be down. Here it stops itself by the engagement of the switch 471 by the extension 480, breaking the circuit at contact 472, deenergizing the solenoid 475 and permitting the spring 481 to shift the arm 477 and gear 478 into a neutral position. However, the elevator 10 does not remain in the down position but immediately starts up again. This is accomplished by the engagement of the switch 471 with the contact 482 when the following circuit is completed:

Current flows from the positive pole of battery B² over wire 473 to the switch 471, contact 482, wire 483 to the up solenoid 484, returning to the negative pole of the battery via wire 388. The core 476 is now attracted to the left, shifting the up gear 485 to reverse the direction of rotation of the screws 479, thereby starting the elevator 10 on its upward journey. By this time, the grip carriage 413 has receded to its lowermost position, the cured tire T hanging on the stripping hook 398, as shown in Figure 20, awaiting removal by the catch 486 as shown in Figure 21. When the elevator 10 reaches the uppermost position it engages the link 487, moving that link into parallelism with the upper edge of the elevator, and shifting the down switch 471 into a mid position between the contacts 472, 482, by means of the connection 488.

At the same time that the tire elevator 10 reaches the top and stops, the crank 489, shown in Figure 20, strikes a fixed abutment 490, shown in Figure 21, lifting the latch 491 from engagement with the catch 486, releasing the cured tire T which thereupon falls on the roller platform 48 to move away to a point of disposal. The screw shafts 479 are driven as shown in Figure 44. The countershaft 492 is divided because it occupies the same plane as the third main shaft 74. The gear connections are plainly shown; the screw shafts are oppositely threaded so that the opposite rotations of the parts of the countershaft may be properly compensated for.

The mold remover 11, is for the purpose of removing entire molds 18, 19 from the machine, instead of re-filling them with fresh cores and uncured tires, to be replaced on top of the mold stack in one of the mold head compartments. Normally, the remover is swung up on its pivot 59, as in Figure 23, to be out of the way, the cable 60, operated by the drum 493, being used to both hoist the remover and let it down. To hoist the remover, the operator must pull up on the lever 494, which clutches the gear train 495 in so that driving motion from the third main shaft 74 is imparted to the drum 493. To let the remover down, he operates the brake 496, by means of which the downward speed can be checked. The cable 60 runs over a sheave as shown in a small detail in connection with Figure 23. The remover may be supported on a hook 497 shown in that detail.

To start the remover carriage 63 in Figure 26 down, the operator moves the lever 498 inwardly, thereby shifting the gear 499 into engagement with the pinion 500. This pinion is on a countershaft 501, driven from the second main shaft 73. To move the carriage 63 up, the lever 498 is moved outwardly, shifting the gear 502 into engagement with the pinion 500, which reverses the direction of rotation of the screw 62.

Figure 69:
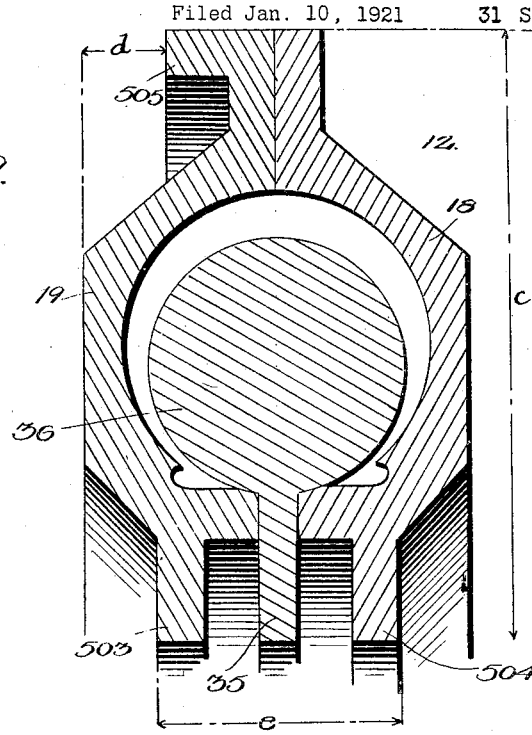
Figure 69 is a detail sectional view of a part of the improved mold used in connection with this apparatus.

The mold 12, designated such as a whole, but composed of the half sections 18 and 19, mentioned throughout the above description, is constructed in accordance with certain fixed dimensions which must not vary, otherwise the molds will not fit in the machine. Attention is directed to Figure 69.

Figure 70:
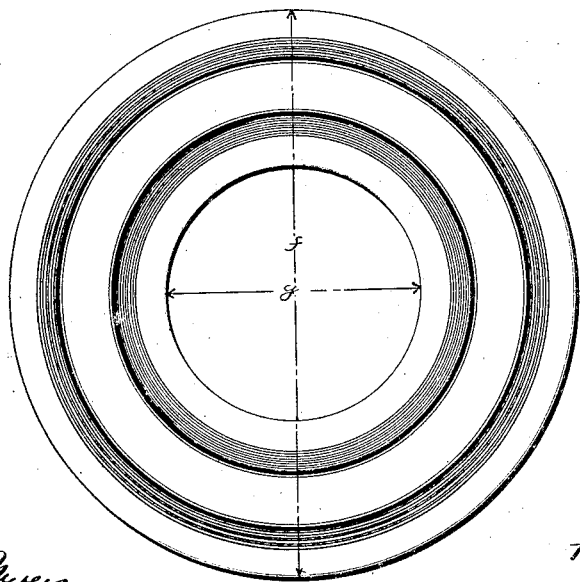
Figure 70 is an elevation of the complete mold.

Dimensions c, d and e do not vary as the sizes of tire run through the machine vary. In other words, these dimensions remain constant for one machine, and that machine may handle tires from 28" x 3" to 32" x 4". Another machine handles tires from 32" x 4" to 34" x 6". In each case, the dimensions mentioned are properly fixed, increasing only as the molds are used for larger sized tires in different machines. Similarly, the dimensions f and g in Figure 70 remain the same for the particular molds of one machine.

Each half section 18 and 19 has an inwardly extending flange 503 and 504 respectively to be engaged by the outer grip 132 of the carriage 2 and the inner grip 143 of the transfer table 3. The flange 35 of the core 36 comes in the center of the flanges 503, 504, in position to be gripped by the jaws 139 of the extension 37. The parts of the mold are made of any suitable material, usually iron, and are quite heavy. The annular flange 505 on the inner section 18 rests on the release latch 90 and latch bolt 89, and of course the dimension d must not vary, otherwise there will be an improper registration when subsequent operations are carried out.

Mention has been made of the removal of the lid 15 from the heater 13 in order to gain access to the stack of molds. Figure 2 illustrates a hoist carriage 506 running on a rail 507 which is carried by the truck 24. This carriage in turn provides a rail for the block 508 from which the chain 509 is suspended. The hook 510 of course enters the eye 16, whereupon the block 508 may be made to move to one side by turning the screw shaft 511 through its operating connections 512. These connections are like any ordinary chain hoist, and when operated, simply move the lid 15 to one side and out of the way of the operation of the mold head 1.

While the construction of the improved tire handling apparatus as herein described and claimed, is that of a generally preferred form, obviously modifications and changes may be made without departing from the spirit of the invention or the scope of the claims.

I claim:—

1. Mold handling apparatus, comprising a mold head adapted to carry a stack of molds containing cured tires, means adapted to advance under the stack to receive a mold, means adapted to be set in operation by the receiving means to transfer a mold from beneath the stack into the receiving position, and means normally sustaining the mold stack, releasable by said transferring means to in turn release the bottom mold.

2. Mold handling apparatus, comprising a mold head with a stack of molds containing cured tires, means advancing toward the stack to receive a mold, means set in operation by said receiving means to transfer a mold from beneath the stack into a receiving position, and means embodied in said receiving and transferring means for separating the mold to expose the cured tire.

3. Mold handling apparatus, comprising a mold head with a stack of molds containing cured tires, means advancing toward the stack to receive a mold, means set in operation by said receiving means to transfer a mold from beneath the stack into a receiving position, means embodied in said receiving and transferring means for separating the mold to expose the cured tire, and means for disposing of said tire.

4. Mold handling apparatus, comprising a mold head adapted to carry a stack of molds containing cores and cured tires, means adapted to advance toward the mold head to receive a mold, means adapted to be set in operation by the receiving means to transfer the bottom mold from the stack into a receiving position, means embodied in the receiving and transferring means for separating the mold and exposing the core and tire, means for disposing of the core and tire, and means for substituting another core and uncured tire to be subsequently closed into said separated mold.

5. Mold handling apparatus, comprising a mold head adapted to carry a stack of molds containing cores and cured tires, means adapted to advance toward the mold head to receive a mold, means adapted to be set in operation by the receiving means to transfer the bottom mold from the stack into a receiving position, means embodied in the receiving and transferring means for separating the mold and exposing the core and tire, means for disposing of the core and tire, means for substituting another core and uncured tire to be subsequently closed into said separated mold, and means for conveying the then closed mold on top of the cured mold stack.

6. In mold handling apparatus, means to transfer a mold from a stack of molds, a carriage to advance and remove the mold from the transporting means, and means let down into position to intercept the mold for removal from the apparatus.

7. Mold handling apparatus, comprising means for separating the sections of a mold to expose the core and cured tire contained thereby, and means for carrying out the core with its tire while the mold sections remain.

8. Mold handling apparatus, comprising means for separating the sections of a mold to expose the core and cured tire contained thereby, means for carrying out the core with its tire while the mold sections remain, and means for substituting a new core and uncured tire to be closed between said mold sections.

9. Mold handling apparatus, comprising means for separating the sections of a mold to expose the core and cured tire contained thereby, means for lifting out said core and tire, and means for lowering a new core and uncured tire into position to be subsequently enclosed by said sections.

10. Mold handling apparatus, comprising means for separating the sections of a mold to expose the core and cured tire contained thereby, means for lifting out said core and tire, means for lowering a new core and uncured tire into position to be subsequently enclosed by said sections, and means for lifting the then closed mold with its new core and uncured tire from the region of the separating means.

11. Mold handling apparatus, comprising means adapted to carry a stack of molds containing cured tires, and transferring means for removing one mold from beneath the stack.

12. Mold handling apparatus, comprising means adapted to carry a stack of molds, and means for removing one mold from beneath the stack and transferring it into a vertical position.

13. Mold handling apparatus, comprising a mold head adapted to carry a stack of molds containing cured tires, means for removing one mold from beneath the stack and transferring it into a vertical position, means normally sustaining the stack but engageable by the transferring means to release said one mold, and means for supporting the remainder of the stack while the one mold is removed.

14. Mold handling apparatus, comprising a mold head adapted to carry a stack of molds containing cured tires, means, including a latch supporting the stack on the head; means arranged to engage the latch and release a mold, and transfer it from the stack; and means for supporting the remainder of the stack to keep it from following the one mold.

15. Mold handling apparatus, comprising a mold head adapted to carry a stack of molds containing cured tires, means, including a latch supporting the stack on the head; means arranged to engage the latch and release a mold, and transfer it from the stack; and means supporting the rest of the stack, becoming operative to slowly lower it upon the now-vacant latch.

16. Mold handling apparatus, comprising a mold head adapted to carry a stack of molds containing cured tires, means supporting the stack on the head, means moving to shift the supporting means, catch a mold thus released and transfer it into a vertical position; and means acting against a fluid column, letting the remainder of the stack down slowly on the now-vacant supporting means.

17. Mold handling apparatus, comprising a mold head adapted to carry a stack of molds containing cured tires, means supporting the stack on the head, means moving to shift the supporting means, catch a mold thus released and transfer it into a vertical position; means acting against a fluid column, letting the remainder of the stack down slowly on the now-vacant supporting means, and means for returning said means into position against the mold next highest up after the stack reaches said supporting means.

18. Mold handling apparatus, comprising a mold head adapted to carry a stack of molds containing cured tires, supporting means for the stack at diametrically opposite points, means arranged to move against and shift one of the supporting means to release the adjacent side of a mold whereupon it turns on the other supporting means and is transferred into a vertical position; means at other diametrically opposite points, acting against fluid columns to retard the settling of the rest of the stacks against the now-vacant supporting means, and means for returning said retarding means into normal position against the next highest mold, after the stack reaches said supporting means.

19. Mold handling apparatus, comprising a mold head, having an opening and standards constituting a compartment adapted to carry molds containing cured tires; means on one of the standards and at one side of the opening for supporting the stack, means on other standards for engaging the second mold from the bottom, means movable in one direction to engage and shift the supporting means at the side of the opening to release the bottom mold to pass out of the opening, rock on the other support and be transferred into a vertical position on another movement of said engaging means, the rest of the stack then lowering against the supporting means by its engaging means; and means for returning said engaging means to the mold next highest when the stack comes to rest.

20. Mold handling apparatus, comprising a mold head, with means for supporting a stack of molds containing cured tires; means movable to engage the supporting means and release the bottom mold, and means for retarding the return movement of said means in transferring the mold to a vertical position.

21. Mold handling apparatus, comprising a mold head, with means for supporting a stack of molds containing cured tires; transferring means, with means tending to move it, and means normally locking the transferring means to prevent such movement; and means for releasing the lock enabling the transferring means to move and engage the supporting means for the release of a mold.

22. Mold handling apparatus, comprising a mold head, with means for supporting a stack of molds containing cured tires; transferring means, with means tending to move it, means normally locking the transferring means to prevent such movement; means for releasing the lock enabling the transferring means to move and engage the supporting means for the release of a mold, and a device for checking the return movement of the transferring means with its mold into the re-locking position.

23. Mold handling apparatus, comprising a mold head, with means adapted to support a stack of molds containing cured tires; transferring means, with means tending to move it, and means locking it against such movement; a primary carriage, and means movable in advance of the primary carriage to displace the lock and permit the transferring means to move by its moving means to shift the supporting means and release the bottom mold in readiness for the primary carriage.

24. Mold handling apparatus, comprising a mold head, with means adapted to support a stack of molds containing cured tires; transferring means, with means tending to move it, and means locking it against such movement; a primary carriage, means movable in advance of the primary carriage to displace the lock and permit the transferring means to move by its moving means to shift the supporting means and release the bottom mold in readiness for the primary carriage, and means arranged to retard the return movement of the transferring means into the re-locking position ahead of said carriage.

25. Mold handling apparatus, comprising a mold head, with means adapted to support a stack of molds containing cured tires; transferring means, with means tending to move it against the support, and means locking it against such movement; a primary carriage, and means, including a cam, fixed in advance of the carriage adapted to displace the locking means permitting the transferring means to obtain a mold and bring it into position to be received by the carriage.

26. Mold handling apparatus, comprising a mold head, with means supporting a stack of molds containing cores and cured tires, transferring means, with means tending to move it against the support to release the bottom mold, and means locking it against such movement; an advancing primary carriage with a cam displacing the locking means, enabling the transferring means to obtain a mold and place it in position to be received by the carriage; and means respectively on the carriage and transferring means to grip the mold sections for separating them to expose the core and tire on the return movement of the carriage.

27. Mold handling apparatus, comprising a mold head, with means supporting a stack of molds containing cores and cured tires, transferring means, with means tending to move it against the support to release the bottom mold, and means locking it against such movement; an advancing primary carriage with a cam displacing the locking means, enabling the transferring means to obtain a mold and place it in position to be received by the carriage; means respectively on the carriage and transferring means to grip the mold sections for separating them to expose the core and tire on the return movement of the carriage, and means embodied in the carriage for independently gripping the core.

28. Mold handling apparatus, comprising means for transferring a mold, composed of sections and containing a core with a cured tire, into a receiving position; means on the transferring means for gripping the inner mold section, an advancing primary carriage with means for gripping the outer mold section, and means, movable in an opposite direction when the carriage moves backwardly with the outer mold section, with means for gripping the core to separate it from said outer mold section.

29. Mold handling apparatus, comprising a primary carriage, means for grippig an outer mold section, means for gripping a core with a cured tire contained by said section, and means for gripping the core-gripping means reversely to a movement of the carriage to separate the core from said section.

30. Mold handling apparatus, comprising a primary carriage, with an extension for supporting the outer section of a mold, which is adapted to contain a core and cured tire; means causing a retrograde movement of the carriage, means on the carriage gripping the outer mold section, means on the extension gripping the core, and means causing an opposite movement of the extension during the retrograde movement of the carriage to separate the core and tire from the mold section.

31. Mold handling apparatus, comprising a primary carriage, with means for gripping an outer mold section; an extension on the carriage with means for gripping a core having a cured tire contained by said section; means producing a retrograde movement of the carriage and means, including rack and gear devices, for oppositely sliding the extension during the retrograde movement of the carriage to separate the core and tire from the outer mold section.

32. Mold handling apparatus, comprising a primary carriage, with means for gripping an outer mold section; an extension on the carriage with means for gripping a core having a cured tire contained by said section; means producing a retrograde movement of the carriage, and means, including a rack on the extension, a rack relatively fixed, and intermediate gears, for sliding the extension reversely to the retrograde movement of the carriage to release the core and tire from the outer mold section.

33. Mold handling apparatus, comprising a primary carriage, with means producing forward and retrograde movements; and an extension on the carriage, with means producing sliding movement thereof opposite to those of the carriage.

34. Mold handling apparatus, comprising a primary carriage, with means for producing a forward movement; and an extension with means for producing a retractory movement thereof on the carriage after the carriage has advanced a predetermined distance.

35. Mold handling apparatus, comprising a primary carriage with means for producing a retrograde movement, and a retracted extension on the carriage, with means for immediately starting a projecting movement of the extension, continuing for a predetermined period during said retrograde movement.

36. Mold handling apparatus, comprising a primary carriage, with wheels running upon rails; means for producing forward and retrograde movements of the carriage, a normally projected extension on the carriage, and means fixed in respect to the rails. producing the retraction of the extension after a predetermined forward movement of the carriage, and a projection of the extension beginning immediately on the retrograde movement but ending before said movement is completed.

37. Mold handling apparatus, comprising means for receiving and transferring a stack of molds filled with cores and cured tires, from a heater; means for separating the sections of the molds one by one to expose the cores and cured tires, means for transporting the exposed core and tire to one side, means for stripping the cured tire from the core, and means for lowering a new core and uncured tire into the former position of the other core and tire, to be subsequently closed into the mold.

38. Mold handling apparatus, comprising means for receiving and transferring a stack of molds containing cores and cured tires from a heater; means for opening a single mold from the stack to expose the core and cured tire, means for transporting the core and tire to one side, means forwarding the core and tire to stripping mechanism to remove the cured tire from the core, means for disposing of the tire, means for disposing of the core, and means for replacing the core and tire by a new core and uncured tire to be subsequently enclosed by the sections of the mold.

39. Mold handling apparatus, comprising means with a stack of molds containing cores and cured tires, means for stripping a cured tire from a core, means, including a primary carriage adapted to advance to receive a mold, open the sections and expose the core; transversely movable means for transporting the core into line with the stripping mechanism, and means, including a secondary carriage adapted to advance, to carry the core and cured tire to the stripping mechanism.

40. Mold handling apparatus, comprising means with a stack of molds containing cores and cured tires, means, including a primary carriage adapted to advance to receive a mold, and retrograding to expose the mold and cured tire; means for stripping a core of its cured tire, transversely operative means for transporting the core into line with the stripping means, forwardly moving means, including a secondary carriage, for advancing the core to the stripping means, retrograding with the empty core; and means for disposing of the core from the secondary carriage when the latter reaches said means on said retrograde movement.

41. Mold handling apparatus, comprising means for receiving and transferring a stack of molds containing cores and cured tires from a heater; means for transferring single molds from beneath the stack into a vertical position, means, including a primary carriage, advancing to the transferring means and cooperating therewith to separate the mold sections to expose the core; a transversely operative conveyor transporting the core from the primary carriage, means, including a secondary carriage, operative in parallelism with the primary carriage, gripping the core and moving it to stripping means where the cured tire is removed; and means moving in the direction of said conveyor, receiving the empty core for its disposal.

42. Mold handling apparatus, comprising a primary carriage adapted to advance to a core-receiving position, core gripping means, an abutment, and means holding said gripping means normally retracted, but adapted to release said means to grip a core when said abutment is engaged.

43. Mold handling apparatus, comprising a primary carriage adapted to advance to a core-receiving position, gripping means, including a plurality of jaws, an abutment, and means, including a trip, normally holding said means retracted, but engageable with said abutment to be shifted and release said means to grip a core then in position.

44. Mold handling apparatus, comprising a primary carriage adapted to advance to a core-receiving position, means including a pivoted rocker, carrying core-gripping means; and means engaging the rocker to normally hold the gripping means retracted, engageable with said abutment to release the rocker and gripping means to grip a core then in position.

45. Mold handling apparatus, comprising a primary carriage adapted to advance to a core-receiving position, core gripping means, with resilient means tending to move it into operative position; an abutment, means including a pivoted rocker in operative connection with said gripping means, means including a trip engaging the rocker to normally hold the gripping means retracted, engageable with said abutment to release the rocker, permitting the resilient means to project the gripping means; and means operating through said rocker to restore the gripping means to the retracted position for re-engagement of the rocker by said engageable means.

46. Mold handling apparatus, comprising a primary carriage adapted to make a second forward movement, with separate means respectively gripping an outer mold section and a new core with an uncured tire, transferring means toward which the carriage is advancing, including means gripping an inner mold section, and means causing the release of said last gripping means when the carriage begins a second retrograde movement.

47. Mold handling apparatus, comprising a primary carriage adapted to make a second forward movement, with separate means respectively gripping an outer mold section and a new core with an uncured tire, transferring means toward which the carriage is advancing, including means gripping an inner mold section, means causing the release of said last gripping means when the carriage begins a second retrograde movement, and companion means causing the release of the outer section gripping means when the carriage is on said second retrograde movement.

48. Mold handling apparatus, comprising a primary carriage adapted to make a second forward movement, having separate means respectively gripping an outer mold section and a new core with an uncured tire, transferring means toward which the carriage is adapted to advance, including means for gripping an inner mold section, means causing the release of said last gripping means when the carriage begins a second retrograde movement, and means actuated by the same means for engaging the inner mold section to pull the entire mold with the carriage on its second retrograde movement.

49. Mold handling apparatus, comprising a primary carriage adapted to advance on a second forward movement carrying a new core and uncured tire, having means gripping an outer mold section; a transferring table with means gripping an inner mold section, toward which said carriage advances; and electro-magnetically operated means for displacing said inner section gripping means in readiness to permit the removal of the complete mold when the carriage makes a second retrograde movement.

50. Mold handling apparatus, comprising a primary carriage adapted to make a second forward movement carrying a new core and uncured tire, with means adapted to grip an outer mold section; a transferring table with means gripping an inner mold section; a mold grip normally retracted, and electro-magnetic means operated when the carriage nears the end of said movement to simultaneously release the inner section gripping means and project the mold grip into engagement with said section, to draw away the entire mold on the second retrograde movement of the primary carriage.

51. Mold handling apparatus, comprising a primary carriage adapted to make a second forward movement carrying a new core and uncured tire, with means adapted to grip an outer mold section; a transferring table with means gripping an inner mold section; a mold grip normally retracted, electro-magnetic means operated when the carriage nears the end of said movement to simultaneously release the inner section gripping means and project the mold grip into engagement with said section, to draw away the entire mold on the second retrograde movement of the primary carriage, and means operated by a part of said electro-magnetic means as the carriage proceeds on said last movement, for releasing the outer section gripping means from its section.

52. Mold handling apparatus, comprising a primary carriage adapted to make a second forward movement carrying a new core and uncured tire, with means gripping an outer mold section; a transferring table, with means gripping an inner mold section toward which the carriage is advancing; normally retracted mold-gripping means on the carriage, a solenoid adapted to be energized on the closure of a switch by the carriage near the end of said movement, and a secondary ramp projectable to simultaneously release the inner section gripping means and move the mold grip into engagement therewith to withdraw the entire mold on the second retrograde movement of said carriage.

53. Mold handling apparatus, comprising a primary carriage adapted to make a second forward movement carrying a new core and uncured tire, with means gripping an outer mold section; a transferring table, with means gripping an inner mold section toward which the carriage is adapted to advance normally retracted mold-gripping means on the carriage, a solenoid energizable on the closure of a switch by the carriage near the end of said movement, a secondary ramp projectable to simultaneously release the inner section gripping means and move the mold grip into engagement therewith to withdraw the entire mold on the second retrograde movement of said carriage, and a primary ramp also projectable on the energization of said solenoid, engageable by a part of the outer section gripping means for its release as the carriage proceeds on said last movement.

54. Mold handling apparatus, comprising a primary carriage adapted to make a second forward movement carrying a new core and uncured tire, with means gripping an outer mold section; a transferring table, with means gripping an inner mold section toward which the carriage is adapted to advance normally retracted mold-gripping means on the carriage, a solenoid energizable on the closure of a switch by the carriage near the end of said movement, a secondary ramp projectable to simultaneously release the inner section gripping means and move the mold grip into engagement therewith to withdraw the entire mold on the second retrograde movement of said carriage, a primary ramp also projectable on the energization of said solenoid, engageable by a part of the outer section gripping means for its release as the carriage proceeds on said last movement, and means on the carriage for turning said switch during said movement to deenergize the solenoid and retract said ramps.

55. Mold handling apparatus, comprising a primary carriage adapted to make a plurality of forward and retrograde movements, carrying means for gripping various parts of a mold; an electric switch normally open, actuated one step on each movement of the carriage; and electro-magnetic means energized by the final closure of the switch on one of the forward movements of the carriage, to actuate said gripping means in a predetermined manner.

56. Mold handling apparatus, comprising a primary carriage adapted to make a plurality of forward and retrograde movements, carrying means for gripping various parts of a mold; an open ratchet switch actuated one step by dogs on each of said carriage movements, and normally dormant eletro-magnet means energized by the final closure of the switch on one of said movements, to cause said gripping means to perform a predetermined operation.

57. Mold handling apparatus, comprising a primary carriage adapted to advance to enclose a new core and uncured tire in a mold, and arranged to retrograde to withdraw the filled mold; a transposing elevator started down on the advancing movement of the carriage, and means for stopping said elevator when down, to await the filled mold on said retrograde movement.

58. Mold handling apparatus, comprising a primary carriage adapted to advance to enclose a new core and uncured tire in a mold, and arranged to retrograde to withdraw the filled mold; means for receiving the filled mold for removal from the carriage, means operating on the advancing movement of the carriage to start said receiving means into receiving position, and means operated by said means to stop it in position to await said mold on the retrograde movement of the carriage.

59. Mold handling apparatus, comprising a primary carriage adapted to advance to enclose a new core and uncured tire in a mold, and arranged to retrograde to withdraw the filled mold; a transposing elevator normally dormant and out of the path of said carriage, means actuated on the advancing movement of the carriage to start the elevator toward the path of the primary carriage, means for stopping said elevator in the path of retrograde movement of the carriage to receive the mold, and means then actuated to start the elevator away with the mold.

60. Mold handling apparatus, comprising means with a stack of molds containing cores and cured tires, a primary carriage arranged to advance to enclose a new core and uncured tire in a mold, and retrograde to withdraw the filled mold; a transposing elevator normally dormant and out of the path of said carriage, means actuated on the advancing movement of the carriage to start the elevator toward the path of the primary carriage, means for stopping said elevator in the path of retrograde movement of the carriage to receive the mold, and means then actuated to start the elevator away and place the mold on said stack.

61. Mold handling apparatus, comprising means with a stack of molds containing cores and cured tires, a primary carriage arranged to advance to enclose a new core and uncured tire in a mold, and retrograde to withdraw the filled mold; a transposing elevator normally dormant and out of the path of said carriage, means actuated on the advancing movement of the carriage to start the elevator toward the path of the primary carriage, means for stopping said elevator in the path of retrograde movement of the carriage to receive the mold, means then actuated to start the elevator away and place the mold on said stack, and means actuated on continued movement of said elevator to automatically stop said elevator in the normal rest position.

62. Mold handling apparatus, comprising a primary carriage arranged to advance to enclose a new core and uncured tire in a mold, and retrograde to withdraw said filled mold; a transposing elevator in normal rest position, electro-mechanical means set in operation on the advancing movement of the carriage to start the elevator from its rest position, and an electric switch actuated by a part of the elevator to break an operative electric circuit and stop the elevator in position to receive the mold on the retrograde movement of the carriage.

63. Mold handling apparatus, comprising a primary carriage, with means producing alternate forward and retrograde movements, operatively associated means by which a mold is opened and its core and cured tire exposed on certain movements of the carriage; and operatively associated means by which a new core and uncured tire is substituted for the other and the mold disposed of in a predetermined manner, on other movements of the carriage.

64. Mold handling apparatus, comprising a primary carriage arranged to make a succession of forward and retrograde movements, adapted to carry an outer mold section and new core with an uncured tire on the last forward movement; means holding an inner mold section toward which the carriage advances, a normally open electric switch actuated one step on each movement of the carriage and closed on the last forward movement, an elevator normally at rest out of line with the carriage, mechanism by which it is operated, and electric shifting devices energized upon closure of said switch to render said mechanism operative and move in line with the carriage for the reception of the mold when closed.

65. Mold handling apparatus, comprising a primary carriage arranged to make a succession of forward and retrograde movements, and arranged to enclose a new core and uncured tire in the sections of a mold; an elevator normally at rest out of line with the carriage, screw shafts and shiftable gear devices, normally inoperative, by which the elevator is moved; means operated on one of the carriage movements to start the elevator from the rest position, and means for stopping the elevator in the path of the carriage to receive the closed mold on the next movement of the carriage.

66. Mold handling apparatus, comprising spaced screw shafts, with an elevator operatable thereby at rest thereon; shiftable gear devices by which said shafts are actuatable, a primary carriage movable forwardly between said shafts to enclose a new core and uncured tire in the sections of a mold, means rendered operative to shift said gear devices into engagement and actuate said screw shafts on said forward movement, and means for stopping the elevator in the path of the carriage to intercept the closed mold on the return movement thereof.

67. Mold handling apparatus, comprising spaced screw shafts, with an elevator operated thereby at rest thereon; disengaged shiftable gear devices by which said shafts are actuated, a primary carriage moving forwardly between said shafts to enclose a new core and uncured tire in the sections of a mold, means rendered operative to shift said gear devices and actuate said screw shafts on said forward movement, means for stopping the elevator in the path of the carriage to intercept the closed mold on the return movement thereof, and means actuated by the carriage on said next movement for starting the elevator back with said mold.

68. Mold handling apparatus, comprising an elevator, with operating mechanism normally at rest; electric actuating means for said mechanism, embraced in a circuit normally open at a down switch; and a primary carriage making a movement to enclose a new core and uncured tire in the sections of a mold, having operatively associated means for closing said circuit at the down switch.

69. Mold handling apparatus, comprising an elevator, with operating mechanism normally at rest; electric actuating means for said mechanism, embraced in a circuit normally open at a down switch; a primary carriage making a movement to enclose a new core and uncured tire in the sections of a mold, and a switch closed on said movement of the carriage to actuate operatively associated electric mechanism, to in turn close said circuit at said down switch.

70. Mold handling apparatus, comprising an elevator, with operating mechanism normally at rest; electric actuating means for said mechanism, embraced in a circuit normally open at a down switch; a primary carriage making a movement to enclose a new core and uncured tire in the sections of a mold, a switch, controlling an independent circuit, closed on said movement; and an electromagnetic device in said circuit, energized upon said closure to shift a primary ramp and in turn close the first circuit at said down switch.

71. In mold handling apparatus, an elevator and mechanism by which it is operated, normally at rest; driving means disengaged from the operating mechanism, and a circuit embracing a solenoid for shifting the actuating means in when energized, a down switch completing part of said circuit and an up stop switch held open to break said circuit by said elevator.

72. In mold handling apparatus, an elevator and mechanism by which it is operated, normally at rest; driving means disengaged from the operating mechanism, a circuit embracing a solenoid for shifting the actuating means in when energized, a down switch completing part of said circuit, and an up stop switch held open to break said circuit by said elevator; and a primary carriage advancing to a mold-closing position, causing the operation of associated mechanism to shift the down switch to close another part of said circuit, thus introducing a closed stop switch, completing said circuit through said solenoid.

73. In mold handling apparatus, an elevator with operating mechanism normally at rest, disengaged driving means with de-energized electro-magnetic actuating means, a circuit embracing said electro-magnetic means, with a down switch closing said circuit at one point, and an up stop switch held open to break said circuit by said elevator; a stop switch completing a branch of said circuit which, however, is open at a second point of the down switch, and means for shifting the down switch against the second point to complete the branch circuit through the stop switch and said electro-magnetic means to start the elevator, said elevator again breaking the circuit upon engagement with the stop switch.

74. In mold handling apparatus, an elevator with operating mechanism normally at rest, disengaged driving means with de-energized electro-magnetic actuating means, a circuit embracing said electro-magnetic means, with a down switch closing said circuit at one point, and an up stop switch held open to break said circuit by said elevator; a stop switch completing a branch of said circuit which, however, is open at a second point of the down switch, and means shiftable in one direction to move the down switch against said second point, completing the branch circuit to energize the electro-magnetic means and start the elevator, which permits the up stop switch to close, the elevator breaking said branch circuit upon engagement with the stop switch, and movable in the other direction to permit the down switch to re-engage the first point, completing the first circuit through the up stop switch and other electro-magnetic means for reversely shifting the driving means and returning the elevator.

75. In mold handling apparatus, a primary carriage with separate means for gripping parts of a mold, and actuating means for said gripping means including offset ramps, one in line with certain of the actuating means, the other in line with another of said actuating means.

76. In mold handling apparatus, a primary carriage with separate means for gripping parts of a mold, each with an engageable member; and actuating means for said gripping means, including offset ramps, one in line with one of said engageable means, the other in line with the other engageable means.

77. In mold handling apparatus, a primary carriage, with outer section gripping means, inner section gripping means and entire mold gripping means, each with an engageable member; and actuating means for the respective gripping means, comprising an element in line with the engageable means of the mold grip and inner section grip and another element in line with the engageable means of the outer section gripping means.

78. In mold handling apparatus, a primary carriage with a part on the surface of which the sections and core of a mold rest, and means embodied within the carriage projectable above said surface into gripping engagement with said mold parts.

79. In mold handling apparatus, a primary carriage with a part on the surface of which the sections and core of a mold are adapted to rest, and means embodied in the carriage projectable into gripping engagement in such a manner as to carry a single section and core in one instance and the entire mold in another.

80. In mold handling apparatus, a primary carriage adapted to support the sections and core of a mold, and means embodied in the carriage, operated radially to grip said parts of the mold.

81. In mold handling apparatus, a primary carriage adapted to support the sections and core of a mold, means embodied in the carriage, operated radially to grip said parts of the mold, and means actuated on a swinging motion to reversely operate certain of said gripping means.

82. In mold handling apparatus, a primary carriage adapted to advance to a mold-receiving position, means for transferring a mold from one plane into that of movement of the carriage, normally in the path of the carriage; and means operatable in advance of the carriage for causing said transferring means to perform its functions.

83. In mold handling apparatus, a primary carriage adapted to advance in a rectilinear direction to a mold-receiving position, means adapted to swing into a plane parallel to said direction and back to place a mold at right angles thereto, said means normally resting in such plane; and means operatable in advance of the carriage for initiating said means on its function.

84. In mold handling apparatus, a primary carriage movable to a mold-receiving position, means for transferring a mold from one plane to another across the path of the carriage, and means on said transferring means so supporting the mold in said plane that the carriage may move thereunder.

85. In mold handling apparatus, means for transferring a complete mold from one to a second plane, means for holding the transferring means in the second plane, a primary carriage adapted to advance to a mold receiving position, means arranged to travel in advance of the carriage for shifting the holding means to release the transferring means to obtain the mold in the first plane, then moving back to the second plane where the holding means again engages; and means on the carriage withdrawing part of the mold, leaving another part on said transferring means to hold it down in the second plane when the holding means is again shifted on a reverse movement of the carriage.

86. In mold handling apparatus, means for transferring a complete mold from one to a second plane, and gripping one of the sections; means normally locking the transferring means in the second plane, a primary carriage, with an unlocking cam, arranged to advance to a mold receiving position, causing the unlocking of the transferring means for movement to the first plane to obtain the mold, and back to the second plane with the mold; and means embodied in the carriage for gripping and removing another part of the mold, leaving the first part to hold the transferring means down when the unlocking means again releases the locking means on the reverse movement of the carriage.

87. In mold handling apparatus, means for transferring a complete mold from one to another plane, means for rapidly moving the tranferring means to the first plane, where the mold is obtained, and means including a dashpot, for checking its movement to the second plane with the mold.

88. In mold handling apparatus, means for transferring a complete mold from a horizontal to a vertical plane, pushing apparatus for moving the transferring means to the horizontal plane where it receives the mold, and a fluid check for retarding its movement to the vertical plane with the mold.

89. In mold handling apparatus, means for transferring a complete mold from one plane to a second plane, including means on which the mold rests; a primary carriage adapted to advance to receive the mold and at such time extending into an opening in the transferring means, including a retracted extension passing only within the mold; means on the transferring means for detaining the inner mold section, means on the extension for gripping the core of the mold, and means on the carriage for gripping the outer mold section.

90. In mold handling apparatus, a holder arranged to contain a stack of molds, an elevator operatable beside the stack for lifting a mold, and means for diverting the elevator from the lifting position to superpose the mold on the stack.

91. In mold handling apparatus, a holder of a stack of molds, an elevator moving upwardly with a mold beside the stack, and means for diverting the elevator from the direction of upward movement to superpose the mold on said stack, without hindering or reducing said upward movement.

92. In mold handling apparatus, a holder of a stack of molds, an elevator vertically carrying a mold beside the stack, and means for diverting the movement of the elevator until it occupies a horizontal plane for superposing the mold on the stack, thereafter continuing the upward movement remaining in said plane.

93. In mold handling apparatus, an elevator carrying a swingable member, rising at a uniform rate of movement; and means for swinging said swingable member in respect to the elevator without interfering with its movement.

94. In mold handling apparatus, a holder of a stack of molds, an elevator, with a swingable member, rising beside the stack at a uniform rate of movement; and means for gradually swinging said member in respect to the elevator as the stack is approached to dispose said member in a horizontal plane above the stack, said elevator continuing rising without interruption and carrying the member in its last position to a stopping point.

95. In mold handling apparatus, an elevator first moving vertically beside a mold stack, then horizontally thereover into a superposing position, and means for turning the elevator into such position regardless of the height of the stack.

96. In mold handling apparatus, a transposing elevator movable downwardly and upwardly, and operatively associated means rested on top of a mold stack by the elevator on the downward movement, to guide the elevator into a mold depositing position over the stack on the upward movement.

97. In a mold handling apparatus, a transposing elevator occupying a normal rest position, comprising a movable element and a second element relatively movable to the first element; and means for producing the relative movement of the second element on the downward and upward movements of the first element, said means being supported by said first element when the elevator is in the rest position.

98. In mold handling apparatus, an elevator in a normal rest position, comprising a movable element, and an element relatively movable in respect to the first, and means supported with the elevator in the rest position by the first element, adapted to recline on the top mold of a stack regardless of the height of the stack as the first element moves down, thereby causing said relative movement of the second element, to turn it into another plane and proceed with the first element.

99. In mold handling apparatus, an elevator occupying a normal rest position, comprising a movable member, and a second member relatively movable in respect to the first; means for moving the first member down, carrying the second member with it, and means supported by and carried with the first member until the top of a mold stack is reached, upon which said means reclines and causes the subsequent relative movement of the second member.

100. In mold handling apparatus, an elevator in a normal rest position, comprising a movable shoe, and a member relatively movable in respect to the shoe; means for moving the shoe and said member down as one, and means supported by and carried with the shoe until it engages the top of a mold stack where it stops, for causing the relative movement of said member while it continues down with the shoe.

101. In mold handling apparatus, a primary carriage carrying a complete mold, means in the path of the carriage for intercepting the mold upon movement of the carriage, and means embodied in said intercepting means for locking the mold in position.

102. In mold handling apparatus, a primary carriage carrying a complete mold, means straddling said carriage to intercept the mold upon movement of the carriage, and means in said intercepting means for locking the mold in position.

103. In mold handling apparatus, a primary carriage carrying a complete mold, means standing across the path of and straddling said carriage to receive the mold as the carriage passes out, means in said intercepting means upon which the weight of the mold is sustained, and means for locking the mold within the intercepting means.

104. In mold handling apparatus, a primary carriage with a complete mold, means straddling the carriage and shaped to provide an enclosure for the mold, means in said enclosure on which the mold rests as the carriage departs, and means deflected by the mold as it enters but returning to lock the mold inside the enclosure when its occupation is complete.

105. In mold handling apparatus, receiving means into which a complete mold is deposited on edge, means for hoisting and returning the receiving means to superpose the mold on a stack, and means locking the mold in position to prevent it falling out during such turning.

106. In mold handling apparatus, an elevator arranged to receive a complete mold on edge from a primary carriage, means deflected by the entrance of the mold but moving back when the elevator is in full occupation to close the entrance against the mold, means for hoisting and turning the elevator into a superposing position on top of a mold stack, and means for releasing said closing means to free the mold so that it may pile on top the stacks.

107. In mold handling apparatus, an elevator arranged to receive a complete mold on edge from a primary carriage, means for hoisting and turning the elevator into a superposing position on top of a mold stack, means locking the mold in the elevator to prevent its falling out during said turning, and means connected to the elevator assuming various angular positions as the elevator turns, finally reaching such position as to release the locking means and free the mold.

108. In mold handling apparatus, an elevator arranged to receive a complete mold on edge from a primary carriage, means for hoisting and turning the carriage into a superposing position on a mold stack, a freely connected element first rising with the elevator then assuming angular positions as the elevator turns over, and locking means holding the mold in position in the elevator while turning over, but including means engageable by said element when a predetermined angle is reached and the elevator is directly over the stack, whereby the locking means is released to free the mold.

109. In mold handling apparatus, an elevator arranged to receive a complete mold on edge from a primary carriage, means for hoisting the elevator, including a shoe to which it is connected; means for turning the elevator on its connection during hoisting to superpose the mold on a stack, means locking the mold in position in the elevator at a plurality of places, and means for simultaneously undoing all of the locks when the superposing position is reached, including an actuating element connected to the elevator at one point, and actuating means embodied in the shoe.

110. In mold handling apparatus, an elevator movable into a superposing position over the mold stack, means moving the elevator into such position, means bracing the elevator when said position is reached, and means locking a mold within the elevator during movement to the superposing position, but engageable by the moving and bracing means when such position is reached to undo the lock and release the mold.

111. In mold handling apparatus, means for removing a mold from the bottom of a stack, means for gradually lowering the stack until its lowermost mold occupies the space vacated by the removed mold, and means for superposing the same mold on top of the stack, causing the disengagement of said lowering means as part of its operation, from the lowermost mold, permitting the lowering means to engage the mold next highest in the stack.

112. In mold handling apparatus, an elevator shoe movable on a guide including a mold-receiving member, swingably mounted on the shoe; and means for bracing the mold-receiving member when a horizontal position is assumed, including a radius rod extending toward the guide, and a crosshead running on the guide to which the rod is connected.

113. In mold handling apparatus, a mold-receiving elevator occupying a vertical position in which it receives the mold, means first hoisting the elevator vertically, and a curved rail resting on a mold stack on which the mold is to be superposed, standing in the path of the elevator to turn it into superposing position.

114. In mold handling apparatus, an elevator for superposing molds on a mold stack, including a shoe, and a guide on which its runs; a rail support traveling down with the shoe until the top of a stack is reached where the support stops, and a standard with a T-guide for receiving the rail support on its downward movement, to stabilize it.

115. In mold handling apparatus, means for slowly lowering a mold stack to a predetermined rest position, downwardly moving means for superposing a mold on the mold stack, and means preventing a rigid abutment to said superposing means on its downward movement thereby to release said lowering means, but a yielding abutment on the return movement of said transposing means to let the latter pass.

116. In mold handling apparatus, a transposing elevator composed of a frame with a central opening adapted to let a primary carriage through to deposit a mold in the elevator, and means distributed about said opening yielding on the entering movement of the mold but returning to support the mold when the elevator assumes a changed position.

117. In mold handling apparatus, a transposing elevator composed of a hollow frame with a central opening, means, including dogs distributed about said opening, adapted to yield to let a mold enter when a primary carriage passes through the central opening, but movable back to obstruct the reverse passage of the mold; and means for locking the dogs, including spring-pressed latches.

118. In mold handling apparatus, a transposing elevator composed of a hollow frame with a central opening, means, including dogs distributed about said opening, yielding to let a mold enter when a primary carriage passes through the central opening, but moving back to obstruct the reverse passage of the mold; means for locking the dogs, including spring-pressed latches; and crank devices for retracting the latches to release the dogs, letting the mold out at a predetermined place.

119. In mold handling apparatus, a transposing elevator composed of a hollow frame with a central opening, provided with shoulders for supporting a mold on edge when a primary carriage passes through said opening.

120. In mold handling apparatus, a transposing elevator adapted to change its position for transposing a mold, means for locking the mold in the elevator during such change of position, including a supporting dog, and latch with a crank end; and means pivotally mounted to a part of the elevator, swinging against the crank as the transposing position is reached to retract the latch and release the dog adjacent one part of the mold.

121. In mold handling apparatus, a primary carriage adapted to advance to obtain a core with a cured tire and return with it, core removing means in a normal rest position, and instrumentalities actuated by the primary carriage near the end of an advancing movement, to start the removing means into position to receive the core when the carriage reaches such position on the return movement.

122. In mold handling apparatus, a rectilinearly movable primary carriage advancing to obtain a core with a cured tire and returning with it, core removing means in a normal rest position but movable at right angles to the carriage, and instrumentalities set in operation when the carriage nears the end of its advancing movement to start the removing means toward the primary carriage in readiness to receive the core on the return of the carriage.

123. In mold handling apparatus, a primary carriage adapted to advance to obtain a core with a cured tire and return with it, normally stationary core removing means, means set in operation by the primary carriage when it nears the end of its advance to start the removing means toward the primary carriage, and means actuated by the removing means to stop itself in a predetermined position beside the carriage to receive the core on the return movement thereof.

124. In mold handling apparatus, a primary carriage adapted to advance to obtain a core with a cured tire and return with it, core removing means normally stationed at a point distant from the carriage, means actuated by the carriage near the end of its advance to start the removing means to a core intercepting position close to the carriage, and means operatively associated with said removing means for stopping it in said position.

125. In mold handling apparatus, a primary carriage continuously movable in alternate directions, and means for removing cores from the carriage set into intermittent movements during certain of said carriage movements.

126. In mold handling apparatus, a primary carriage continuously movable on alternately forward and retrograde movements, core removing means normally stationary, and separate mechanisms respectively actuated on the forward and retrograde movements of the carriage to produce intermittent movements of the removing means toward and from the carriage only during certain of its forward and retrograde movements.

127. In mold handling apparatus, a primary carriage for cores, a prime mover for said carriage, and means actuated by the carriage for causing the prime mover to continuously advance and return the carriage.

128. In mold handling apparatus, a primary carriage for old and new cores supporting cured and uncured tires, continuously operating driving means, including a shiftable element and means driven thereby; and means embodied in the carriage for shifting said element for producing said carriage movement wherein said old and new cores are handled in succession.

129. In mold handling apparatus, a primary carriage, means by which it is driven, a continuously operative shiftable driving element, and means embodied in the carriage for shifting said element in respect to the driven means at the end of each carriage movement, to reverse the carriage.

130. In mold handling apparatus, a primary carriage, means by which it is driven, a continuously operative shiftable driving element, means embodied in the carriage for shifting said element in respect to the driven means at the end of each carriage movement, to reverse the carriage, and means embodied in said driven means for absorbing any shock in momentarily stopping the carriage on reversal.

131. In mold handling apparatus, a primary carriage, means by which it is driven, continuously operating driving means shiftable in respect to said driven means, and means near each extremity of the carriage for shifting said shiftable means when the carriage reaches the end of a movement, for reversing the movement of the carriage.

132. In mold handling apparatus, a primary carriage advancing to obtain a core with a cured tire, normally stationary core-removing means started during the advance of the carriage into position to intercept the core on the return of the carriage, and normally stationary means started at the end of the carriage advance toward a position in front of the carriage after the mold-removing means is passed, said means bringing a new core and uncured tire to be taken off by the carriage on a subsequent advance.

133. In mold handling apparatus, a normally stationary uncured tire elevator, a primary carriage movable in respect to the elevator, and means embodied in the carriage for starting the elevator on one of its movements.

134. In mold handling apparatus, a normally stationary elevator sustaining a new core and uncured tire, a primary carriage movable forwardly and backwardly in respect to the elevator, and means operable when the carriage reaches the end of the forward movement, to start the elevator and bring said core and uncured tire into receiving position when the carriage reaches the end of its backward movement.

135. In mold handling apparatus, a normally stationary elevator sustaining a new core and uncured tire, a primary carriage movable forwardly and backwardly beneath the elevator, normally dormant means by which the elevator is lowered, and means actuated by the carriage when it reaches the end of the forward movement rendering the lowering means operative to lower the elevator, bringing the core and uncured tire into receiving position when the carriage reaches the limit of its backward movement.

136. In mold handling apparatus, an advancing primary carriage, a normally stationary tranverse core conveyor, electro-mechanical devices for moving it, and a normally open primary switch closed by the carriage near the end of its advancement, to energize the electric elements of said devices, operate the mechanical elements and start the conveyor.

137. In mold handling apparatus, a primary carriage retrograding with a core carrying a cured tire, a transverse core conveyor stationed beside the carriage to intercept the core for its removal, dormant electro-mechanical devices for moving the conveyor, and a secondary switch closed by the carriage as it passes the conveyor, to energize the electric element and operate the mechanical element of said devices to move the conveyor away with the core and tire.

138. In mold handling apparatus, an advancing primary carriage, a stationary transverse core conveyor, a stationary uncured tire elevator, operating means for each, that of the latter working slower than that of the former; means actuated by the carriage on its advance to start the conveyor, means stopping the conveyor when it reaches the carriage, means actuated on the carriage advance to start the elevator, and means for stopping the elevator when it reaches a position in the path of the carriage after the carriage has passed on a retrograde movement.

139. In mold handling apparatus, a primary carriage making advance and retrograde movements, a stationary uncured tire-elevator, means actuated by the carriage at the end of its advance to start the elevator toward the carriage, reaching the position of the carriage after it has passed on its retrograde movement; and means then stopping the elevator.

140. In mold handling apparatus, a transverse core conveyor normally stationed between extremes of movement, means for stopping the conveyor after movement from said position to one extremity, and means for stopping said conveyor at the other extremity to which it moves directly from the first extremity.

141. In mold handling apparatus, a transverse core conveyor adapted to occupy positions at two extremes of movement, a shiftable switch at one extremity, occupying one position while the conveyor travels toward the other extremity; and means actuated by the conveyor when it reaches said extremity, for shifting the switch into another position in readiness for a return operation of the conveyor, and stopping said conveyor.

142. In mold handling apparatus, a transverse core conveyor adapted to occupy positions at two extremes of movement, a shiftable switch at one extremity, occupying one position while the conveyor travels toward the other extremity; means actuated by the conveyor when it reaches said extremity, for shifting the switch into another position in readiness for a return operation of the conveyor, and stopping said conveyor, and subsequently operative means coacting with the switch in its last position for starting the conveyor toward the extremity at which said switch is located.

143. In mold handling apparatus, a transverse core conveyor adapted to occupy positions at two extremes of movement, electo-mechanical devices for operating the conveyor forward and backward, an electric switch at one extremity in one position, a primary carriage closing a primary switch during its advance to energize one part of said devices and move the conveyor forwardly, and means actuated by the conveyor when it reaches the forward extremity for shifting said switch into another position, causing the conveyor to stop.

144. In mold handling apparatus, a transverse core conveyor adapted to occupy positions at two extremes of movement, electro-mechanical devices for operating the conveyor forward and backward, an electric switch at one extremity in one position, a primary carriage closing a primary switch during its advance to energize one part of said devices and move the conveyor forwardly, means actuated by the conveyor when it reaches the forward extremity for shifting said switch into another position, causing the conveyor to stop, and a secondary switch closed on a retrograde movement of the primary carriage, to complete a circuit with said shifted switch to energize another part of said devices and start the conveyor backwardly.

145. In mold handling apparatus, a transverse core conveyor movable from one extreme position to another, means for stopping it at the last position, means for starting the conveyor from said position, and means for finally stopping the conveyor midway of the first position.

146. In mold handling apparatus, a transverse core conveyor, electro-mechanical means for moving the conveyor from one extreme to a mid position, and means, including a stop switch, opened by the conveyor when it reaches the mid position, to render the electro-mechanical devices inoperative.

147. In mold handling apparatus, a transverse core conveyor occupying a mid position, electro-mechanical devices for actuating the conveyor, including a stop switch opened by the conveyor to render said devices dormant and stop the conveyor in said position; and means operating at a predetermined time to energize said devices independently of said stop switch, to start the conveyor from said position.

148. In mold handling apparatus, a transverse core conveyor occupying a mid position, electro-mechanical devices for actuating the conveyor, including a stop switch opened by the conveyor to render said devices dormant and stop the conveyor in said position; and means for starting the conveyor from said position, including an open primary switch operating independently of the stop switch, with a movable dog for turning said primary switch into a closed position at a predetermined time.

149. In mold handling apparatus, a transverse core conveyor, means along which the conveyor is moved by its operation, and means at each extremity of movement of the conveyor for stopping the operation of said means when the respective extremities are reached.

150. In mold handling apparatus, a transverse core conveyor, with means for moving it back and forth; and means located at predetermined places along the route of the conveyor for controlling the operation of its moving means in accordance with a predetermined plan.

151. In mold handling apparatus, a transverse core conveyor, with means for moving it back and forth; an electric means including switches, located along the route of the conveyor for controlling the operation of its moving means according to a predetermined plan.

152. In mold handling apparatus, a transverse core conveyor, with means by which the conveyor is moved; a primary carriage, and means, including electric switches for controlling the operation of mechanism for actuating said moving means, said switches being distributed over the path of movement of said carriage.

153. In mold handling apparatus, a transverse core conveyor, with means for moving it; electric devices distributed along the route of the conveyor for controlling the moving means according to a predetermined plan, and a movable primary carriage, with electric devices distributed along its route, for cooperating with said other electric devices in controlling the movement of the conveyor.

154. In mold handling apparatus, a transversely moving core conveyor, means now active by which the conveyor is moved, companion, but now inactive means, by which the conveyor is moved in an opposite direction, and means actuated by the conveyor when it reaches the end of its movement performing an operation to insure the inaction of said companion means to temporarily prevent the return of the conveyor.

155. In mold handling apparatus, a transverse core conveyor, operating means, and companion electric devices, one active to move the conveyor, the other being inactive; means at the end of the conveyor-movement tending to render said means active to reverse the conveyor, and other means actuated an instant before by the conveyor, preventing the action of said means to temporarily hold the conveyor stationary.

156. In mold handling apparatus, a moving transverse core conveyor, a stop switch in the path of the conveyor, means on the conveyor producing a partial operation of the switch as it advances, and means on the conveyor, adapted to displace means associated with the switch into position in readiness for another operation of the switch.

157. In mold handling apparatus, a moving transverse core conveyor, a stop switch in the path of the conveyor, means on the conveyor producing a partial operation of the switch as it advances, means on the conveyor, adapted to displace means associated with the switch into position in readiness for another operation of the switch, and means subsequently engaging said displaced means for producing said other operation of the switch.

158. In mold handling apparatus, a member adapted to advance to a core and tire-receiving position, neutrally positioned electro-mechanical devices for advancing said member, means for energizing one of the electric elements to render the mechanical devices operative to advance said member, and means for returning said devices to the neutral position upon deenergization.

159. In mold handling apparatus, a carriage adapted to advance toward and recede from a core and tire receiving position, a continuously operative driving element, neutrally positioned driven means for actuating the carriage from said element, electro-magnetic means for shifting the driven means in position to drive the carriage in either direction, and means for neutralizing said electro-magnetic means after any energization.

160. In mold handling apparatus, a carriage advancing to a core and cured tire-receiving position, a stop switch, with means in the path of the carriage for causing a partial operation of the switch; and means, including a cam, on the carriage engaging said operating means at a predetermined time.

161. In mold handling apparatus, a stop switch, associated actuating means therefor, advancing means, including a core conveyor, with means for initially operating the switch independently of its actuator; and depressor means subsequently shifting the actuator into a position for subsequent actuation of the switch.

162. In mold handling apparatus, a stop switch, with an actuator; a carriage including means movable beneath the actuator to shift it and turn the switch, depressor means movable backwardly over the actuator, adapted to shift the actuator into a position to be operated by said carriage means; and means permitting the depressor means to yield when passing the actuator in the backward direction, but holding the depressor rigid to shift the actuator when moving in a forward direction.

163. In mold handling apparatus, a carriage for receiving a core and uncured tire, means adapted to dispose a core and uncured tire into a receiving position, and means actuated at a predetermined time discharging the core and tire on the receiving means.

164. In mold handling apparatus, a carriage for receiving a core and uncured tire, means adapted to dispose a core and uncured tire in a receiving position, and means actuated on an advance of the carriage for discharging the core and tire thereon during said advance.

165. In mold handling apparatus, a carriage adapted to receive a core and uncured tire, means for presenting a core and tire in a receiving position, including means on which they are supported; and means actuated on an advance of the carriage for displacing said support and discharging the core and tire on the carriage.

166. In mold handling apparatus, a carriage adapted to advance to receive a core with an uncured tire, means arranged to present a core and tire in a receiving position, including means on which they are supported; means actuated on the advance of the carriage to displace the support and discharge the core and tire on the carriage, and instrumentalities simultaneously operated to remove said presenting means from the path of the carriage.

167. In mold handling apparatus, a carriage adapted to advance to a core-receiving position, means supporting a core with an uncured tire in the path of the carriage, a locking member for said means, and means embodied in the carriage, for displacing the locking member and releasing said supporting means to discharge the core on the carriage.

168. In mold handling apparatus, a carriage adapted to advance to a core-receiving position, means supporting a core with an uncured tire in the path of the carriage, a locking member for said means, means embodied in the carriage, for displacing the locking member and releasing said supporting means to discharge the core on the carriage, and instrumentalities set in operation simultaneously with the displacing of the locking member, to remove said supporting means from the path of the carriage.

169. In mold handling apparatus, a carriage, with an extension adapted to advance to a core-receiving position, an elevator stationed in front of the carriage, with means supporting a core and uncured tire in the path of the extension; a locking member for said means, and means embodied in the extension for displacing the locking member and releasing the supporting means to discharge the core onto the extension.

170. In mold handling apparatus, means for transferring a mold from a mold stack, a carriage advancing to remove the mold from the transferring means, mechanism for operating the carriage, and means to be set into operative engagement with said mechanism when positioned relative to said carriage to intercept the mold for its removal from the apparatus.

171. In mold handling apparatus, an elevator, means embodied therein for supporting a core with an uncured tire; means locking the supporting means in one position and operating an elevator-controlling switch in another position; and means for retaining said means in either position.

172. In mold handling apparatus, an elevator, means embodied therein for supporting a core with an uncured tire, means locking the supporting means in one position and operating an elevator-controlling switch in another position; means for retaining said means in either position, and means movable in respect to the elevator, adapted to engage a part of said means, moving it to simultaneously unlock said supporting means and actuate said switch to start the elevator.

173. In mold handling apparatus, an elevator arranged to encompass means for supporting a core, means confined within the elevator for locking said supporting means, and means carried by a part of the locking means, extending beyond the boundary of the elevator, to be engaged by a relatively movable part to shift the locking means and release the support.

174. In mold handling apparatus, a movable elevator for delivering cores with uncured tires to the receiving position of a reciprocating carriage, electro-mechanical means for moving the elevator, a switch mounted on the elevator controlling one of the movements thereof, and a loose flexible current conductor leading from said switch to said electro-mechanical devices, accommodating the movements of said elevator.

175. In mold handling apparatus, an elevator arranged to deliver a core with an uncured tire to a receiving position, electromechanical devices, including a closed switch, in operation to move the elevator; means carried by the elevator for opening the switch during a predetermined part of its movement, and means retaining said switch in said position to prevent re-closure when the elevator leaves in a subsequent operation.

176. In mold handling apparatus, an elevator arranged to deliver a core with an uncured tire to a receiving position, electromechanical devices, including a closed switch, operating to move the elevator; means for opening the switch to stop the elevator at the delivering position, means advancing to receive the core, including means for starting the elevator on a reverse movement, and means tending to shift the switch but being prevented from so doing by the presence of the elevator; and means retaining the switch in the shifted position after the elevator leaves.

177. In mold handling apparatus, an uncured tire elevator, with electro-mechanical devices for moving it; a stop switch arranged to control the circuit of said devices, shiftable in one position by a part of the elevator; a primary carriage cooperating with the elevator to remove cores and uncured tires, with means for shifting the switch into another position; and means for frictionally holding the switch in either of its shifted positions.

178. In mold handling apparatus, an uncured tire elevator adapted to assume a stationary delivering position, a stop switch, controlling electro-mechanical elevator-moving devices, held in an open position by the elevator; a carriage arranged to advance to receive a core and uncured tire from the elevator, and means adapted to shift the open switch, including means arranged to yieldingly pass over the switch while the elevator is in the stationary position.

179. In mold handling apparatus, a stop switch, for controlling certain movements of a core delivering elevator, arranged to stand in an inclined open position; a carriage cooperating with the elevator, arranged to make forward movement in respect thereto; means on the carriage to then shift the switch to a closed but non-circuit completing position, and means for frictionally holding the switch in either of its shifted positions.

180. In mold handling apparatus, a stop switch, for controlling certain movements of a core delivering elevator, arranged to stand in an inclined open position; a carriage cooperating with the elevator, arranged to make forward movement in respect thereto; means on the carriage to then shift the switch to a closed but non-circuit completing position, and means operated on a succeeding retrograde movement of the carriage to complete a circuit in which said switch is embodied, to start said elevator from a rest position.

181. In mold handling apparatus, means, on an elevator, supporting a core with an uncured tire until a delivering position is reached, means normally locking the supporting means until the time of delivery when said supporting means is released, and means for returning the supporting means into position to be re-locked.

182. In mold handling apparatus, an uncured tire elevator, with means supporting a core with an uncured tire, and means locking the supporting means; and means for limiting the discharging movement of said supporting means upon displacement of the locking means.

183. In mold handling apparatus, an uncured tire elevator, with means supporting a core with an uncured tire, means locking the supporting means; means for limiting the discharging movement of said supporting means upon displacement of the locking means, and means returning the supporting means into position to be re-locked, after the discharging operation.

184. In mold handling apparatus, an uncured tire elevator, with means supporting a core with an uncured tire, means locking the supporting means; means for limiting the discharging movement of said supporting means upon displacement of the locking means, means returning the supporting means into position to be re-locked, after the discharging operation, and means frictionally holding said locking means in its displaced position, to be subsequently moved into re-locking engagement with the supporting means.

185. In mold handling apparatus, an elevator moving to a normal rest position, means adapted to support a core with an uncured tire, including means sustaining it in a normal receiving position; a closed switch on the elevator, maintaining an operating circuit closed whereby the elevator is moved to said rest position, locking means previously disengaged from the supporting means, holding said switch closed; and means in the path of the elevator for simultaneously opening the switch to stop the elevator, and shifting the locking means into engagement with the supporting means, in readiness to receive a core with an uncured tire.

186. In mold handling apparatus, a primary carriage completing a second forward movement, a stop switch, now open, adapted to control electro-mechanical means for lowering an uncured tire elevator into the path of the carriage; means on the carriage for rocking the switch into a closed position for a subsequent energization of said devices, and means for simultaneously breaking a circuit at another point, in which said switch is located, and shifting cooperating mechanism for the reversal of said carriage.

187. In mold handling apparatus, a primary carriage making a second forward movement, shiftable means now operative to produce said movement, electro-mechanical devices for operating an uncured tire elevator, embraced in a circuit including a closed stop switch and a closed core elevator switch, means on the carriage for opening the stop switch on said movement, and means for simultaneously opening the core elevator switch and reversing said shiftable operating means at the end of said carriage movement, to respectively keep said circuit deenergized and cause the carriage to move back.

188. In mold handling apparatus, a primary carriage making a second forward movement, shiftable means now operative to produce said movement, electro-mechanical devices for operating an uncured tire elevator, embraced in a circuit including a closed stop switch and a closed core elevator switch, means on the carriage for opening the stop switch on said movement, means for simultaneously opening the core elevator switch and reversing said shiftable operating means at the end of said carriage movement, to respectively keep said circuit deenergized and cause the carriage to move back, and means operative on the following forward movement of said carriage to again actuate the core elevator switch, completing said circuit for the operation of certain of said electro-mechanical devices to cause the lowering of said elevator.

189. In mold handling apparatus, means movable between receiving and delivering positions for furnishing a cooperating carriage with cores carrying uncured tires, and means stationed at said receiving position, successively actuated by said delivering means to withdraw cores with uncured tires.

190. In mold handling apparatus, means for holding a number of new cores with uncured tires, means for removing cores with tires from said source, and means disposed at said source, actuated by said removing means, for releasing said cores and tires.

191. In mold handling apparatus, means for holding a number of new cores and uncured tires, means movable in respect to said source, receiving the cores with tires during such movement; and means reciprocating between said source and receiving means, for delivering said cores and tires.

192. In mold handling apparatus, means holding a supply of new cores with uncured tires in reserve, means movable toward said holding means for removing single cores and tires therefrom, and means operable by said movable means for transferring a core with its tire thereto.

193. In mold handling apparatus, means holding a supply of new cores with uncured tires in reserve, means movable toward said holding means for removing single cores and tires therefrom, means operable by said movable means for transferring a core with its tire thereto, and means embodied in said transferring means preventing the removal of more than one core and tire at a time.

194. In mold handling apparatus, means holding a supply of new cores with uncured tires in reserve, means movable toward said reserve supply for receiving a predetermined number of cores and tires, and means actuated with a step-motion upon the arrival of said receiving means, for releasing said number of cores, holding the rest back.

195. In mold handling apparatus, gravity actuated core and uncured tire supply means, means movable toward said supply means for receiving a core with an uncured tire, and means normally checking the movement of said cores and tires by gravity, actuated by said receiving means at the end of its movement, to release a core and uncured tire, at the same time checking the others following.

196. In mold handling apparatus, means for receiving a new core and uncured tire, means holding a supply of said cores and tires in readiness for the receiving means, means actuated by the receiving means by which single cores and tires are released, and braking means normally checking said releasing means, actuated simultaneously with the operation of said releasing means, permitting the transfer of a core and tire to said receiving means.

197. In mold handling apparatus, a new core and uncured tire supply, means normally checking the advance of a column of cores, an operatively associated brake device holding said checking means, receiving means moving toward said supply, and means carried thereby, operative at the end of said movement to simultaneously release the brake and actuate said checking device for transferring one core and uncured tire to said receiving means.

198. In mold handling apparatus, a new core and uncured tire supply, revoluble means restraining a column of cores against gravitation, a brake device normally preventing said means from revolving, means movable toward said supply for receiving a core and uncured tire, and means carried by said receiving means for simultaneously releasing the brake to free said restraining means for partial revolution, enabling the transfer of one core and uncured tire to said receiving means.

199. In mold handling apparatus, an inclined way for carriages supporting new cores with uncured tires, means in the path of the carriages, checking the first one and consequently the column behind; a brake device associated with the checking means, and means movable toward and simultaneously actuating said braking and checking means, to transfer one carriage with its core and tire, to said movable means, said checking means again restraining the column of carriages through the next one then in engagement.

200. In mold handling apparatus, an inclined way supporting carriages with new cores and uncured tires, and revoluble means normally checking the gravitation of said carriages on said way, but capable of releasing one by one.

201. In mold handling apparatus, an inclined way supporting carriages with new cores and uncured tires, revoluble means normally checking the gravitation of said carriages on said way by engagement with the first one, and means on said checking means enabling the production of a step-by-step motion thereof, to release single carriages.

202. In mold handling apparatus, an inclined way supporting carriages with cores and uncured tires, means in the path of the carriages checking the whole column by engagement with the first one, and means projecting from said checking means, engageable to produce single step motions of the checking means to release one carriage at each step.

203. In mold handling apparatus, an inclined way supporting carriages with cores and uncured tires, means in the path of the carriages checking gravitation of the whole column by engagement with the first, a brake device cooperating with the checking means, operative connections between the two, engageable means projecting from the checking means, and means movable into engagement with said projecting means and a part of the brake device for simultaneously releasing the brake, permitting movement of the checking device through said operative connections, and causing the release of one carriage.

204. In mold handling apparatus, an inclined way supporting carriages with cores and uncured tires, means in the path of the carriages checking gravitation of the whole column by engagement with the first, a brake device cooperating with the checking means, operative connections between the two, engageable means projecting from the checking means, means movable into engagement with said projecting means and a part of the brake device for simultaneously releasing the brake, permitting movement of the checking device through said operative connections, and causing the release of one carriage, and means for restoring the brake device and re-establishing the checking device to again restrain the gravitation of said column, when said movable means departs with the first carriage.

205. In mold handling apparatus, an inclined way supporting carriages with cores and uncured tires, means normally checking the gravitation of said carriages, and an elevator movable into receiving position, with means for freeing the checking means to release all of the carriages and transfer the core and tire of the first to said elevator. said core and tire forming an abutment for the rest, preventing further gravitation while said checking means is free.

206. In mold handling apparatus, an inclined way supporting carriages with cores and uncured tires, means normally checking the gravitation of said carriages, an elevator movable into receiving position, with means for freeing the checking means to release all of the carriages and transfer the core and tire of the first to said elevator, said core and tire forming an abutment for the rest, preventing further gravitation while said checking means is free, and means re-establishing said checking means when the elevator departs to again retard said carriages against gravitation.

207. In mold handling apparatus, a track for carriages, including an inclined part for carriages supporting cores with uncured tires, and means for checking the gravitation of the full carriages along said inclined part, and lifting empty carriages in an adjacent and otherwise positioned part.

208. In mold handling apparatus, an elevator, means supplying the elevator with a new core and uncured tire at each of said movements, said means including a track with an inclined way supporting carriages loaded with cores and tires; and means normally checking the gravitation of said carriages, but releasable by the elevator at each of said movements, to transfer a core and tire to the elevator, said means then pushing the empty carriage with others ahead of it, along a part of the track otherwise positioned.

209. In mold handling apparatus, means for furnishing new cores with uncured tires to a part of the mechanism, comprising a track with a portion for carriages loaded with cores and tires, and a portion for empty carriages; and means situated between said portions for controlling the movements of the loaded and empty carriages.

210. In mold handling apparatus, means for supplying new cores with uncured tires to a part of the apparatus, including a track with an inclined portion and a vertical portion, respectively for carriages loaded with cores and tires, and empty carriages; and means at the juncture of said portions restraining the carriages against gravitation on the inclined track and pushing empty carriages up the vertical track.

211. In mold handling apparatus, means for supplying cores with uncured tires to a part of the apparatus, including an inclined track for carriages loaded with said cores and tires; means at the end of the track enabling the advance of the carriage column, and means for initially lowering a column of loaded carriages against said means.

212. In mold handling apparatus, means for supplying cores with uncured tires to a part thereof, including an inclined track for carriages loaded with cores and tires; means at the lower end of the track for releasing single carriages to transfer one core and tire at a time, means operatively associated with the track on which a column of carriages is loaded, and means for retarding the movement of said column along the inclined track until the transferring means is reached.

213. In mold handling apparatus, means for supplying cores with cured tires to a part thereof, including an inclined track with a gap; and means carrying a plurality of carriages with cores having tires built thereon, movable into the gap in registration with the track.

214. In mold handling apparatus, means for supplying cores with cured tires to a part thereof, including an inclined track with a gap; means carrying a plurality of carriages with cores having tires built thereon, movable into the gap in registration with the track, and means for holding the carriages back as they gravitate down the inclined track.

215. In mold handling apparatus, means for supplying cores with cured tires to a part thereof, including an inclined track with a gap; means carrying a plurality of carriages with cores having tires built thereon, movable into the gap in registration with the track, means for holding the carriages back as they gravitate down the inclined track, and means at the base of the track for supporting the column of carriages by engagement with the lowermost one.

216. In mold handling apparatus, means for supplying cores with cured tires to a part thereof, including an inclined track with a gap; means carrying a plurality of carriages with cores having tires built thereon, movable into the gap in registration with the track, means for holding the carriages back as they gravitate down the inclined track, and means at the base of the inclined track to isolate single carriages for the removal of the cores, and disposing of the empty carriages for subsequent reloading on said gap filling means.

217. In mold handling apparatus, means for supplying cores with uncured tires to a part thereof, including a track supporting a plurality of carriages to be loaded; means into which a predetermined number of the carriages are conducted for loading, and means for releasing said carriages from their place of support.

218. In mold handling apparatus, means for supplying cores with uncured tires to a part thereof, including an inclined track with a gap; means normally out of registration, supporting carriages on which the cores are loaded; means for hoisting said loading means into registration with the track, means preventing the column of carriages running down the track, and means, including a brake device, enabling the slow movement of said means down the track to retard the passage of the column of carriages.

219. In mold handling apparatus, a supply conveyor including a track for carriages carrying cores with uncured tires, and means moving in advance of a column of carriages in escorting it to a final position, operable for release from said column for return to head another column.

220. In mold handling apparatus, means for supplying cores with uncured tires to a part thereof, including an inclined track supporting carriages with said cores; means heading a column of carriages in moving to a final position on the track, and means on which said heading means is pivotally mounted for lateral displacement to release the column, movably mounted on a part of the track.

221. In mold handling apparatus, means for supplying cores with uncured tires to a part thereof, including an inclined track supporting carriages with said cores; means heading a column of carriages in moving to a final position on the track, means on which said heading means is pivotally mounted for lateral displacement to release the column, movably mounted on a part of the track, and means for controlling the movement in one direction of said movable means, including a brake device with an interconnection.

222. In mold handling apparatus, means for supplying cores with uncured tires to a part thereof, including double rails, and means occupying a position between the rails for controlling the movement of carriages riding on the rails, some of the carriages supporting cores with uncured tires.

223. In mold handling apparatus, an elevator moving into a position to receive a core with an uncured tire, means normally retaining a row of carriages loaded with cores, and means operated by the elevator as it assumes the receiving position, momentarily freeing the retaining means to release a carriage for the discharge of its core and uncured tire, again rigidifying the retaining means to prevent movement of the row of carriages when the elevator departs.

224. In mold handling apparatus, an elevator moving into a core receiving position, means normally retaining a row of carriages supporting cores with uncured tires, including a brake mechanism with a lever; means associated with the lever, including means holding it in a normal position; and means on the carriage for actuating said associated means against its holding means, to trip the lever and momentarily release the brake enabling the retaining means to transfer one carriage for the discharge of its core onto the elevator.

225. In mold handling apparatus, means for forwarding carriages loaded with cores and uncured tires, including a normally applied brake mechanism; actuating means for the brake mechanism, including a spring dog; and means movable into a core-receiving position, displacing the actuating mechanism to release the brake, said spring dog slipping by at a predetermined point to cause the re-application of the brake before said receiving means departs from its receiving position.

226. In mold handling apparatus, a common source of motive power, a plurality of main actuating shafts driven from said source, and instrumentalities performing the various functions of the apparatus actuated by said shafts as follows: A carriage for separating a core from mold sections, a conveyor for transporting the core to one side, an elevator for lowering a new core on the carriage in place of the former, an elevator for disposing of a mold closed upon the new core, in a predetermined manner; a carriage for handling the old core, means for stripping a cured tire from said core, means for disposing of the cured tire from said stripping means, and means for disposing of the empty core from said carriage; and electric instrumentalities for co-ordinating the operation of the aforesaid elements.

RAWLEY DE WITT HAAS.